United States Patent Office 3,192,210
Patented June 29, 1965

3,192,210
4-(OMEGA - SUBSTITUTED ALKYL)-3,3-DISUBSTI-
TUTED-1-SUBSTITUTED - 2 - PYRROLIDINONES
AND 4-(OMEGA-SUBSTITUTED ALKYL)-3,3-DI-
SUBSTITUTED - 1 - SUBSTITUTED-2-THIONPYR-
ROLIDINONES
Carl D. Lunsford, Richmond, and Albert D. Cale, Jr.,
Bon Air, Va., assignors to A. H. Robins Company, Inc.,
Richmond, Va., a corporation of Virginia
No Drawing. Original application Dec. 4, 1961, Ser. No.
156,945. Divided and this application Nov. 13, 1962,
Ser. No. 237,286
20 Claims. (Cl. 260—247.2)

The present application is a division of our prior-filed copending application Serial No. 156,945, filed December 4, 1961, which in turn is a continuation-in-part of our prior-filed co-pending application Serial No. 88,036, filed February 9, 1961.

The present invention relates to certain heterocyclic organic compounds which may be referred to as 4-(omega-substituted alkyl)-2-pyrrolidinones and 4-(omega-substituted alkyl)-2-thionpyrrolidinones and is more particularly concerned with 4-(omega-substituted alkyl)-3,3-disubstituted-1-substituted-2-pyrrolidinones and 4-(omega-substituted alkyl)-3,3-disubstituted-1-substituted - 2 - thionpyrrolidinones, processes for the production thereof, intermediate products useful in the preparation thereof, and processes for the preparation of such intermediates. The invention is especially concerned with such compounds of the formula:

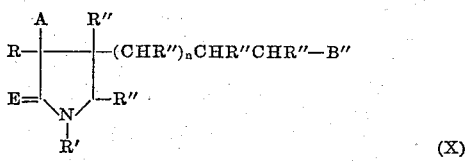

wherein: A is lower-alkyl, cycloalkyl, monocarbocyclic aryl, or monocarbocyclic aralkyl; R is lower-alkyl, lower-alkenyl, cycloalkyl, monocarbocyclic aryl, monocarbocyclic aralkyl, pyridyl, thienyl, or thenyl; R′ is lower-alkyl, lower-alkenyl, cycloalkyl, cycloalkenyl, or monocarbocyclic aralkyl; R″ is hydrogen or methyl, a maximum or one R″ being other than hydrogen; n is zero or one; B is halogen, hydroxy, mercapto, lower-alkylmercapto, lower-alkoxy, phenoxy, benzyloxy, benzoyloxy, hydroxybenzoyloxy, nicotinoyloxy, lower-alkanoyloxy, cyano, carboxy, carbonyl halide, carb-lower alkoxy, aminocarbonyl, lower-alkanoyl, -N - (lower - alkanoyl)-amino, phthalimido, and amino; and E is oxygen or sulfur.

The compounds of the invention having the foregoing Formula X are generally characterized by important pharmacological activity, indicative of their use in counteracting certain physiological abnormalities in an animal body. The compounds are analeptics, hypotensives, or both. Certain compounds of the series are extremely potent and long acting analeptics, stimulating respiration and antagonizing central nervous system depression and exhibiting a particularly durable antagonism against barbiturate-induced depression or poisoning at dose levels considerably below that at which untoward side effects appear. The morpholino compounds are especially potent analeptics. Some other compounds of the series are preferred as hypotensives, particularly those amino compounds wherein the amino group is dialkylamino, especially dimethylamino, piperidino, and pyrrolidino. In addition, as will be apparent and become more obvious hereinafter, some compounds, though active in themselves, are also valuable as intermediates in preparing other and still more active compounds of Formula X, e.g., the omega-haloalkyl compounds. Those compounds having a reactive functional group in the side-chain are of course useful, as shown herein, as reactants in standard-type reactions characteristic of the functional group contained therein. While the degree and relative degree of their activities varies, all compounds tested exhibited analeptic activity although, as stated, because of the relative degree of analeptic vs. hypotensive activity, some are preferred as hypotensives. The amine quaternary ammonium salts tested, in addition to being respiratory stimulants, evidence ganglionic blocking activity.

It is accordingly an object of this invention to provide novel and useful 4-(omega-substituted alkyl)-2-pyrrolidinones and -2-thionpyrrolidinones, processes for their production, intermediate products useful in their preparation, and processes for preparing such intermediates which in themselves have useful pharmacological activity. Other objects of the invention will be apparent to one skilled in the art, and still other objects will become apparent hereinafter.

In the definitions of symbols in foregoing Formula X and where they appear elsewhere throughout this specification, the terms have the following significance.

By "monocarbocyclic aryl" radical is meant an aryl radical of the benzene series, having six ring carbon atoms, and this term includes the unsubstituted phenyl radical and phenyl radicals substituted by any radical or radicals which are not reactive or otherwise interfering under conditions of the reaction, such as nitro, lower-alkoxy, lower-alkylmercapto, lower-alkyl, halo, and the like. The substituted-phenyl radicals have preferably no more than one to three substituents such as those given above and, furthermore, these substituents can be in various available positions of the phenyl nucleus and, where more than one substituent is present, can be the same or different and can be in various position combinations relative to each other. The lower-alkyl, lower-alkoxy, and lower-alkylmercapto substituents each have preferably from one to three carbon atoms which can be arranged as straight or branched chains.

Among the suitable amino radicals included within the symbol B are primary, secondary, and tertiary amino radicals, such as unsubstituted amino ($—NH_2$), (lower-alkyl)-amino; di-(lower-alkyl)-amino; (lower-alkenyl)-amino; di-(lower-alkenyl)-amino; phenylamino; (hydroxy-lower-alkyl)-amino; di - (hydroxy - lower - alkyl)-amino; basic saturated monocyclic heterocyclic radicals of less than twelve carbon atoms, as exemplified by piperidino; (lower-alkyl)-piperidino, e.g., 2-, 3-, or 4-(lower-alkyl)piperidino; di-(lower - alkyl)-piperidino, e.g., 2,4-, 2,6-, or 3,5-di-(lower-alkyl)-piperidino; (lower-alkoxy)-piperidino; pyrrolidino; (lower-alkyl)-pyrrolidino; di-(lower-alkyl)-pyrrolidino; (lower-alkoxy)-pyrrolidino; morpholino; (lower-alkyl)-morpholino; di-(lower-alkyl)- morpholino; (lower-alkoxy)-morpholino; thiomorpholino; (lower-alkyl)-thiomorpholino; di-(lower-alkyl)-thiomorpholino; (lower-alkoxy)-thiomorpholino; piperazino; (lower-alkyl)-piperazino (e.g., C- or $N^4$-methyl-piperazino), di-C-(lower-alkyl)-piperazino; $N^4$-(lower-alkyl)-C-(lower-alkyl)-piperazino; N-(hydroxy-lower-alkyl)-piperazino; N-(lower-aliphatic acyloxy lower-alkyl)-piperazino [e.g., N-acetoxy-, isobutyroxy-, or octanoyloxyethyl or propyl)-piperazino]; (lower-alkoxy)-piperazino; and (lower-carbalkoxy)-piperazino. The terms "lower alkyl" and "lower alkoxy," when employed herein, include both straight and branched chain radicals of not more than eight carbon atoms.

In the foregoing definition of R, certain cyclic radicals are referred to. When pyridyl is referred to, e.g., the 3- or 4-pyridyl radicals are included. When thienyl or thenyl radicals are referred to, these may be, for example, the 3-thienyl or 2- or 3-thenyl radicals.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. The term "alkenyl" includes straight and branched chain radicals of two up to eight carbon atoms inclusive and includes such groups as vinyl, allyl, methallyl, 4-pentenyl, 3-hexenyl, and 3-methyl-3-heptenyl. The term "cycloalkyl" as used herein incudes primarily cyclic alkyl radicals containing three up to nine carbon atoms inclusive and encompasses such groups as cyclopropyl, cyclobutyl, cyclohexyl, cyclopentyl, methcyclohexyl, propylcyclohexyl, ethylcyclopentyl, propylcyclopentyl, dimethylcyclohexyl, cycloheptyl, and cyclooctyl. The term "cycloalkenyl" as used herein includes cyclic alkenyl radicals containing up to nine carbon atoms inclusive and encompasses such usual radicals as 1- and 2-cyclohexenyl and 1- and 2-cyclopentenyl. Included in the term "aralkyl" are lower-alkyl substituted mono-carbocyclic aryl groups such as benzyl, phenethyl, methylbenzyl, phenpropyl and the like. The radicals R and R' in the above Formula X, as stated in the foregoing, are inclusive of such groups as lower-alkyl, lower-alkenyl, cycloalkyl, and aralkyl, and are preferably although not necessarily radicals of a solely hydrocarbon nature.

Included within the scope of "-N-(lower-alkanoyl)-amino" are the corresponding tertiary amino radicals designated -N-(lower-alkanoyl)-N-lower-alkylamino. The term "aminocarbonyl" encompasses not only the primary amino containing radicals, but also the corresponding N-phenyl- or N-(lower-alkyl)-carbamyl and N,N-di-(lower alkyl)-carbamyl radicals as well as the corresponding -N,N-monocyclic alkyl or saturated heterocyclic carbamyl radicals, wherein the saturated monocyclic heterocyclic radical is as set forth under the definition of "amino" in the foregoing. The amino moiety of the aminocarbonyl radical is additionally variable in accord with the definition of "amino" previously given.

When B is amino, the compounds of Formula X may be converted to acid addition and quaternary ammonium salts by reaction of the free base with the selected acid or acid ester, e.g., an alkyl, alkenyl, cycloalkyl, or aralkyl halide, sulfate, or sulfonate, preferably in the presence of an organic solvent inert to the reactants under the conditions of reaction and under substantially anhydrous conditions. When the compounds are to be used as intermediates for preparing other compounds or for any other non-pharmaceutical use, the toxicity or non-toxicity of the salt is immaterial. When the compounds are to be used as pharmaceuticals, they are most conveniently used in the form of water-soluble, non-toxic acid-addition or quaternary ammonium salts. Both toxic and non-toxic salts are therefore within the purview of the invention. The acids which can be used to prepare the preferred non-toxic acid-addition salts are those which produce, when combined with the free bases, salts whose anions are relatively innocuous to the animal organism in therapeutic doses of the salts, so that beneficial physiological properties inherent in the free bases are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl, cycloalkyl, cycloalkenyl, or aralkyl esters of inorganic acids or organic sulfonic acids to the free base form of the tertiary amino compounds. The alkyl, cycloalkyl, cycloalkenyl, alkenyl or aralkyl esters so used include such compounds as methyl chloride, methyl bromide, methyl iodide, ethyl bromide, propyl chloride, allyl chloride, allyl bromide, dimethyl sulfate, methyl benzenesulfonate, methyl p-toluenesulfonate, benzyl chloride, cyclopentyl bromide, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and the selected acid in an organic solvent, in which case the salt separates directly or can be obtained by concentration of the solution. If two or more equivalents of acid are used, a poly-acid-addition salt is obtained in those instances where there is more than one basic nitrogen atom in the molecule. If one equivalent of acid is used a mono-acid-addition salt is obtained.

The quaternary ammonium salts are prepared by mixing the free base and the alkyl, alkenyl, cycloalkyl, or aralkyl ester in an organic solvent. Heating may be used to facilitate the reaction. The quaternary ammonium salt separates directly or can be obtained by concentration of the solution. If one mole of alkyl, alkenyl, cycloalkyl, or aralkyl ester per mole of base is used, a monoquaternary ammonium salt is obtained. If two or more moles of ester per mole of base are used, a poly-quaternary ammonium salt may be obtained, the number of quaternized centers depending upon the number of basic nitrogen atoms present in the free base and the number of equivalents of ester used.

When halogen is referred to herein, preferably but not necessarily a halogen of atomic weight in excess of 19 is employed. Of the halogens, chlorine is preferred.

The present invention provides valuable pharmacologically-active organic compounds and intermediates therefor, having an omega-substituted alkyl substituent in the four position. Although pyrrolidinones having substituents on the 1-nitrogen atom are known, to the best of our knowledge no compounds of the present type, having a substituted alkyl group attached to the 4-position of the 2-pyrrolidinone or 2-thionpyrrolidinone ring, substitution in the 1-position, and disubstitution in the 3-position of said ring, have heretofore been known or preparable by any method, neither have the starting materials therefor been known heretofore. The compounds of the invention, as stated in the foregoing, are valuable per se due to their pharmacological activity but are additionally of great value as intermediates in the preparation of related compounds in which the omega-substituent is widely variable. The preferred compounds for all purposes are the 3,3-diaryl compounds, especially the 1-lower-alkyl-3,3-diphenyl compounds.

The starting materials for the process of the present invention are the substituted acetonitriles of Formula IV. These may be prepared by the process diagrammed in Chart I, wherein all of the symbols have the meanings given previously.

CHART I.—PREPARATION OF STARTING ACETONITRILES (IV)

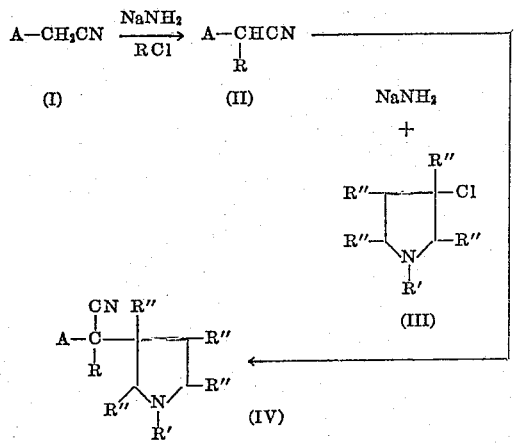

The alpha-(1-substituted-3-pyrrolidyl)-alpha, alpha-disubstituted- (e.g., dimethyl or diphenyl) acetonitriles (IV) are generally prepared by alkylating the alkali metal, e.g., sodium, salt of the appropriate alpha, alpha-disubstituted-acetonitrile (II), e.g., dimethylacetonitrile or diphenylacetonitrile, with the appropriate 1-substituted-3-halo (e.g., chloro)-pyrrolidine in a suitable solvent such as dry toluene. The sodium salt of the alpha, alpha-disubstituted-acetonitrile (II) is formed by reaction of the nitrile with sodium amide in the dry solvent, e.g., toluene. The condensation with the 3-chloro-pyrrolidine (III) is usually carried out with the application of heat, e.g., in refluxing benzene, toluene, or like solvent, for an extended period, e.g., approximately three hours. The solvent, e.g., toluene, solution is then washed with water and the product extracted, as with one normal hydrochloric acid. This acid extract may then be basified with sodium hydroxide, extracted with a water-insoluble solvent such as ether or chloroform, the solution washed and dried, as over sodium sulfate, concentrated, and the residue distilled in vacuo. In most cases, the product crystallizes on standing and may be recrystallized from an appropriate solvent or solvents. The following preparation illustrates this method in which, if desired, the radical R may alternatively by introduced into the acetonitrile molecule *after* the pyrrolidyl radical, rather than *before* the pyrrolidyl radical, which sequence was indicated in the foregoing.

The following preparations and examples are given by way of illustration only and are in no event to be construed as limiting. The temperatures given are in a degrees centigrade, unless indicated to the contrary.

PREPARATION 1

α - (1-*isobutyl*-3-*pyrrolidyl*)-α,α-*diphenylacetonitrile*.— A suspension of the sodium salt of diphenylacetonitrile was formed by the dropwise addition at 50° of 193 g. (1.0 mole) of diphenylacetonitrile to a stirred suspension of 43 g. (1.1 moles) of sodium amide in one liter of dry toluene. After addition was complete, the mixture was refluxed for four hours and then, to the refluxing mixture, 162 g. (1.0 mole) of 1-isobutyl-3-chloropyrrolidine was added at a rapid dropwise rate with continuous stirring. After addition was complete, stirring and refluxing were continued for three hours. The mixture was then cooled and extracted with one normal hydrochloric acid. The aqueous layer together with an oil layer were separated, made basic with dilute sodium hydroxide, and extracted with ether. The ethereal solution was dried over sodium sulfate and concentrated and the residue was distilled in vacuo. Yield 250 g. (78%); B.P. 190–200°/0.15 mm. The material crystallized from a 4:1 ethanol-water mixture. M.P. 76–77°.

*Analysis*.—Calc'd for $C_{22}H_{22}N_2$: C, 82.97; H, 8.23; N, 8.80. Found: C, 83.21; H, 8.12; N, 8.62.

In the same manner, starting from the appropriate 1-substituted-3-chloropyrrolidine (III) and the selected alpha, alpha-disubutyl-acetonitrile (II), in turn produced by reaction of the selected alpha-substituted-acetonitrile (I) and the chloride or bromide of the other substituent R desired to be introduced into the alpha position, or by introducing the pyrrolidyl substituent (III) before the second alpha substituent, various other alpha-(1-substituted - 3 - pyrrolidyl)-alpha, alpha-disubstituted-acetonitriles are prepared. Other compounds within the scope of Formula IV which are prepared according to the manner of foregoing Preparation 1 are as follows:

α-(1-isopropyl-3-pyrrolidyl)-α-allyl-α-phenylacetonitrile,
α-(1-allyl-3-pyrrolidyl)-α,α-dicyclohexylacetonitrile,
α-(1-phenyl-3-pyrrolidyl)-α,α-dimethylacetonitrile,
α-(1-isopropyl-3-pyrrolidyl)-α-benzyl-α-phenylacetonitrile,
α,α-bis-(1-isopropyl-3-pyrrolidyl)-α-phenylacetonitrile,
α-(1-isopropyl-3-pyrrolidyl)-α-(2- or 3-thienyl)-α-phenylacetonitrile,
α-(1-isopropyl-3-pyrrolidyl)-α-(2- or 3-thenyl)-α-phenylacetonitrile,
α-(1-isopropyl-3-pyrrolidyl)-α-(p-methoxyphenyl)-α-phenylacetonitrile,
α-(1-isopropyl-3-pyrrolidyl)-α-(m-chlorophenyl)-α-phenylacetonitrile,
α-(1-isopropyl-3-pyrrolidyl)-α-(o-methylphenyl)-α-phenylacetonitrile,
α-(1-isopropyl-3-pyrrolidyl)-α-methyl-α-cyclopentylacetonitrile,
α-(1-isopropyl-5-methyl-3-pyrrolidyl)-α,α-diphenylacetonitrile,
α-(1-isopropyl-4-methyl-3-pyrrolidyl)-α,α-diphenylacetonitrile,
α-(1-isopropyl-3-methyl-3-pyrrolidyl)-α,α-diphenylacetonitrile,
α-(1-isopropyl-2-methyl-3-pyrrolidyl)-α,α-diphenylacetonitrile,
α-(1-methyl-3-pyrrolidyl)-α-phenyl-α-(2-piperidyl)-acetonitrile, and
α-(1-isopropyl-3-pyrrolidyl)α-phenyl-α-[4-(N-methylpiperidyl)]-acetonitrile, respectively prepared as indicated in the foregoing by the reaction of α-Allyl-α-phenylacetonitrile with 3-chloro-1-isopropylpyrrolidine;
α,α-Dicyclohexylacetonitrile with 3-chloro-1-allylpyrrolidine;
α,α-Dimethylacetonitrile with 3-chloro-1-phenylpyrrolidine;
α-Benzyl-α-phenylacetonitrile with 3-chloro-1-isopropylpyrrolidine;
α-Phenylacetonitrile with 3-chloro-1-isopropylpyrrolidine;
α-(2- or 3-thienyl)-α-phenylacetonitrile with 3-chloro-1-isopropylpyrrolidine;
α-(2- or 3-thenyl)-α-phenylacetonitrile with 3-chloro-1-isopropylpyrrolidine;
α-(p-Methoxyphenyl)-α-phenylacetonitrile with 3-chloro-1-isopropylpyrrolidine;
α-(m-Chlorophenyl)-α-phenylacetonitrile with 3-chloro-1-isopropylpyrrolidine;
α-(o-Methylphenyl)-α-phenylacetonitrile with 3-chloro-1-isopropylpyrrolidine;
α-Methyl-α-cyclopentylacetonitrile with 3-chloro-1-isopropylpyrrolidine;
α,α-Diphenylacetonitrile with 3-chloro-1-isopropyl-5-methylpyrrolidine;
α,α-Diphenylacetonitrile with 3-chloro-1-isopropyl-4-methylpyrrolidine;
α,α-Diphenylacetonitrile with 3-chloro-1-isopropyl-3-methylpyrrolidine;
α,α-Diphenylacetonitrile with 3-chloro-1-isopropyl-2-methylpyrrolidine;

α-Phenyl-α-(2-pyridyl)-acetonitrile with 3-chloro-1-methylpyrrolidine and subsequent catalytic reduction of the pyridine nucleus; and α-Phenyl-α-[4-(N-methylpiperidyl)]-acetonitrile with 3-chloro-1-isopropylpyrrolidine.

The physical constants of some representative α-(1-substituted-3-pyrrolidyl)-α,α-disubstituted-acetonitriles within the scope of Formula IV are shown in Table I.

In this Table I, the compounds characterized, in the order of the table, were prepared from the following reactants:

(1) Diphenylacetonitrile and 3-chloro-1-methyl pyrrolidine
(2) Diphenylacetonitrile and 3-chloro-1-ethyl pyrrolidine
(3) Diphenylacetonitrile and 3-chloro-1-isopropyl pyrrolidine
(4) Diphenylacetonitrile and 3-chloro-1-isobutyl pyrrolidine
(5) Diphenylacetonitrile and 3-chloro-1-cyclohexyl pyrrolidine
(6) Diphenylacetonitrile and 3-chloro-1-benzyl pyrrolidine
(7) α-(2-pyridyl)-α-phenylacetonitrile and 3-chloro-benzyl pyrrolidine
(8) α-(2-pyridyl)-α-phenylacetonitrile and 3-chloro-1-isobutyl pyrrolidine
(9) α-(2-pyridyl)-α-phenylacetonitrile and 3-chloro-1-cyclohexyl pyrrolidine
(10) α-(2-pyridyl)-α-phenylacetonitrile and 3-chloro-1-n-butyl pyrrolidine
(11) α-(2-pyridyl)-α-phenylacetonitrile and 3-chloro-1-isopropyl pyrrolidine
(12) α-(2-pyridyl)-α-phenylacetonitrile and 3-chloro-1-ethyl pyrrolidine
(13) α-(2-pyridyl)-α-phenylacetonitrile and 3-chloro-1-methyl pyrrolidine
(14) α-(2-pyridyl)-α-(p-methoxyphenyl)-acetonitrile and 3-chloro-1-methyl pyrrolidine
(15) α-(2-pyridyl)-α-(p-methoxyphenyl)-acetonitrile and 3-chloro-1-ethyl pyrrolidine
(16) α-(2-pyridyl)-α-(p-methoxyphenyl)-acetonitrile and 3-chloro-1-isopropyl pyrrolidine
(17) α-Isopropyl-α-phenylacetonitrile and 3-chloro-1-ethyl pyrrolidine
(18) α-Isopropyl-α-phenylacetonitrile and 3-chloro-1-isopropyl pyrrolidine
(19) α-Methyl-α-phenylacetonitrile and 3-chloro-1-isopropyl pyrrolidine
(20) α-Cyclopentyl-α-phenylacetonitrile and 3-chloro-1-isopropyl pyrrolidine
(21) α-Cyclohexyl-α-phenylacetonitrile and 3-chloro-1-isopropyl pyrrolidine

*Table I*

REPRESENTATIVE α-(1-SUBSTITUTED-3-PYRROLIDYL)-α,α-DISUBSTITUTED-ACETONITRILES [1]

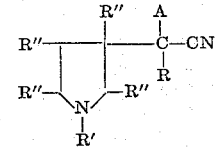

| A | R' | R | B. P./mm. (M.P.), °C. | C Calcd. Found | H Calcd. Found | N Calcd. Found |
|---|---|---|---|---|---|---|
| $C_6H_5$ | $CH_3$ | $C_6H_5$ | (81–82) | 82.57 / 82.82 | 7.29 / 7.45 | 10.14 / 9.72 |
| $C_6H_5$ | $C_2H_5$ | $C_6H_5$ | (83–84) | 82.72 / 82.83 | 7.64 / 7.78 | 9.65 / 9.47 |
| $C_6H_5$ | $i\text{-}C_3H_7$ | $C_6H_5$ | (73–74) | 82.85 / 82.88 | 7.95 / 7.89 | 9.20 / 9.05 |
| $C_6H_5$ | $i\text{-}C_4H_9$ | $C_6H_5$ | (76–77) | 82.97 / 83.21 | 8.23 / 8.12 | 8.80 / 8.62 |
| $C_6H_5$ | $cy\text{-}C_6H_{11}$ | $C_6H_5$ | 195–200/0.005 | 83.67 / 83.23 | 8.19 / 8.33 | 8.13 / 7.78 |
| $C_6H_5$ | $C_6H_5CH_2$ | $C_6H_5$ | 215–218/0.01 | 85.19 / 84.93 | 6.86 / 6.93 | 7.95 / 7.75 |
| $C_6H_5$ | $C_6H_5CH_2$ | $2\text{-}C_5H_4N$ (pyridyl) | 200–210/0.03 | 81.55 / 81.69 | 6.56 / 6.77 | |
| $C_6H_5$ | $i\text{-}C_4H_9$ | do | 161–165/0.07 | 78.96 / 79.00 | 7.89 / 7.68 | |
| $C_6H_5$ | $cy\text{-}C_6H_{11}$ | do | 200–208/0.05 | 79.96 / 80.15 | 7.88 / 8.06 | |
| $C_6H_5$ | $n\text{-}C_4H_9$ | do | 170–175/0.03 | 78.96 / 78.87 | 7.89 / 8.06 | |
| $C_6H_5$ | $i\text{-}C_3H_7$ | do | (107–109) | 78.65 / 78.88 | 7.59 / 7.81 | |
| $C_6H_5$ | $C_2H_5$ | do | (110–119) | 78.31 / 78.53 | 7.26 / 7.20 | |
| $C_6H_5$ | $CH_3$ | do | 148–151/0.07 | 77.94 / 78.21 | 6.91 / 7.05 | 15.15 / 14.55 |
| $p\text{-}CH_3OC_6H_4$ | $CH_3$ | do | 170–173/0.08 | 74.24 / 74.27 | 6.89 / 6.91 | |
| $p\text{-}CH_3OC_6H_4$ | $C_2H_5$ | do | 200–202/0.03 | 74.73 / 74.69 | 7.22 / 7.14 | |
| $p\text{-}CH_3OC_6H_4$ | $i\text{-}C_3H_7$ | do | 190/0.05 | 75.19 / 75.05 | 7.51 / 7.39 | |
| $C_6H_5$ | $C_2H_5$ | $i\text{-}C_3H_7$ | 121–130/0.15–0.20 | 79.64 / 79.86 | 9.44 / 9.65 | 10.93 / 10.74 |
| $C_6H_5$ | $i\text{-}C_3H_7$ | $i\text{-}C_3H_7$ | 124–125/0.002 | 79.95 / 80.11 | 9.69 / 9.61 | 10.36 / 10.27 |
| $C_6H_5$ | $i\text{-}C_3H_7$ | $CH_3$ | ([2]) | | | |
| $C_6H_5$ | $i\text{-}C_3H_7$ | $C_5H_9$ | 147–149/0.005 | 81.03 / 81.53 | 9.52 / 9.28 | 9.45 / 9.58 |
| $C_6H_5$ | $i\text{-}C_3H_7$ | $C_6H_{11}$ | 169–175/0.001 | 81.24 / 81.27 | 9.74 / 9.71 | 9.02 / 8.94 |

[1] See foregoing discussion for starting materials; R'' equals H.
[2] Compound made but not characterized.

The preparation of the 4-(omega-haloalkyl)-3,3-disubstituted-1-substituted-2-pyrrolidinones and other 4-(omega-substituted alkyl)-3,3-disubstituted-1-substituted-2-pyrrolidinones of the invention, respectively designated IX and X, is indicated by the following diagram:

rearrangement will be seen from the following outline (Chart 3) in which all atoms are shown.

In this Chart 3, when no extraneous Q⁻ ion is present while the mixed anhydride (VII A) is in the form of its equilibrium intermediate (VIII), then Y⁻ is the only

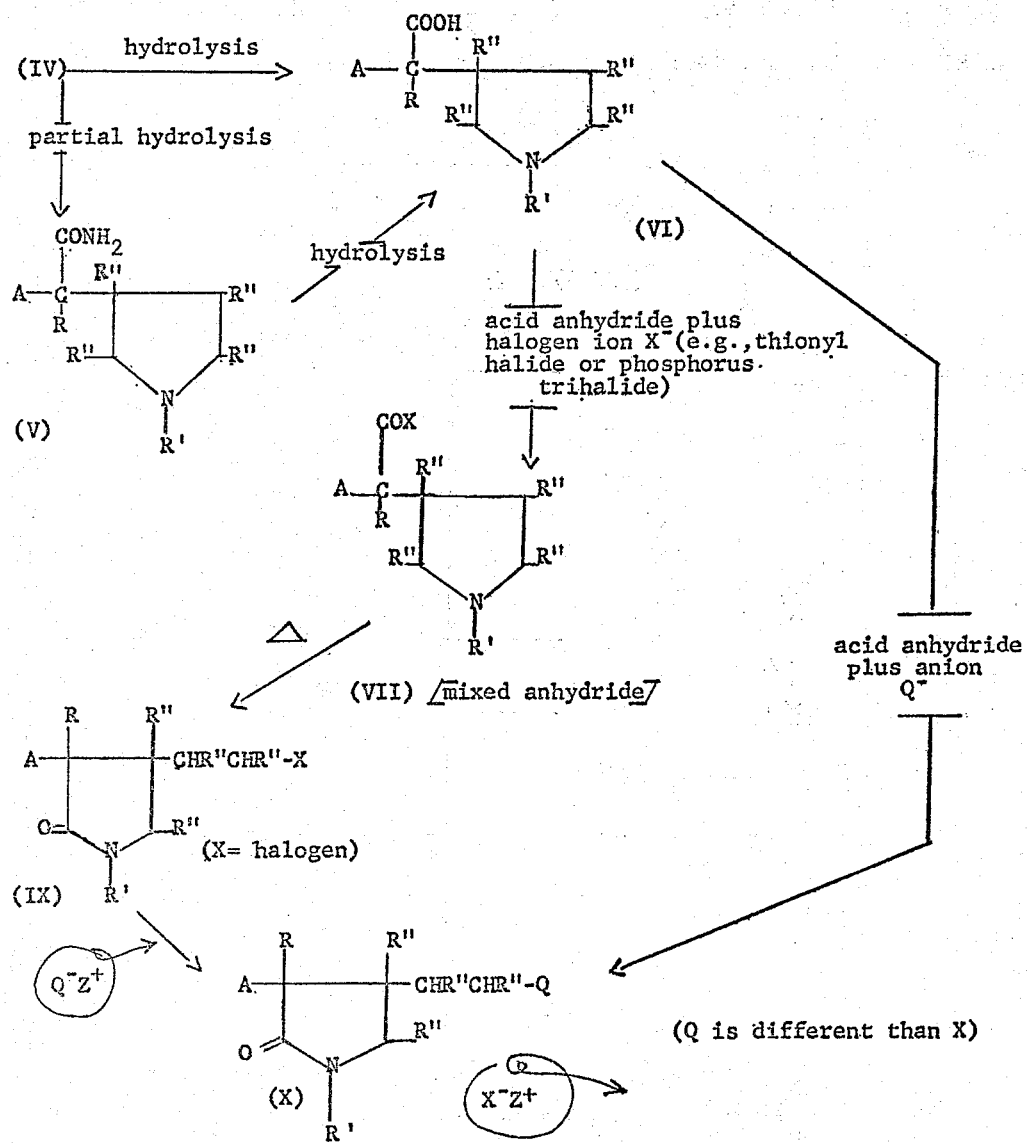

CHART 2.—PREPARATION OF 4-(OMEGA-SUBSTITUTED ALKYL) - 3,3-DISUBSTITUTED-1-SUBSTITUTED-2-PYRROLIDINONES

In this reaction sequence, the acid (VI) is reacted with an acid anhydride capable of forming a mixed anhydride therewith, and the mixed anhydride rearranged to the desired end product. The theory of the mechanism of the rearrangement reaction involved in going either from the acid (VI) directly to (X), in which Q is different than X, or in going from (VI) to (IX), has been further elucidated. It has been found that the reaction is not limited to introduction of the omega-halogen atom X during the rearrangement of (VII) to a 2-pyrrolidinone but, alternatively, that a different negative ion or radical Q⁻, entering from outside the reaction or released from within, may be introduced into the omega position during the rearrangement reaction. The apparent course of the anion in the reaction and emerges as the omega alkyl substituent Q in the product, as in (IX) or (X). However, when an excess of Q⁻ is a component of the reaction mixture at equilibrium intermediate form (VIII), this ion Q⁻ replaces Y in the final product, appearing as the omega-alkyl Q substituent.

Examples are included herein of representative Y⁻ anions in the absence of Q⁻ anions, e.g., halo, such as Cl⁻ or Br⁻, lower-aliphatic acyloxy, e.g., acetyloxy, and where Y⁻ and Q⁻ are different anions, for example, different halogens, different lower-aliphatic acyloxy groups, one a halogen and the other an acyloxy group, and the like. It is in this manner possible to directly introduce iodine, for example, as the omega-alkyl substituent by introduction of sodium iodide into the rearrangement reaction of the mixed anhydride (VII A), where Y is acetyloxy, thus producing a compound of Formula IX in which Q is iodine.

That the mechanism is one which occurs at the equilibrium stage [compound (VIII)] is clearly indicated, for example, by the fact that NaI is not effective under the conditions of reaction to replace an established omega-acetyloxy radical. Where the anion is introduced from outside the reaction, the reaction is facilitated by use of a suitable solvent for the anion, such as methyl ethyl ketone when an alkali metal iodide is employed.

(IV) by hydrolysis, or it may be prepared by hydrolysis of the intermediate amide (V) which in turn may be prepared from the acetonitrile (IV) by a partial hydrolysis. The 4-haloalkyl compound (IX) is convertible to numerous other omega-substituted alkyl products (X), including those of increased side-chain length, as more fully disclosed hereinafter.

The 1,3,3,4-tetra-substituted-2-pyrrolidinones of the present invention are in general prepared by the reactions outlined in Chart 2 of this specification. Presented in the following are general descriptions and specific examples which more fully illustrate the experimental details.

CHART 3.—OUTLINE OF REARRANGEMENT REACTION COURSE

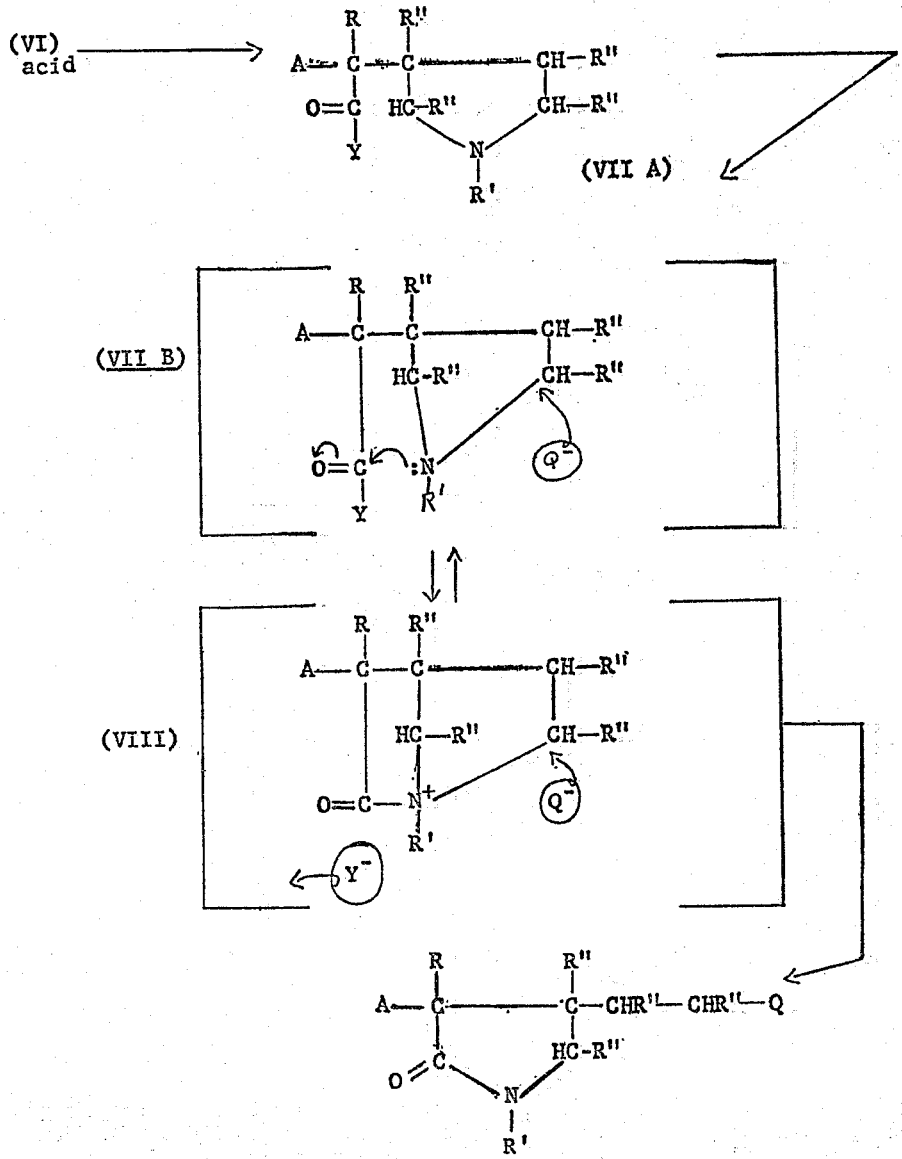

In compound:

(IX) Q=halogen
(X) Q=other than halogen
Y⁻=anion
Q⁻=anion, same as or different than Y⁻.

The 4-haloalkyl compounds (IX) are generally prepared by the rearrangement of the acid (VI) via the mixed anhydride, in this case the acid halide (VII). The acid (VI) may be prepared directly from the acetonitrile In preparing the 4-haloalkyl compounds (IX) from the α-(1 - substituted-3-pyrrolidyl)-α,α-disubstituted acetonitriles (IV), the nitrile is first hydrolyzed to the corresponding acid (VI) by the action of a strong mineral acid, e.g., concentrated sulfuric acid, for example, approximately 60–80%, preferably 70%, aqueous sulfuric acid, or concentrated (e.g., near 35%) hydrochloric acid. Usually this hydrolysis is readily effected by heating at a relatively high temperature, e.g. 100–140, preferably 130–140, degrees centigrade for an extended period, e.g., from five to 48 hours. Lower temperatures increase the required reaction period, higher temperatures may shorten it somewhat but are not recommended since decarboxylation may occur from excessive reaction temperatures or periods and the incidence of undesired side-reactions, e.g., sulfonation, is thereby also increased. Upon completion of the hydrolysis, the solution of the acid (VI) may be cooled, as by pouring onto ice, and basified with an alkali, e.g., sodium or potassium hydroxide, ammonium hydroxide, or the like, and extracted with an appropriate organic solvent. Halogenated organic solvents such as chloroform, ethylene dichloride, and the like are preferred. The resulting solution of the basic salt is then acidified, as with an anhydrous mineral acid, preferably by passing anhydrous hydrogen chloride gas into the solution, the solution of the resulting acid salt dried with a conventional drying agent such as sodium sulfate, magnesium sulfate, calcium chloride, or the like, and finally concentrated, to leave the crude salt of the acid (VI), which may, if desired, be recrystallized from conventional solvents, or isolated after neutralization as the free amino acid. Alternatively, the residual acid salt may be converted without isolation to the corresponding mixed anhydride, i.e., the acyl halide, and then rearranged to the 4-(omega-haloalkyl)-2-pyrrolidinone. In such case, the residual acid salt is usually heated, preferably under reflux, with an acid anhydride capable of forming a mixed anhydride therewith, together with a halogen ion (which halogen ion may either be added to the reaction or generated in situ), for example, with thionyl chloride, phosphorus trichloride, corresponding bromides such as phosphorus tribromide and thionylbromide, acetic anhydride plus sodium iodide, or the like, until complete disappearance of the characteristic acyl halide carbonyl frequency from the infrared spectrum, usually for a period of two to three hours, during which reaction the acid (VI) first converts to the acid halide (VII) or other mixed anhydride (such as VIIA where Y equals acyloxy), and then rearranges to the 4-halo-alkyl-2-pyrrolidinone (IX). Halides of strong acids are preferred, and temperatures up to about 100 degrees are usually employed.

The acyl halides (VII) or other mixed anhydrides (VII A) are unstable even at room temperature and rearrange readily upon heating. It is therefore most convenient to continue heating of the reaction product containing the same, in the presence of the selected halide ion, without making any attempt at isolation, until establishment of the characteristic pyrrolidinone carbonyl frequency, indicative of completion of the preparation of the desired 4-haloalkyl-2-pyrrolidinone via the rearrangement mechanism.

When the acid anhydride is used as solvent as well as a reactant, a considerable excess may be and frequently is employed, although when the anhydride is acetic or other lower-aliphatic, preferably lower-alkanoic, acid anhydride, as in cases when a halogen anion is extraneously introduced into the reaction mixture, a polar solvent such as methyl ethyl ketone may be used to facilitate solution of the anion introduced. After completion of the reaction, any excess reagent may be removed from the organic product under vacuum and the residue crystallized from an appropriate solvent or solvent mixture. The crystallized product from this reaction sequence is the desired 4-omega-haloalkyl-1,3,3-trisubstituted-2-pyrrolidinone.

The following specific examples illustrate the foregoing method and procedure:

*Example 1.—4-(β-chloroethyl)-3,3-diphenyl-1-isobutyl-2-pyrrolidinone*

A solution of 100 grams (0.314 mole) of α,α-diphenyl-α-(1-isobutyl-3-pyrrolidyl)-acetonitrile in 500 grams of 70% sulfuric acid was heated at 130–140° for 48 hours, poured onto ice, made basic with sodium hydroxide, and extracted with chloroform. The chloroform solution was acidified with hydrogen chloride gas, dried over sodium sulfate and concentrated. The residue was refluxed in 500 milliliters of thionyl chloride for three hours; the resulting solution was concentrated in vacuo; and the residue was crystallized from isopropyl ether. Yield 69 grams (62%); M.P. 113–113.5°.

1 - benzyl - 4 - (β - chloroethyl) - 3,3 - diphenyl - 2-pyrrolidinone, 4 - (β - chloroethyl) - 3,3 - diphenyl - 1-methyl - 2 - pyrrolidinone, 4 - (β - chloroethyl) - 1-cyclohexyl - 3,3 - diphenyl - 2 - pyrrolidinone, 4 - (β-chloroethyl) - 3,3 - diphenyl - 1 - ethyl - 2 - pyrrolidinone, 4 - (β - chloroethyl) - 3,3 - diphenyl - 1 - isopropyl - 2-pyrrolidinone, and 4 - (2 - chloroethyl) - 1 - isopropyl-3-methyl-3-phenyl-2-pyrrolidinone are respectively prepared in the manner of this example from α-(1-benzyl-3-pyrrolidyl) - α,α - diphenylacetonitrile, α - (1 - methyl-3 - pyrrolidyl) - α,α - diphenylacetonitrile, α - (1 - cyclohexyl - 3 - pyrrolidyl) - α,α - diphenylacetonitrile, α - (1-ethyl - 3 - pyrrolidyl) - α,α - diphenylacetonitrile, α - (1-isopropyl - 3 - pyrrolidyl) - α,α - diphenylacetonitrile, and α - (1 - isopropyl - 3 - pyrrolidyl) - α - methyl - α-phenylacetonitrile.

The 4-bromoalkyl compounds were prepared in the same manner as the 4-chloroalkyl compounds with the exception that thionyl bromide or phosphorus tribromide was used as the halogenating agent. The following illustrates the preparation of the 4-bromoalkyl compounds.

*Example 2. — α - (1 - ethyl - 3 - pyrrolidyl) - α,α - diphenylacetic acid and 4-(β-bromethyl)-3,3-diphenyl-1-ethyl-2-pyrrolidinone*

A solution of 365 g. (1.26 mole) of α-(1-ethyl-3-pyrrolidyl)-α,α-diphenylacetonitrile in 1500 g. of 70% sulfuric acid was heated at 130° for 48 hours. The acid solution was poured onto ice and made basic with sodium hydroxide. The resulting mixture was extracted with chloroform and the chloroform layer together with an oil layer which formed were acidified with dry hydrogen chloride. A small amount of water was separated and the resulting chloroform solution was dried over anhydrous sodium sulfate and concentrated leaving crude α - (1 - ethyl - 3 - pyrrolidyl) - α,α - diphenylacetic acid hydrochloride.

Portions of this crude acid were treated as follows:

PROCEDURE A

A solution of 31.5 g. of the crude α-(1-ethyl-3-pyrrolidyl)-α,α-diphenylacetic acid hydrochloride and 42.8 g. (0.2 mole) of thionyl bromide in seventy ml. of chloroform was refluxed for seven hours. An infrared spectrum indicated formation of the acyl bromide but no rearrangement to the pyrrolidinone. The solution was concentrated, redissolved in 100 ml. of chloroform and treated with fifty ml. of morpholine in a dropwise manner, with stirring. The resulting solution was extracted with dilute hydrochloric acid, concentrated, and the residue dissolved in 200 ml. of boiling 90% methanol. The solution was decolorized with Norite activated charcoal and filtered and 25 ml. of water added. On cooling, the product precipitated and was recrystallized from a methanol-water mixture. Yield 4.0 g.; M.P. 129–130°.

*Example 3.—4-(β-bromoethyl)-3,3-diphenyl-1-ethyl-2-pyrrolidinone*

PROCEDURE B

A solution of 31.5 g. of the crude α-(1-ethyl-3-pyrrolidyl)-α,α-diphenylacetic acid hydrochloride and twenty ml. of phosphorus tribromide in seventy ml. of chloroform was refluxed for thirteen hours and concentrated in vacuo. The residue was crystallized from 90% methanol. M.P. 129–130°.

A mixture of the two samples, respectively prepared by Procedures A and B, also melted at 129–130°.

Example 4.—3,3-diphenyl-4-(2-iodoethyl)-1-isopropyl-2-pyrrolidinone

A mixture of 2.30 g. (0.0071 mole) of α,α-diphenyl-α-(1-isopropyl-3-pyrrolidyl)-acetic acid and 2.1 g. (0.014 mole) of sodium iodide was refluxed in 25 ml. dry methyl ethyl ketone and 1.0 ml. acetic anhydride added. Reflux was continued for thirty minutes and an additional 1.0 ml. acetic anhydride was added. After an additional one hour of reflux, the solvent was removed at reduced pressure and the residue was dissolved in 25 ml. of 95% alcohol. Chilling produced a white solid which was collected and recrystallized from 95% alcohol. Yield, 2.15 g. (70%); M.P. 143–146°. A mixture of this material with that prepared according to Example 5 showed no depression of melting point.

Example 5.—3,3-diphenyl-4-(2-iodoethyl)-1-isopropyl-2-pyrrolidinone

A mixture of 25.0 g. (0.073 mole) of 4-(2-chloroethyl)-3,3-diphenyl-1-isopropyl-2-pyrrolidinone and 12.5 g. (0.083 mole) of sodium iodide in 200 ml. of acetone was stirred and refluxed for eighteen hours. About three-fourths of the acetone was distilled off and 400 ml. of water was added slowly to the cooled mixture. The solid which formed was separated and recrystallized from 400 ml. of 95% alcohol. Yield, 24.9 g. (79%); M.P. 144–147.5°.

*Analysis.*—Calc'd for $C_{21}H_{24}INO$: N, 3.23. Found: N, 3.28.

Additional illustrative examples of the general method and procedure for preparation of the acid (VI) and use thereof (with isolation) in preparation of the corresponding mixed anhydride, i.e., the acyl halide, (VII) and rearrangement of the acyl halide to the 4-omega-haloalkyl-2-pyrrolidinone (IX) are as follows (see also Example 13).

Example 6.—α,α-Diphenyl-α-(1-isopropyl-3-pyrrolidyl)-acetic acid

A mixture of 36 g. (0.12 mole) of α,α-diphenyl-α-(1-isopropyl-3-pyrrolidyl)-acetonitrile in 120 g. of 70% sulfuric acid was heated at 128–134° for 64 hours. The hot solution was poured onto 100 g. of ice and this mixture was made strongly basic with 50% sodium hydroxide. The water was removed at reduced pressure and the residue was extracted with two 250 ml. portions of boiling absolute alcohol. The alcoholic extracts were dried at reduced pressure and the combined residue dissolved in 400 ml. of water and glacial acetic acid added until no more precipitate formed. The precipitated solid was collected and dried. Yield, 34.1 g. (88%). The material was recrystallized from dimethylformamide. M.P. 248–250° (dec.).

*Analysis.*—Calc'd for $C_{21}H_{25}NO_2$: C, 77.98; H, 7.79; N, 4.33. Found: C, 77.79; H, 7.99; N, 4.13.

Example 7.—α-(1-ethyl-3-pyrrolidyl)-α,α-diphenylacetic acid and 4-(β-chloroethyl)-1-ethyl-3,3-diphenyl-2-pyrrolidinone α-(1-ethyl-3-pyrrolidyl)-α,α-diphenylacetic acid was prepared by the hydrolysis of α-(1-ethyl-3-pyrrolidyl)-α,α-diphenylacetonitrile in 70% sulfuric acid at 130–140° for 48 hours. The free acid was isolated and crystallized from an ethanol-benzene mixture. M.P. 136–139° (decomposition).

*Analysis.*—Calc'd for $C_{20}H_{23}NO_2$: C, 77.64; H, 7.49. Found: C, 77.41; H, 7.33.

A suspension of 2.5 g. (0.0081 mole) of this acid in 100 ml. of dry chloroform was treated with dry hydrogen chloride gas until solution was complete; two ml. of thionyl chloride was added and the mixture was refluxed for two hours and concentrated in vacuo. The residue was crystallized from isopropyl ether. Yield 2 g.; M.P. 118–120°.

*Analysis.*—Calc'd for $C_{20}H_{22}ClNO$: C, 73.27; H, 6.76; N, 4.27; Cl, 10.82. Found: C, 73.50; H, 6.82; N, 4.38; Cl, 10.68.

In the manner of the preceding examples, but starting with the appropriate acetonitrile (IV) shown in Preparation 1 or in Table I, or the corresponding acid (VI) or intermediate amide (V) hydrolysis product, the following 4-omega-haloalkyl-2-pyrrolidinones are prepared, the halo substituent varying with the acid halide employed or the halogen ion extraneously introduced into the reaction:

4-(β-chloroethyl)-3-allyl-3-phenyl-1-isopropyl-2-pyrrolidinone
4-(β-chloroethyl)-3,3-dicyclohexyl-1-allyl-2-pyrrolidinone
4-(β-chloroethyl)-3,3-dimethyl-1-phenyl-2-pyrrolidinone
4-(β-chloroethyl)-3-benzyl-3-phenyl-1-isopropyl-2-pyrrolidinone
4-(β-chloroethyl)-3-phenyl-3-(1-isopropyl-3-pyrrolidyl)-1-isopropyl-2-pyrrolidinone
4-(β-chloroethyl)-3-phenyl-3-(2- or 3-thienyl)-1-isopropyl-2-pyrrolidinone
4-(β-chloroethyl)-3-phenyl-3-(2- or 3-thenyl)-1-isopropyl-2-pyrrolidinone
4-(β-chloroethyl)-3-phenyl-3-(p-methoxyphenyl)-1-isopropyl-2-pyrrolidinone
4-(β-chloroethyl)-3-phenyl-3-(m-chlorophenyl)-1-isopropyl-2-pyrrolidinone
4-(β-chloroethyl)-3-phenyl-3-(o-methylphenyl)-1-isopropyl-2-pyrrolidinone
4-(β-chloroethyl)-3-methyl-3-cyclopentyl-1-isopropyl-2-pyrrolidinone
4-(β-chloropropyl)-3,3-diphenyl-1-isopropyl-2-pyrrolidinone
4-(β-bromopropyl)-3,3-diphenyl-1-isopropyl-2-pyrrolidinone
4-(β-chloroethyl)-4-methyl-3,3-diphenyl-1-isopropyl-2-pyrrolidinone
4-(β-chloroethyl)-5-methyl-3,3-diphenyl-1-isopropyl-2-pyrrolidinone
4-(gamma-chloropropyl)-3-phenyl-3-(2'-piperidyl)-1-methyl-2-pyrrolidinone
4-(gamma-chloropropyl)-3-phenyl-3-[4'-(N-methylpiperidyl)]-1-isopropyl-2-pyrrolidinone
4-(β-chloroethyl)-3,3-diphenyl-1-methyl-2-pyrrolidinone
4-(β-chloroethyl)-3,3-diphenyl-1-ethyl-2-pyrrolidinone
4-(γ-chloro-2'-propyl)-3,3-diphenyl-1-isopropyl-2-pyrrolidinone
4-(β-chloroethyl)-3,3-diphenyl-1-isobutyl-2-pyrrolidinone
4-(β-chloroethyl)-3,3-diphenyl-1-cyclohexyl-2-pyrrolidinone
4-(β-chloroethyl)-3,3-diphenyl-1-benzyl-2-pyrrolidinone
4-(β-chloroethyl)-3-phenyl-3-(2-pyridyl)-1-benzyl-2-pyrrolidinone
4-(β-chloroethyl)-3-phenyl-3-(2-pyridyl)-1-isobutyl-2-pyrrolidinone
4-(β-chloroethyl)-3-phenyl-3-(2-pyridyl)-1-cyclohexyl-2-pyrrolidinone
4-(β-chloroethyl)-3-phenyl-3-(2-pyridyl)-1-n-butyl-2-pyrrolidinone
4-(β-chloroethyl)-3-phenyl-3-(2-pyridyl)-1-isopropyl-2-pyrrolidinone
4-(β-chloroethyl)-3-phenyl-3-(2-pyridyl)-1-ethyl-2-pyrrolidinone
4-(β-chloroethyl)-3-phenyl-3-(2-pyridyl)-1-methyl-2-pyrrolidinone
4-(β-chloroethyl)-3-(p-methoxyphenyl)-3-(2-pyridyl)-1-methyl-2-pyrrolidinone
4-(β-chloroethyl)-3-(p-methoxyphenyl)-3-(2-pyridyl)-1-ethyl-2-pyrrolidinone
4-(β-chloroethyl)-3-(p-methoxyphenyl)-3-(2-pyridyl)-1-isopropyl-2-pyrrolidinone
4-(β-chloroethyl)-3-isopropyl-3-phenyl-1-ethyl-2-pyrrolidinone 4-(β-chloroethyl)-1,3-diisopropyl-3-phenyl-2-pyrrolidinone
4-(β-chloroethyl)-3-methyl-3-phenyl-1-isopropyl-2-pyrrolidinone
4-(β-chloroethyl)-3-cyclopentyl-3-phenyl-1-isopropyl-2-pyrrolidinone
4-(β-chloroethyl)-3-cyclohexyl-3-phenyl-1-isopropyl-2-pyrrolidinone
4-(Δ-chloro-2'-butyl)-3,3-diphenyl-1-isopropyl-2-pyrrolidinone
4-(γ-chlorobutyl)-3,3-diphenyl-1-isopropyl-2-pyrrolidinone
4-(γ-chloro-β-methylpropyl)-3,3-diphenyl-1-isopropyl-2-pyrrolidinone, the last three compounds being produced by reacting the corresponding hydroxy compounds with the selected thionyl halide according to Example 29, as are the sixteenth and seventeenth compounds in the foregoing list.

While most of the foregoing products represent the omega-haloalkyl compounds (IX) produced using thionyl chloride or phosphorous trichloride, the corresponding 4-omega-bromo compounds are produced when employing thionyl bromide or phosphorus tribromide, and corresponding iodides are produced when employing sodium iodide in an acetic anhydride medium.

In some cases, the nitrile (IV) hydrolysis, as above-described, stops short of the acetic acid (VI) stage and rather produces, at least to a major extent, the corresponding α-(1-substituted-3-pyrrolidyl)-α,α-disubstituted-acetamide (V). In other cases, production of the acetamide (V) may be effected by use of more concentrated solutions of acid, e.g., 80–100%, and sometimes even as low as 70%, or a lower temperature, thereby to effect only partial hydrolysis of the starting acetonitrile (IV) to the acetamide (V) rather than to the acid (VI). In such cases, the desired acid may be obtained from the amide by treating a lower aliphatic acid, e.g., acetic acid, solution of the acetamide (V) with a strong anhydrous mineral acid, preferably hydrochloric acid, together with a suitable source of nitrous acid such as an alkyl nitrite, e.g., n-butyl nitrite or iso-amyl nitrite. The alkyl nitrite is preferably introduced slowly into the solution of the acetamide with stirring, whereafter the solution is allowed to continue to react for an extended period of up to about 24 hours. Preferably, the solution is allowed to stand at temperatures up to about room temperature for a period of up to about twenty hours, and thereafter at higher temperatures, e.g., up to about 100 degrees centigrade, for a short period to complete hydrolysis to the acid. The resulting acid (VI) may then be isolated in the usual manner, as indicated in the foregoing, or by adding aqueous alkali, e.g., ten percent NaOH, to the hydrolysis reaction mixture to cause neutralization thereof, and thereafter precipitating the solid acid as by acidification of the neutralized solution with a weak acid, such as acetic acid or the like. The acid (VI) may, however, be converted with or without isolation, as indicated previously, to the corresponding acyl halide or other mixed anhydride, which in turn is rearranged (respectively without or with extraneous halogen ion) to the corresponding 4-haloalkyl-2-pyrrolidinone. The preparation of the 4-haloalkyl-2-pyrrolidinone directly from the acetamide (V) without isolation of the intermediate acid (VI) is illustrated by the following representative example:

*Example 8.—4-(β-chloroethyl)-3-cyclopentyl-1-isopropyl-3-phenyl-2-pyrrolidinone*

A solution of 73 g. (0.232 mole) of α-(1-isopropyl-3-pyrrolidyl)-α-cyclopentyl-α-phenylacetamide in 200 ml. of glacial acetic acid was saturated with anhydrous hydrogen chloride and 47.9 g. (0.464 mole) of n-butyl nitrite was added slowly below the surface over a two-hour period while the solution was being stirred. The temperature of the mixture was controlled at 26–30° during the addition, and then at room temperature for fifteen hours (overnight) and then at 100° for three hours. The mixture was concentrated in vacuo and dissolved in 100 ml. of chloroform. The chloroform solution was washed with water and concentrated, and the residue refluxed in 500 ml. of thionyl chloride for two hours. The excess thionyl chloride was removed in vacuo, the residue dissolved in chloroform, and the resulting solution washed with water, dried over sodium sulfate and concentrated. The residue was distilled. B.P. 178–180°/0.03 mm. Distillate was crystallized from ligroin (B.P. 65–110°). Yield 57.3 g. (74%); M.P. 74.5–77.5°.

4 - (β - chloroethyl) - 1,3 - di - isopropyl - 3 - phenyl-2-pyrrolidinone and 4 - (β - chloroethyl) - 3 - cyclohexyl-1-isopropyl-3-phenyl-2-pyrrolidinone were prepared in the manner of Example 8 from α-(1-isopropyl-3-pyrrolidyl)-α-phenyl-α-isopropylacetamide and α-(1-isopropyl-3-pyrrolidyl)-α-cyclohexyl-α-phenylacetamide, respectively.

Although in going from the acetonitrile (IV) to the acid (VI) the acetamide (V) is an obvious and constant intermediate, it is seldom intentionally isolated in practice. However, its isolation is sometimes of advantage, as where hydrolysis under the conditions required to produce the acetic acid (VI) are such as may cause at least partial decarboxylation of the acid with resulting low yields thereof. An example of the preparation and isolation of an α,α,α-trisubstituted acetamide follows:

*Example 9.—α-Cyclopentyl-α-(1-isopropyl-3-pyrrolidyl)-α-phenylacetamide*

A solution of 150 g. (0.507 mole) of α-cyclopentyl-α-(1-isopropyl-3-pyrrolidyl)-α-phenylacetonitrile in 800 g. of 70% sulfuric acid was heated at 147° for 48 hours. The solution was poured onto ice, made basic with 50% sodium hydroxide and extracted with chloroform. The chloroform extract was washed with water, dried over sodium sulfate and concentrated. The residue was distilled in vacuo. Yield 105 g. (66%); B.P. 221–225°/0.20 mm.

*Analysis.*—Calc'd for $C_{20}H_{30}N_2O$: C, 76.38; H, 9.62; N, 8.91. Found: C, 73.77; H, 9.39; N, 9.58.

*Example 10.—Additional amides*

Other representative amides, prepared and isolated in the manner of Example 9 and purified by cooling, basifying, and extracting, washing, drying and concentrating in conventional manner, are as follows:

α-Isopropyl-α-(1-isopropyl-3-pyrrolidyl)-α-phenylacetamide B.P. 175–180° C. at 0.05 mm. Hg pressure.
α-Cyclohexyl-α-(1-isopropyl-3-pyrrolidyl)-α-phenylacetamide, B.P. 208–216° C. at 0.14 mm. Hg pressure.
α,α-Diphenyl-α-(1-methyl-3-pyrrolidyl)-acetamide, M.P. 154–155° C.
α,α-Diphenyl-α-(1-ethyl-3-pyrrolidyl)-acetamide, M.P. 141–142° C.
α,α-Diphenyl-α-(1-isopropyl-3-pyrrolidyl)-acetamide, M.P. 141.5–142° C.
α-(1-cyclohexyl-3-pyrrolidyl)-α,α-diphenylacetamide, M.P. 119–122° C.
α-(1-ethyl-3-pyrrolidyl)-α-phenyl-α-(2-pyridyl)-acetamide, M.P. 160–161° C.
α-(1-methyl-3-pyrrolidyl)-α-phenyl-α-(2-pyridyl)-acetamide, M.P. 150–153° C.
α-(1-isopropyl-3-pyrrolidyl)-α-phenyl-α-(2-pyridyl)-acetamide, M.P. 127.5–133° C.
α-(1-n-butyl-3-pyrrolidyl)-α-phenyl-α-(2-pyridyl)-acetamide, M.P. 108–111° C.

All of the foregoing acetamides (V) may be used as isolated in the preparation of the corresponding 4-haloalkyl-2-pyrrolidinone without purification.

The physical constants of some representative 4-(omega-haloalkyl)-2-pyrrolidinones, made from the acetonitrile (IV) via the amide (V), acid (VI) and via rearrangement of acyl halide (VII), with or without isolation of the intermediate acetamide (V) and/or acetic acid (VI), or by introduction of extraneous halogen ion into the reaction mixture at the mixed anhydride (VIIB–VIII) stage, or as otherwise fully disclosed hereinafter, are shown in Table II, the gamma-halopropyl compounds being made in accord with the discussion in column 29 particularly in accord with Example 29.

*Example 11.—3,3-diphenyl-4-(2-hydroxyethyl)-1-isopropyl-2-pyrrolidinone*

A solution of 34 g. (0.093 mole) of 4-(2-acetoxyethyl)-3,3-diphenyl-1-isopropyl-2-pyrrolidinone and four g. (0.1 mole) of sodium hydroxide in 450 ml. of ethanol and ten ml. of water was stirred and refluxed for one hour and

*Table II*

REPRESENTATIVE 4-(OMEGA-HALOALKYL)-2-PYRROLIDINONES [1]

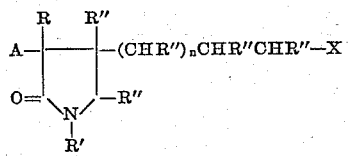

| R' | R | A | X | n | M.P. (B.P.), °C. | C Calcd. Found | H Calcd. Found | N Calcd. Found | Misc. Calcd. Found |
|---|---|---|---|---|---|---|---|---|---|
| $CH_3$ | $C_6H_5$ | $C_6H_5$ | Cl | 0 | 140–1 | 72.71 / 72.87 | 6.42 / 6.44 | 4.46 / 4.48 | Cl, 11.30 / 11.05 |
| $C_2H_5$ | $C_6H_5$ | $C_6H_5$ | Cl | 0 | 117–9 | 73.27 / 73.50 | 6.76 / 6.82 | 4.27 / 4.35 | Cl, 10.82 / 10.68 |
| $C_2H_5$ | $C_6H_5$ | $C_6H_5$ | Br | 0 | 129–30 | 64.52 / 64.26 | 5.96 / 5.99 | 3.76 / 3.96 | Br, 21.47 / 21.39 |
| i-$C_3H_7$ | $C_6H_5$ | $C_6H_5$ | Cl | 0 | 106–8 | 73.77 / 73.52 | 7.08 / 6.79 | 4.10 / 4.16 | Cl, 10.37 / 10.10 |
| i-$C_3H_7$ | $C_6H_5$ | $CH_3$ | Cl | 0 | 102–4 | 68.67 / 68.84 | 7.93 / 7.73 | 5.01 / 5.16 | Cl, 12.67 / 12.39 |
| i-$C_3H_7$ | i-$C_3H_7$ | $C_6H_5$ | Cl | 0 | 95–6 | 70.22 / 70.19 | 8.51 / 8.41 | 4.55 / 4.62 | Cl, 11.52 / 11.29 |
| i-$C_3H_7$ | $C_6H_5$ | $C_5H_9$ | Cl | 0 | 74.5–75 | 71.93 / 72.15 | 8.45 / 8.16 | 4.20 / 4.21 | |
| i-$C_3H_7$ | $C_6H_{11}$ | $C_6H_5$ | Cl | 0 | 109–11 | 72.49 / 72.54 | 8.69 / 8.68 | 4.03 / 4.17 | |
| i-$C_4H_9$ | $C_6H_5$ | $C_6H_5$ | Cl | 0 | 113.5–4.5 | 74.24 / 74.37 | 7.36 / 7.45 | 3.94 / 3.98 | Cl, 9.96 / 9.78 |
| cy-$C_6H_{11}$ | $C_6H_5$ | $C_6H_5$ | Cl | 0 | 151–2 | 75.47 / 75.50 | 7.39 / 7.86 | 3.67 / 3.82 | Cl, 9.28 / 9.05 |
| $C_6H_5CH_2$ | $C_6H_5$ | $C_6H_5$ | Cl | 0 | 110 | 77.05 / 77.28 | 6.18 / 5.99 | 3.59 / 3.69 | Cl, 9.10 / 8.95 |
| i-$C_3H_7$ | $C_6H_5$ | $C_6H_5$ | I | 0 | 147–149 | 58.20 / 58.05 | 5.58 / 5.37 | | I, 29.29 / 29.04 |
| i-$C_3H_7$ | $C_6H_5$ | $C_6H_5$ | Cl | 1 | 85–86.5 | 74.24 / 74.51 | 7.36 / 7.37 | 3.94 / 4.03 | Cl, 9.96 / 10.01 |
| $C_2H_5$ | $C_6H_5$ | 3-pyridyl | Cl | 0 | 100–103 | 69.39 / 69.31 | 6.44 / 6.28 | | |
| | | | | | | | | | Side-chain |
| $C_2H_5$ | $C_6H_5$ | $C_6H_5$ | Cl | 0 | 150–153 | 73.77 / 73.92 | 7.08 / 6.92 | 4.10 / 4.34 | —$CHCH_3CH_2$— |
| $C_2H_5$ | $C_6H_5$ | $C_6H_5$ | Cl | 0 | 141–142 | 73.77 / 73.60 | 7.08 / 7.31 | 4.10 / 4.23 | —$CH_2CHCH_3$— |

[1] R'' equals H, except last two compounds where one R'' equals $CH_3$.

As indicated in the foregoing discussion and Chart 2, the 4-(omega-haloalkyl)-2-pyrrolidinones are convertible into numerous other corresponding 4-(omega-substituted alkyl)-2-pyrrolidinones. The various omega substituents are generally introduced into the 4-alkyl group of the 2-pyrrolidinone by displacement of the omega halogen with an appropriate basic residue. These reactions are generally carried out by heating an alkali metal, e.g., sodium, salt of an alcohol, phenol, inorganic acid, or organic acid with the 1,3,3-trisubstituted-4-(omega-haloalkyl)-2-pyrrolidinone in an appropriate solvent followed by a conventional isolation of the product.

The 4-omega-hydroxyalkyl compounds may be prepared by direct hydrolysis of the corresponding omega-haloalkyl compound according to conventional basic hydrolysis procedure, but yields are less than optimum and it is therefore preferred to convert the haloalkyl compound to an acyloxy, e.g., lower-alkanoyloxy such as acetoxy, compound and thereafter hydrolyze according to conventional basic hydrolysis procedure to the hydroxy group, which has the advantage of excellent yields.

The 4-(β-hydroxyethyl) derivatives were, for example, prepared by hydrolyzing the acetates with aqueous sodium hydroxide as per the following example.

concentrated in vacuo. The residue was partitioned between chloroform and water and the chloroform layer was washed with water, dried over anhydrous sodium sulfate and concentrated in vacuo. The residue crystallized and was recrystallized from aqueous ethanol. Yield 22 g. (73%); M.P. 180–182° C.

The 4-(omega-acyloxy alkyl)-2-pyrrolidinone compounds are prepared either from the selected 4-(omega-haloalkyl)-2-pyrrolidinone by the conventional displacement route, as with an appropriate alkali metal salt of the selected acid, e.g., a sodium alkanoate such as sodium acetate or the like, preferably in dimethylformamide solvent, according to standard procedure, as indicated by Example 12, or by the direct route involving acylation of the starting acetic acid (VI) with the appropriate acid anhydride to produce the mixed anhydride, in this case the acylate, and then continuing the reaction in the presence of suitable solvent, e.g., more of the acid anhydride, with heating to cause rearrangement thereof to the desired 4-(omega-acyloxyalkyl)-2-pyrrolidinone. In this case, referring to Chart 3, the symbols Y and Q are the same, both being the acylate radical. The direct acylation reaction via rearrangement of the acylate of the acid (VI) is illustrated by Example 13.

*Example 12.—4-(2-acetoxyethyl)-3,3-diphenyl-1-isopropyl-2-pyrrolidinone*

A mixture of eighteen g. (0.22 mole) of sodium acetate and seventy g. (0.205 mole) of 4-(2-chloroethyl)-3,3-diphenyl-1-isopropyl-2-pyrrolidinone in 500 ml. of dimethylformamide was stirred and refluxed for fifteen hours, partitioned between 500 ml. of water and 500 ml. of chloroform, and the layers separated. The chloroform layer was washed with water, dried over anhydrous sodium sulfate and concentrated in vacuo, and the residue crystallized from 85% aqueous methanol. Yield 54 g. (72%); M.P. 91–94°.

*Example 13.—4-(2-acetoxyethyl)-3,3-diphenyl-1-isopropyl-2-pyrrolidinone*

A mixture of 2.50 g. (0.0077 mole) of α,α-diphenyl-α-(1-isopropyl-3-pyrrolidyl)-acetic acid and twenty ml. acetic anhydride was refluxed five hours. Water (60 ml.) was then added cautiously and an oil separated which crystallized on cooling. The solid was collected and recrystallized from methanol and water (2:1). Yield, 1.65 g. (59%); M.P. 92–94.5°. A mixture melting point with an authentic sample was undepressed.

The 4-(omega-mercaptoalkyl)-2-pyrrolidinones are prepared by the conventional halogen displacement reaction using an alkali metal hydrogen sulfide, in accord with the manner of Example 14.

*Example 14.—3,3-diphenyl-1-isopropyl-4-(2-mercaptoethyl)-2-pyrrolidinone*

A solution of 16.2 g. (0.176 mole) of sodium hydrogen sulfide dihydrate and thirty g. (0.088 mole) of 4-(2-chloroethyl)-3,3-diphenyl-1-isopropyl-2-pyrrolidinone in 400 ml. of 85% ethanol was refluxed for seven hours and concentrated in vacuo. The residue was partitioned between chloroform and water and the chloroform layer dried over anhydrous sodium sulfate and concentrated in vacuo. The residue was distilled. Yield seventeen g. (57%); B.P. 220–230°/0.05 mm. The distillate was crystallized from an ethanol-water mixture, M.P. 104–107°.

The 4-(omega-lower-alkylmercaptoalkyl)-2-pyrrolidinones are preparable in a variety of ways. They may be prepared, for example, by alkylation of the corresponding mercaptoalkyl compound in conventional manner, as with an alkyl halide under basic conditions, as shown in Example 15. Alternatively, they may be prepared by reacting the corresponding 4-(omega-haloalkyl)-2-pyrrolidinone with a lower-alkyl mercaptan.

Preparation of the 4-(β-alkylmercaptoethyl) derivatives from the 4-(β-mercaptoethyl) derivatives by alkylation with an alkyl, e.g., methyl bromide is illustrated by the following Example 15.

*Example 15.—3,3-diphenyl-1-isopropyl-4-(2-methylmercaptoethyl)-2-pyrrolidinone*

A solution of 11.5 g. (0.12 mole) of methyl bromide in 200 ml. of absolute ethanol was added to a solution of twenty g. (0.059 mole) of 3,3-diphenyl-1-isopropyl-4-(2-mercaptoethyl)-2-pyrrolidinone in 200 ml. of absolute ethanol in which 1.5 g. (0.065 gram atom) of sodium had been dissolved. The solution was stirred at room temperature for four hours and concentrated in vacuo and the residue was partitioned between water and chloroform. The chloroform was concentrated in vacuo and the residue was crystallized from 70% ethanol. Yield 20 g. (96%); M.P. 123–125°.

The 4-(omega-ether substituted)-2-pyrrolidinones, e.g., the lower-alkoxy, phenoxy, benzyloxy, and like compounds, are prepared from the corresponding 4-haloalkyl compounds by conventional replacement of the halogen atom using an alkali metal alcoholate or an alkali metal, e.g., sodium, solution of the selected alcohol, the alcohol or alcohol moiety in either case corresponding to the group desired to appear in the omega position of the 4-alkyl group. Some representative ether formations are illustrated by Examples 16 and 17.

*Example 16.—3,3-diphenyl-1-isopropyl-4-(β-methoxyethyl)-2-pyrrolidinone*

A solution of 34 g. (0.1 mole) of 4-(2-chloroethyl)-3,3-diphenyl-1-isopropyl-2-pyrrolidinone in 150 ml. of absolute methanol was added to fifty ml. of absolute methanol in which 2.5 g. (0.11 gram atom) of sodium had been dissolved. The solution was heated in a closed system for sixteen hours at 140°. Addition of fifty ml. of water to the resulting mixture yielded 27.5 g. (81%) of material which was recrystallized from a methanol-water mixture. M.P. 105–106°.

3,3-diphenyl-1-isobutyl-4-(β-methoxyethyl)-2-pyrrolidinone was prepared in the manner of Example 16 from 4 - (2 - chloroethyl) - 3,3 - diphenyl-1-isobutyl-2-pyrrolidinone and sodium methoxide.

*Example 17.—3,3-diphenyl-1-isopropyl-4-(β-phenoxyethyl)-2-pyrrolidinone*

Sodium phenoxide was formed by adding a solution of 8.3 g. (0.088 mole) of phenol in 100 ml. of absolute ethanol to 200 ml. of absolute ethanol in which had been dissolved two g. (0.088 gram atom) of sodium metal, and thirty g. (0.088 mole) of 4-(2-chloroethyl)-3,3-diphenyl-1-isopropyl-2-pyrrolidinone in 100 ml. of absolute ethanol was added. The resulting solution was refluxed for seven hours and concentrated in vacuo and the residue was partitioned between water and chloroform. The chloroform layer was dried with anhydrous sodium sulfate and concentrated in vacuo and the residue crystallized from an ethanol-water mixture. Yield 17 g. (48.5%); M.P. 104–106°.

3,3-diphenyl - 1 - isopropyl-4-[β-(o-methoxyphenoxy)ethyl]-2-pyrrolidinone was prepared in the manner of Example 17 from 4-(β-chloroethyl)-3,3-diphenyl-1-isopropyl-2-pyrrolidinone and the sodium salt of guaiacol, and the 3,3-diphenyl-1-isopropyl-4-(β-benzyloxyethyl)-2-pyrrolidinone is prepared in identical manner from 4-(β-chloroethyl)-3,3-diphenyl-1-isopropyl-2-pyrrolidinone and sodium benzyloxide.

The 4-alkyl derivatives, that is, those compounds in which the omega substituent is hydrogen, are prepared by reducing the corresponding 4-omega-haloalkyl compound using a metal-acid combination according to the following example, indicating a further use of some of the compounds of the present invention.

*Example 18.—3,3-diphenyl-4-ethyl-1-isopropyl-2-pyrrolidinone*

A solution of 25 g. (0.073 mole) of 4-(2-chloroethyl)-3,3-diphenyl-1-isopropyl-2-pyrrolidinone, 25 g. of potassium bromide and sixty ml. of 48% hydrobromic acid in 250 ml. of acetic acid was stirred and refluxed for two hours followed by addition of sixty g. of zinc dust in small portions. Another sixty ml. of 48% hydrobromic acid was added dropwise over a two-hour period to the refluxing solution and it was allowed to stand overnight at room temperature and filtered. The filtrate was concentrated in vacuo and the residue was partitioned between chloroform and dilute sodium hydroxide. The chloroform layer was separated, dried over anhydrous sodium sulfate and concentrated, and the residue was crystallized from 80% aqueous ethanol. Yield nine g. (40%); M.P. 95–97°.

3,3-diphenyl-4-ethyl-1-isobutyl - 2 - pyrrolidinone, M.P. 94–96.5°, was prepared in the manner of Example 18 from the corresponding 4-(β-chloroethyl) compound.

In the manner of the preceding discussion and particularly in accord with Example 11, or by direct hydrolysis of the corresponding 4-omega-haloalkyl-2-pyrrolidinone according to conventional basic hydrolysis procedure, the following omega-hydroxyalkyl compounds are prepared from the 41 omega-chloroalkyl compounds previously given, which are in turn prepared according to the procedure of Examples 1, 2, 3, 4, 5 and 7.

4-($\beta$-hydroxyethyl)-3-allyl-3-phenyl-1-isopropyl-2-pyrrolidinone
4-($\beta$-hydroxyethyl)-3,3-dicyclohexyl-1-allyl-2-pyrrolidinone
4-($\beta$-hydroxyethyl)-3,3-dimethyl-1-phenyl-2-pyrrolidinone
4-($\beta$-hydroxyethyl)-3-benzyl-3-phenyl-1-isopropyl-2-pyrrolidinone
4-($\beta$-hydroxyethyl)-3-phenyl-3-(1-isopropyl-3-pyrrolidyl)-1-isopropyl-2-pyrrolidinone
4-($\beta$-hydroxyethyl)-3-phenyl-3-(2- or 3-thienyl)-1-isopropyl-2-pyrrolidinone
4-($\beta$-hydroxyethyl)-3-phenyl-3-(2- or 3-thenyl)-1-isopropyl-2-pyrrolidinone
4-($\beta$-hydroxyethyl)-3-phenyl-3-(p-methoxyphenyl)-1-isopropyl-2-pyrrolidinone
4-($\beta$-hydroxyethyl)-3-phenyl-3-(m-chlorophenyl)-1-isopropyl-2-pyrrolidinone
4-($\beta$-hydroxyethyl)-3-phenyl-3-(o-methylphenyl)-1-isopropyl-2-pyrrolidinone
4-($\beta$-hydroxyethyl)-3-methyl-3-cyclopentyl-1-isopropyl-2-pyrrolidinone
4-($\beta$-hydroxypropyl)-3,3-diphenyl-1-isopropyl-2-pyrrolidinone
4-($\beta$-hydroxyethyl)-4-methyl-3,3-diphenyl-1-isopropyl-2-pyrrolidinone
4-($\beta$-hydroxyethyl)-5-methyl-3,3-diphenyl-1-isopropyl-2-pyrrolidinone
4-($\gamma$-hydroxypropyl)-3-phenyl-3-(2'-piperidyl)-1-methyl-2-pyrrolidinone
4-($\gamma$-hydroxypropyl)-3-phenyl-3-[4'-(N-methylpiperidyl)]-1-isopropyl-2-pyrrolidinone
4-($\beta$-hydroxyethyl)-3,3-diphenyl-1-methyl-2-pyrrolidinone
4-($\beta$-hydroxyethyl)-3,3-diphenyl-1-ethyl-2-pyrrolidinone
4-($\gamma$-hydroxy-2'-propyl)-3,3-diphenyl-1-isopropyl-2-pyrrolidinone
4-($\beta$-hydroxyethyl)-3,3-diphenyl-1-isobutyl-2-pyrrolidinone
4-($\beta$-hydroxyethyl)-3,3-diphenyl-1-cyclohexyl-2-pyrrolidinone
4-($\beta$-hydroxyethyl)-3,3-diphenyl-1-benzyl-2-pyrrolidinone
4-($\beta$-hydroxyethyl)-3-phenyl-3-(2-pyridyl)-1-benzyl-2-pyrrolidinone
4-($\beta$-hydroxyethyl)-3-phenyl-3-(2-pyridyl)-1-isobutyl-2-pyrrolidinone
4-($\beta$-hydroxyethyl)-3-phenyl-3-(2-pyridyl)-1-cyclohexyl-2-pyrrolidinone
4-($\beta$-hydroxyethyl)-3-phenyl-3-(2-pyridyl)-1-n-butyl-2-pyrrolidinone
4-($\beta$-hydroxyethyl)-3-phenyl-3-(2-pyridyl)-1-isopropyl-2-pyrrolidinone
4-($\beta$-hydroxyethyl)-3-phenyl-3-(2-pyridyl)-1-ethyl-2-pyrrolidinone
4-($\beta$-hydroxyethyl)-3-phenyl-3-(2-pyridyl)-1-methyl-2-pyrrolidinone
4-($\beta$-hydroxyethyl)-3-(p-methoxyphenyl)-3-(2-pyridyl)-1-methyl-2-pyrrolidinone
4-($\beta$-hydroxyethyl)-3-(p-methoxyphenyl)-3-(2-pyridyl)-1-ethyl-2-pyrrolidinone
4-($\beta$-hydroxyethyl)-3-(p-methoxyphenyl)-3-(2-pyridyl)-1-isopropyl-2-pyrrolidinone
4-($\beta$-hydroxyethyl)-3-isopropyl-3-phenyl-1-ethyl-2-pyrrolidinone
4-($\beta$-hydroxyethyl)-1,3-di-isopropyl-3-phenyl-2-pyrrolidinone
4-($\beta$-hydroxyethyl)-3-methyl-3-phenyl-1-isopropyl-2-pyrrolidinone
4-($\beta$-hydroxyethyl)-3-cyclopentyl-3-phenyl-1-isopropyl-2-pyrrolidinone
4-($\beta$-hydroxyethyl)-3-cyclohexyl-3-phenyl-1-isopropyl-2-pyrrolidinone
4-($\Delta$-hydroxy-2'-butyl)-3,3-diphenyl-1-isopropyl-2-pyrrolidinone
4-($\gamma$-hydroxybutyl)-3,3-diphenyl-1-isopropyl-2-pyrrolidinone
4-($\gamma$-hydroxy-$\beta$-methylpropyl)-3,3-diphenyl-1-isopropyl-2-pyrrolidinone The third last and last compounds are prepared by reducing the corresponding chlorocarbonyl compound, produced as disclosed hereinafter, with sodium borohydride under usual reaction conditions for such reductions, while the second last compound is prepared by reaction of the corresponding 4-($\beta$-formylethyl) compound (prepared by reduction of the corresponding carbonyl chloride under usual conditions for such type reaction) with methyl magnesium bromide under usual Grignard reaction conditions.

While the foregoing products are representative of omega-hydroxyalkyl compounds produced from 4-omega-chloro compounds, the corresponding 4-omega-bromo compounds may also be used as starting materials, as may the corresponding iodides.

In the manner of the preceding discussion and in accord with Examples 12 through 17, starting with the appropriate 4-(omega-haloalkyl)-2-pyrrolidinone disclosed in the foregoing, the following 4-(omega-substituted alkyl)-2-pyrrolidinones are prepared, in which the substituent in the omega position is attached through an oxygen or sulfur atom:

4-($\beta$-acetoxyethyl)-3-allyl-3-phenyl-1-isopropyl-2-pyrrolidinone
4-($\beta$-propoxyethyl)-3,3-dicyclohexyl-1-allyl-2-pyrrolidinone
4-($\beta$-phenoxyethyl)-3,3-dimethyl-1-phenyl-2-pyrrolidinone
4-($\beta$-benzyloxyethyl)-3-benzyl-3-phenyl-1-isopropyl-2-pyrrolidinone
4-[$\beta$-(p-methylbenzyloxy)-ethyl]-3-phenyl-3-(1-isopropyl-3-pyrrolidyl)-1-isopropyl-2-pyrrolidinone
4-($\beta$-mercaptoethyl)-3-phenyl-3-(2- or 3-thienyl)-1-isopropyl-2-pyrrolidinone
4-($\beta$-phenoxyethyl)-3-phenyl-3-(2- or 3-thenyl)-1-isopropyl-2-pyrrolidinone
4-($\beta$-butoxyethyl)-3-phenyl-3-(p-methoxyphenyl)-1-isopropyl-2-pyrrolidinone
4-[$\beta$-(p-methoxyphenoxy)-ethyl]-3-phenyl-3-(m-chlorophenyl)-1-isopropyl-2-pyrrolidinone
4-($\beta$-acetoxyethyl)-3-phenyl-3-(o-methylphenyl)-1-isopropyl-2-pyrrolidinone
4-[$\beta$-(p-chlorobenzyloxy)-ethyl]-3-methyl-3-cyclopentyl-1-isopropyl-2-pyrrolidinone
4-($\beta$-methoxypropyl)-3,3-diphenyl-1-isopropyl-2-pyrrolidinone
4-($\beta$-acetoxypropyl)-3,3-diphenyl-1-isopropyl-2-pyrrolidinone
4-($\beta$-propionoxyethyl)-4-methyl-3,3-diphenyl-1-isopropyl-2-pyrrolidinone
4-($\beta$-isopropoxyethyl)-5-methyl-3,3-diphenyl-1-isopropyl-2-pyrrolidinone
4-(gamma-acetoxypropyl)-3-phenyl-3-(2'-piperidyl)-1-methyl-2-pyrrolidinone
4-(gamma-methoxypropyl)-3-phenyl-3-[4'-(N-methylpiperidyl)]-1-isopropyl-2-pyrrolidinone
4-($\beta$-isobutyroxyethyl)-3,3-diphenyl-1-methyl-2-pyrrolidinone
4-($\beta$-ethoxyethyl)3,3-diphenyl-1-ethyl-2-pyrrolidinone
4-($\gamma$-methoxy-2'-propyl)-3,3-diphenyl-1-isopropyl-2-pyrrolidinone
4-($\beta$-butyroxyethyl)-3,3-diphenyl-1-isobutyl-2-pyrrolidinone 4-(β-mercaptoethyl)-3,3-diphenyl-1-cyclohexyl)-2-pyrrolidinone
4-(β-benzyloxyethyl)-3,3-diphenyl-1-benzyl-2-pyrrolidinone
4-[β-(m-chlorophenoxy)-ethyl]-3-phenyl-3-(2-pyridyl)-1-benzyl-2-pyrrolidinone
4-(β-propoxyethyl-3-phenyl-3-(2-pyridyl-1)-isobutyl-2-pyrrolidinone
4-(β-octyloxyethyl)-3-phenyl-3-(2-pyridyl)-1-cyclohexyl-2-pyrrolidinone
4-(β-ethylmercaptoethyl)-3-phenyl-3-(2-pyridyl)-1-n-butyl-2-pyrrolidinone
4-[β-(o-methylphenoxy)-ethyl]-3-phenyl-3-(2-pyridyl)-1-isopropyl-2-pyrrolidinone
4-(β-valeroxyethyl)-3-phenyl-3-(2-pyridyl)-1-ethyl-2-pyrrolidinone 4-(Δ-acetoxy-2′-butyl)-3,3-diphenyl-1-isopropyl-2-pyrrolidinone
4-(γ-methoxybutyl)-3,3-diphenyl-1-isopropyl-2-pyrrolidinone
4-(γ-acetoxy-β-methylpropyl)-3,3-diphenyl-1-isopropyl-2-pyrrolidinone.

While the foregoing products are representative 4-(omega-substituted alkyl-2-pyrrolidinone compounds, produced by varying the halogen replacement reagent conventionally but in accord with Examples 12 through 17, numerous others may be prepared in the same manner and will be apparent to one skilled in the art.

The physical constants of some representative 4-(omega-substituted alkyl)-2-pyrrolidinones, wherein the omega substituent is attached through an oxygen or sulfur atom, are shown in Table III.

*Table III*

4-(OMEGA-SUBSTITUTED ALKYL)-2-PYRROLIDINONES [1]

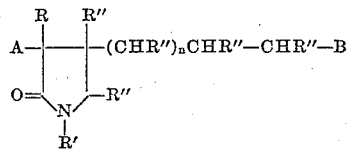

| R′ | R | A | B | n | M.P. (B.P.), °C. | C Calcd. Found | H Calcd. Found | N Calcd. Found | Misc. Calcd. Found |
|---|---|---|---|---|---|---|---|---|---|
| i-C$_3$H$_7$ | C$_6$H$_5$ | C$_6$H$_5$ | O—C(=O)—CH$_3$ | 0 | 91–4 | 75.58 / 75.75 | 7.45 / 7.32 | 3.83 / 3.90 | |
| i-C$_3$H$_7$ | C$_6$H$_5$ | C$_6$H$_5$ | SH | 0 | 104–7 | 74.29 / 74.54 | 7.42 / 7.54 | 4.13 / 4.23 | S, 9.44 / 9.73 |
| i-C$_3$H$_7$ | C$_6$H$_5$ | C$_6$H$_5$ | S—CH$_3$ | 0 | 123–5 | 74.74 / 74.87 | 7.70 / 7.91 | 3.96 / 4.15 | S, 9.07 / 8.58 / 8.65 |
| i-C$_4$H$_9$ | C$_6$H$_5$ | C$_6$H$_5$ | O—CH$_3$ | 0 | 86.7 | 78.59 / 78.58 | 8.32 / 8.21 | 3.99 / 4.04 | |
| i-C$_3$H$_7$ | C$_6$H$_5$ | C$_6$H$_5$ | O—CH$_3$ | 0 | 105–6 | 78.30 / 78.10 | 8.07 / 7.90 | 4.15 / 4.17 | |
| i-C$_3$H$_7$ | C$_6$H$_5$ | C$_6$H$_5$ | O—C$_6$H$_5$ | 0 | 104–6 | 81.17 / 81.32 | 7.32 / 7.40 | 3.51 / 3.53 | |
| i-C$_3$H$_7$ | C$_6$H$_5$ | C$_6$H$_5$ | OH | 0 | 180–2 | 77.98 / 78.25 | 7.79 / 7.90 | 4.33 / 4.32 | |
| i-C$_3$H$_7$ | C$_6$H$_5$ | C$_6$H$_5$ | OH | 1 | 142–143 | 78.30 / 78.24 | 8.07 / 8.03 | 4.15 / 4.20 | |
| i-C$_3$H$_7$ | C$_6$H$_5$ | C$_6$H$_5$ | O—C$_6$H$_4$—OCH$_3$ | 0 | 135–7 | 78.29 / 78.03 | 7.28 / 7.50 | 3.26 / 3.42 | |
| i-C$_3$H$_7$ | C$_6$H$_5$ | C$_6$H$_5$ | —O—CO—(pyridyl) | 0 | 104–105 | 75.67 / 75.52 | 6.59 / 6.51 | 6.54 / 6.39 | |
| i-C$_3$H$_7$ | C$_6$H$_5$ | C$_6$H$_5$ | —O—CO—C$_6$H$_4$—OH | 0 | 111–112 | 75.82 / 75.65 | 6.59 / 6.57 | 3.16 / 3.25 | |

[1] B equals other than halogen or amino; attached through oxygen or sulfur at omega position; R″ equals hydrogen.

4-(β-phenoxyethyl)-3-phenyl-3-(2-pyridyl)-1-methyl-2-pyrrolidinone
4-(β-butylmercaptoethyl)-3-(p-methoxyphenyl)-3-(2-pyridyl)-1-methyl-2-pyrrolidinone
4-(β-ethylmercaptoethyl)-3-(p-methoxyphenyl)-3-(2-pyridyl)-1-ethyl-2-pyrrolidinone
4-[β-(p-methylphenoxy)-ethyl]-3-(p-methoxyphenyl)-3-(2-pyridyl)-1-isopropyl-2-pyrrolidinone
4-(β-benzyloxyethyl)-3-isopropyl-3-phenyl-1-ethyl-2-pyrrolidinone
4-(β-acetoxyethyl)-1,3-di-isopropyl-3-phenyl-2-pyrrolidinone
4-(β-mercaptoethyl)-3-methyl-3-phenyl-1-isopropyl-2-pyrrolidinone
4-(β-butylmercaptoethyl)-3-cyclopentyl-3-phenyl-1-isopropyl-2-pyrrolidinone
4-(β-benzyloxyethyl)-3-cyclohexyl-3-phenyl-1-isopropyl-2-pyrrolidinone The 4-(omega-cyanoalkyl)-2-pyrrolidinones are prepared in conventional manner by reaction of the selected 4-haloalkyl-2-pyrrolidinone with an alkali metal cyanide, e.g., sodium cyanide, usually by heating the reactants together in a suitable organic solvent, preferably dimethylformamide or the like. This procedure can be applied equally well to the 4-(β-haloalkyl) compounds and the 4-(γ-haloalkyl) compounds, in each case to introduce the cyano group in place of the halogen atom, and thus to extend the 4-alkyl carbon chain. A representative example of this procedure is given in Example 19.

*Example 19.*—3,3-diphenyl-1-isopropyl-2-pyrrolidinone-4-propionitrile

A mixture of 342 g. (1.0 mole) of 4-chloroethyl-3,3-diphenyl-1-isopropyl-2-pyrrolidinone and 75 g. (1.5 mole) of sodium cyanide in one liter of dimethylformamide was stirred and heated to a temperature of 100° over a one-hour period, and this temperature was maintained for an additional three hours. The mixture was poured into ice water and the precipitated white crystalline solid filtered and recrystallized from isopropanol. Yield, 288 g. (87%); M.P. 150–151°.

The 4-(omega-carboxyalkyl)-2-pyrrolidinones are prepared by conventional acid hydrolysis of the corresponding 4-(omega-cyanoalkyl)-2-pyrrolidinones, employing a concentrated mineral acid reagent in the same manner as previously given for hydrolysis of the nitrile (IV) to the acid (VI). A reaction period of 24 hours and a temperature not in excess of 100 degrees is usually adequate. The following Example 20 indicates the hydrolysis procedure employed.

*Example 20.—3,3-diphenyl-1-isopropyl-2-pyrrolidinone-4-propionic acid*

A mixture of 94 g. (0.28 mole) of 3,3-diphenyl-1-isopropyl-2-pyrrolidinone-4-propionitrile and 500 ml. of 70% sulfuric acid was stirred and heated at 80–90° for 24 hours and poured into ice and water. The precipitated solid was filtered and recrystallized from a chloroform-ligroin mixture. Yield, 93%; M.P. 175–176°.

The 4-(omega-carbalkoxyalkyl)-2-pyrrolidinones are prepared from the 4-(omega-carboxyalkyl)-2-pyrrolidinones by standard esterification procedure involving the acid and the selected alcohol in the presence of a suitable esterification catalyst, e.g., hydrogen chloride, sulfuric acid, cation exchange resins, or an aromatic sulfonic acid such as benzene or p-toluene sulfonic acid, preferably with removal of either the ester product or water of reaction if optimum yields are desired. Alternatively, the acid may be reacted with a diazoalkane, e.g., diazomethane, in excellent yield, or an alkyl halide may be reacted with an alkali metal salt of the acid, in usual manner. Alternatively, the acid may first be converted to an acid halide as by treatment with thionyl chloride or bromide, phosphorus trichloride or tribromide, or the like, in the accepted manner for such type reactions, and the acid chloride then reacted with a selected alkanol or phenol or alkali metal salts thereof to give high yields of the desired ester. Example 21 is representative of the preparation of an acid halide of a 4-(omega-carboxyalkyl)-2-pyrrolidinone, and Example 22 is indicative of the esterification of a 4-(omega-carboxyalkyl)-2-pyrrolidinone to produce a 4-(omega-carbalkoxyalkyl)-2-pyrrolidinone.

*Example 21.—3,3-diphenyl-1-isopropyl-2-pyrrolidinone-4-propionyl chloride*

A suspension of 144 g. (0.41 mole) of 3,3-diphenyl-1-isopropyl-2-pyrrolidinone-4-propionic acid in 500 ml. of dry benzene was treated at 20–25° dropwise with stirring with 97.5 grams (0.82 mole) of thionyl chloride. The resulting solution was refluxed for one hour and concentrated in vacuo. The residue was crystallized from benzene. M.P. 141.5–143.5°.

*Example 22.—Ethyl 3,3-diphenyl-1-isopropyl-2-pyrrolidinone-4-propionate*

To 200 ml. of dry ethanol was added 2.05 g. (0.09 mole) of sodium. When solution was complete thirty g. (0.08 mole) of 3,3-diphenyl-1-isopropyl-2-pyrrolidinone-4-propionyl chloride in 300 ml. of dry ethanol was added rapidly (the ethanolic sodium ethoxide was hot when the acid chloride was added but the resulting reaction appeared not to be exothermic). The mixture was stirred at room temperature overnight and filtered. The filtrate was concentrated and the residue was partitioned between 250 ml. of chloroform and 250 ml. of water. The chloroform solution was dried over anhydrous sodium sulfate and concentrated. The residue was crystallized from 70% ethanol. Yield, 23 g. (75%). M.P. 84–85°. Recrystallized from 70% methanol; M.P. 84–85° C.

*Analysis.*—Calc'd for $C_{24}H_{29}NO_3$: C, 75.96; H, 7.70; N, 3.69. Found: C, 76.14; H, 7.85; N, 3.79.

The 4-(omega-carbamylalkyl)-2-pyrrolidinones are prepared by reaction of ammonia or an amine with a 4-(omega-carbalkoxyalkyl)-2-pyrrolidinone or the acid halide of a 4-(omega-carboxyalkyl)-2-pyrrolidinone, preferably the latter. The reaction is usually conducted using cold concentrated ammonium hydroxide to produce the primary amide, and using a primary or secondary amine in hydrocarbon, e.g., benzene, solvent at a temperature between room temperature and the reflux temperature of the solvent involved, usually 20–80° centigrade, to produce the primary or secondary amine-containing carbamyl radicals, such as N-phenyl- or N-(lower-alkyl)-carbamyl and N,N-di-(lower-alkyl)-carbamyl, as well as N,N-(monocyclic alkyl or saturated heterocyclic)-carbamyl radicals, wherein the saturated monocyclic heterocyclic radical is as set forth hereinbefore under the definition of "amino." Representative of the preparation of various types of 4-(omega-carbamylalkyl)-2-pyrrolidinones are Examples 23, 24, and 25, which immediately follow.

*Example 23.—3,3-diphenyl-1-isopropyl-2-pyrrolidinone-4-propionamide*

3,3-diphenyl-1-isopropyl-2-pyrrolidinone-4-propionyl chloride 54 g. (0.146 mole), was added in small portions to cold, concentrated ammonium hydroxide solution. The mixture was stirred vigorously during the addition and for an additional half hour and the resulting solid was filtered, washed with water and crystallized from a chloroform-ligroin mixture. Yield, 46 g. (90%); M.P. 203.5–205°.

*Example 24.—3,3-diphenyl-1-isopropyl-2-pyrrolidinone-4-(N-methylpropionamide)*

A solution of 7.75 g. (0.25 mole) of methylamine in 150 ml. of benzene was added dropwise with stirring to a suspension of 25 g. (0.068 mole) of 3,3-diphenyl-1-isopropyl-2-pyrrolidinone-4-propionyl chloride in benzene. After addition, the preparation was brought slowly to reflux and reflux continued for one hour. The solvent was evaporated and the residue crystallized from methanol. Yield, 84%; M.P. 170–171°.

*Example 25.—3,3-diphenyl-1-isopropyl-2-pyrrolidinone-4-(N,N-dimethylpropionamide)*

3,3-diphenyl-1-isopropyl-2-pyrrolidinone-4-(N,N-dimethylpropionamide) was prepared in the manner of Example 24 from 3,3-diphenyl-1-isopropyl-2-pyrrolidinone-4-propionyl chloride and dimethylamine, M.P. 149–150°.

The 4-(omega-acylalkyl)-pyrrolidinones are prepared from the corresponding 4-(omega-chlorocarbonylalkyl) compounds by reaction with dialkyl cadmium reagents or from the corresponding 4-(omega-cyanoalkyl) compounds by reaction with a Grignard reagent RMgX, according to conventional procedure for such type reactions. The following example illustrates the preparation of the 4-(omega-acylalkyl)-2-pyrrolidinones.

Example 26.—3,3 - diphenyl-1-isopropyl-4-(β-propionylethyl) - 2 - pyrrolidinone [3,3 - diphenyl - 1 - isopropyl-2-pyrrolidinone-4-(3'-pentanone)]

A Grignard reagent was prepared from 10.9 grams (0.1 mole) of ethyl bromide and 2.4 grams (0.1 mole) of magnesium in 100 milliliters of dry ethyl ether. The reagent was cooled and ten grams (0.055 mole) of cadmium chloride was added and the resulting mixture was refluxed for one hour. The ether was removed by distillation and 200 milliliters of dry toluene was added and this mixture was heated at ninety degrees for thirty minutes, then cooled to sixty degrees, and thirty grams (0.081 mole) of 3,3-diphenyl-1-isopropyl-2-pyrrolidinone-4-propionyl chloride in 150 milliliters of dry toluene was added in a dropwise fashion. The resulting mixture was stirred at 85 degrees for two hours, then cooled and hydrolyzed with water and six normal hydrochloric acid. The toluene layer was separated, washed with dilute sodium hydroxide, dried over anhydrous sodium sulfate and concentrated in vacuo. The residue was distilled at reduced pressure. Yield, eight grams; B.P. 220–250°/0.2 mm. The material was crystallized several times from 60% aqueous ethanol and melted 120–122.5°.

Analysis.—Calc'd for $C_{24}H_{29}NO_2$: C, 79.30; H, 8.04; N, 3.85. Found: C, 79.47; H, 8.07; N, 4.06.

It will be obvious that, in the event it is desired that the carbon chain at the 4 position of the pyrrolidinone nucleus be greater than two carbon atoms, this is conveniently accomplished by starting with the appropriate two carbon atom side-chain omega-haloalkyl compound and preparing the omega-nitrile in accord with the foregoing disclosure and in particular accord with Example 19. This nitrile may then be converted to the acid, also as shown in the foregoing and particularly in accord with Example 20, which in turn may be converted to the acid halide, as previously discussed and particularly in accord with Example 21, or converted to an ester as fully described hereinbefore and particularly illustrated by Example 22. Either the acid halide, e.g., chloride, or the ester may be converted to the corresponding omega-hydroxyalkyl compound by reduction, the ester with sodium and alcohol, or the acid halide with sodium borohydride, in accord with conventional procedure, as respectively illustrated by Examples 27 and 28. The 4-(omega-hydroxyalkyl) compound is then reacted with a suitable halogenating agent, e.g., thionyl chloride, phosphorus trichloride, the corresponding bromo reagents, or the like, to replace the hydroxy group by a halogen atom and produce the corresponding omega-haloalkyl compound in accord with Example 29. This in turn may be reacted with an alkali metal cyanide to again produce the nitrile in accord with Examples 19 and 30, in each case having a side-chain containing one carbon atom more than the starting 4-(omega-haloalkyl)-2-pyrrolidinone with which the reaction sequence originates. Examples 27, 28, 29 and 30 follow.

Example 27.—3,3 - diphenyl-4-(γ-hydroxypropyl)-1-isopropyl-2-pyrrolidinone

To a boiling solution of five g. (0.013 mole) of ethyl 3,3 - diphenyl - 1 - isopropyl - 2 - pyrrolidinone - 4 - propionate in fifty ml. of absolute ethanol was added as rapidly as possible two g. (0.087 mole) of sodium. The reaction of the sodium with the alcohol was completed by heating to reflux. The unreacted ester was hydrolyzed by adding thirty ml. of water and refluxing one hour. The solvent was removed on the rotary evaporator and the residue partitioned between 100 ml. of water and 100 ml. of chloroform. The chloroform solution was dried with anhydrous sodium sulfate, concentrated and the residue crystallized. Yield, 1.6 g. (36%); M.P. after recrystallization from 50% ethanol 140–141.5°.

Analysis.—Calc'd for $C_{22}H_{27}NO_2$: C, 78.30; H, 8.07; N, 4.15. Found: C, 78.24; H, 8.03; N, 4.20.

Example 28.—3,3 - diphenyl-4-(gamma-hydroxypropyl)-1-isopropyl-2-pyrrolidinone To a suspension of ten g. of sodium borohydride in 100 ml. of dry dioxane was added rapidly and with stirring 25 g. (0.0675 mole) of 3,3-diphenyl-1-isopropyl-2-pyrrolidinone-4-propionyl chloride in 200 ml. of dry dioxan. The mixture was stirred at reflux for four hours, cooled to room temperature and 100 ml. of water added carefully. The mixture was partitioned between 500 ml. of water and 300 ml. of chloroform. The water layer was extracted with another 300 ml. of chloroform; the chloroform solution combined, dried with anhydrous sodium sulfate and concentrated on the rotary evaporator. The residue was crystallized from 70% ethanol and recrystallized twice from isopropyl ether. Yield, ten g. (44%); M.P. 142–143°. A mixed melting point with a sample from the previous example gave no depression.

Example 29.—4-(gamma-chloropropyl)-3,3-diphenyl-1-isopropyl-2-pyrrolidinone

A solution of 7.4 g. (0.062 mole) of thionyl chloride in fifty ml. of chloroform was added dropwise to a solution of 10.5 g. (0.031 mole) of 3,3-diphenyl-4-(gamma-hydroxypropyl)-1-isopropyl - 2 - pyrrolidinone and 4.9 g. (0.062 mole) of pyridine in 100 ml. of chloroform with stirring and ice bath cooling. When addition was complete the mixture was heated to reflux and maintained there for five hours, and then cooled with an ice bath. 100 ml. of water was added with stirring followed by fifty ml. of three Normal hydrochloric acid. The chloroform layer was separated, dried with anhydrous sodium sulfate and concentrated in vacuo and the residue crystallized from 150 ml. of ca. 60% ethanol. Yield, eight g. (72.5%); M.P. 85–86.5°.

Example 30.—3,3-diphenyl-1-isopropyl-2-pyrrolidinone-4-butyronitrile. [4-(3-cyanopropyl)-3,3-diphenyl - 1 - isopropyl-2-pyrrolidinone]

A mixture of 3.9 grams (0.08 mole) of sodium cyanide, 9.2 grams (0.026 mole) of 4-(3-chloropropyl)-3,3-diphenyl-1-isopropyl-2-pyrrolidinone and 100 milliliters of dimethyl formamide was stirred at reflux for seventeen hours. The mixture was filtered and the filtrate was concentrated in vacuo. The residue was crystallized twice from isopropyl alcohol. Yield, five grams (55%); M.P. 107–108°. A constant melting point of 126–127° was obtained after several additional crystallizations.

Analysis.—Calc'd for $C_{23}H_{26}N_2O$: C, 79.73; H, 7.57; N, 8.09. Found: C, 79.53; H, 7.38; N, 7.95.

The resulting 4-(gamma-halopropyl)-2-pyrrolidinones and 4-(Δ-halobutyl)-2-pyrrolidinones are reacted with the same reagents as shown in Examples 12 and 14 through 17 to produce the corresponding 4-(gamma-substituted-propyl)-2-pyrrolidinones and 4-(Δ-substituted-butyl)-2-pyrrolidinones. Moreover, the 4-(gamma-cyanopropyl)-2-pyrroldinones are additionally converted to further corresponding 4-(gamma-carboxypropyl)-2-pyrrolidinones, 4-(gamma-carbalkoxypropyl)-2-pyrrolidinones, 4-(gamma-carbamylpropyl)-2-pyrrolidinones, and 4-(gamma-alkanoylpropyl)-2-pyrrolidinones, as already fully discussed hereinbefore and illustrated by Examples 20 through 26.

Compounds produced in this manner, for example, are included in the following.

In the manner of the preceding Examples 19 through 26, starting with the appropriate nitrile, which is itself prepared by reaction of alkali metal cyanide with the corresponding 4-(omega-haloalkyl)-2-pyrrolidinone, the following compounds are prepared, the nitriles, acids, acid halides, acid esters, and acid amides being prepared from the starting materials indicated:

4-(β-carboxyethyl)-3-allyl-3-phenyl-1-isopropyl-2-pyrrrolidinone from the corresponding β-cyanoethyl compound by acid hydrolysis.

4-(β-carbomethoxyethyl)-3,3-dicyclohexyl-1-allyl-2-pyrrolidinone from the corresponding β-carboxyethyl compound by acid esterification with methanol.

4-(β-carbethoxyethyl)-3,3-dimethyl-1-phenyl-2-pyrrolidinone from the corresponding β-carboxyethyl compound by acid esterification with ethanol.

4-(β-carbobenzoxyethyl)-3-benzyl-3-phenyl-1-isopropyl-2-pyrrolidinone from the corresponding β-carboxyethyl compound by acid esterification with benzyl alcohol.

4-(β-chlorocarbonylethyl)-3-phenyl-3-(1-isopropyl-3-pyrrolidyl)-1-isopropyl-2-pyrrolidinone from the corresponding β-carboxyethyl compound and thionyl chloride.

4-(β-carboisopropoxyethyl)-3-phenyl-3-(2- or 3-thienyl)-1-isopropyl-2-pyrrolidinone from the corresponding β-chlorocarbonylethyl compound and sodium isopropoxide.

4-(β-carbamylethyl)-3-phenyl-3-(2- or 3-thienyl)-1-isopropyl-2-pyrrolidinone from the corresponding β-chlorocarbonylethyl compound and ammonia.

4-(β-N-methyl carbamylethyl)-3-phenyl-3-(p-methoxyphenyl)-1-isopropyl-2-pyrrolidinone from the corresponding β-chlorocarbonylethyl compound and methylamine.

4-(β-N,N-dimethyl carbamylethyl)-3-phenyl-3-(m-chlorophenyl)-1-isopropyl-2-pyrrolidinone from the corresponding β-chlorocarbonylethyl compound and dimethylamine.

4-(β-N-benzyl carbamylethyl)-3-phenyl-3-(o-methylphenyl)-1-isopropyl-2-pyrrolidinone from the corresponding β-chlorocarbonylethyl compound and benzylamine.

4-(β-piperidinocarbonylethyl)-3-methyl-3-cyclopentyl-1-isopropyl-2-pyrrolidinone from the corresponding β-chloro-carbonylethyl compound and piperidine.

4-(β-cyanopropyl)-3,3-diphenyl-1-isopropyl-2-pyrrolidinone from the corresponding β-chloropropyl compound and sodium cyanide.

4-(β-hexamethyleneiminocarbonylethyl)-3,3-diphenyl-1-isopropyl-2-pyrrolidinone from the corresponding β-chlorocarbonylpropyl compound and hexamethyleneimine.

4-(β-pyrrolidinocarbonylethyl)-4-methyl-3,3-diphenyl-1-isopropyl-2-pyrrolidinone from the corresponding β-chlorocarbonylethyl compound and pyrrolidine.

4-(β-cyanoethyl)-5-methyl-3,3-diphenyl-1-isopropyl-2-pyrrolidinone from the corresponding β-bromoethyl compound and sodium cyanide.

4-(gamma-cyanopropyl)-3-phenyl-3-(2'-piperidyl)-1-methyl-2-pyrrolidinone from the corresponding gamma-chloropropyl compound and sodium cyanide.

4-(gamma-morpholinocarbonylpropyl)-3-phenyl-3-[4'-(N-methylpiperidyl)]-1-isopropyl-2-pyrrolidinone from the corresponding gamma-chlorocarbonylpropyl compound and morpholine.

4-(β-N'-methylpiperazinocarbonylethyl)-3,3-diphenyl-1-methyl-2-pyrrolidinone from the corresponding β-chlorocarbonylethyl compound and N-methylpiperazine.

4-(β-acetylethyl)-3,3-diphenyl-1-ethyl-2-pyrrolidinone from the corresponding β-chlorocarbonylethyl compound and dimethyl cadmium.

4-(γ-propionyl-2'-propyl)-3,3-diphenyl-1-isopropyl-2-pyrrolidinone from the corresponding γ-chlorocarbonyl-2'-propyl compound and diethyl cadmium.

4-(β-benzoylethyl)-3,3-diphenyl-1-isobutyl-2-pyrrolidinone from the corresponding β-cyanoethyl compound and phenyl magnesium bromide.

4-(β-phenylacetylethyl)-3,3-diphenyl-1-cyclohexyl-2-pyrrolidinone from the corresponding β-chlorocarbonylethyl compound and dibenzyl cadmium.

4-(β-butyrylethyl)-3,3-diphenyl-1-benzyl-2-pyrrolidinone from the corresponding β-chlorocarbonylethyl compound and dipropyl cadmium.

4-(β-carboxyethyl)-3-phenyl-3-(2-pyridyl)-1-benzyl-2-pyrrolidinone from the corresponding β-cyanoethyl compound by acid hydrolysis.

4-(β-bromocarbonylethyl)-3-phenyl-3-(2-pyridyl)-1-isobutyl-2-pyrrolidinone from the corresponding β-carboxyethyl compound and phosphorus tribromide.

4-(β-carbethoxyethyl)-3-phenyl-3-(2-pyridyl)-1-cyclohexyl-2-pyrrolidinone from the corresponding β-chlorocarbonylethyl compound and sodium ethoxide.

4-(β-carbutoxyethyl)-3-phenyl-3-(2-pyridyl)-1-n-butyl-2-pyrrolidinone from the corresponding β-chlorocarbonylethyl compound and sodium butoxide.

4-(β-N,N-dimethylcarbamylethyl)-3-phenyl-3-(2-pyridyl)-1-isopropyl-2-pyrrolidinone from the corresponding β-chlorocarbonylethyl compound and dimethylamine.

4-(β-carbamylethyl)-3-phenyl-3-(2-pyridyl)-1-ethyl-2-pyrrolidinone from the corresponding β-chlorocarbonyl-ethyl compound and ammonia.

4-(β-carboisopropoxyethyl)-3-phenyl-3-(2-pyridyl)-1-methyl-2-pyrrolidinone from the corresponding β-chlorocarbonylethyl compound and sodium isopropoxide.

4-(β-carboisobutoxyethyl)-3-(p-methoxyphenyl)-3-(2-pyridyl)-1-methyl-2-pyrrolidinone from the corresponding β-chlorocarbonylethyl compound and sodium isobutoxide.

4-(β-N,N-dimethylcarbamylethyl)-3-(p-methoxyphenyl)-3-(2-pyridyl)-1-ethyl-2-pyrrolidinone from the corresponding β-chlorocarbonylethyl compound and dimethylamine.

4-(β-N,N-dimethylcarbamylethyl)-3-(p-methoxyphenyl)-3-(2-pyridyl)-1-isopropyl-2-pyrrolidinone from the corresponding β-chlorocarbonylethyl compound and dimethylamine.

4-(β-N,N-dimethylcarbamylethyl)-3-isopropyl-3-phenyl-1-ethyl-2-pyrrolidinone from the corresponding β-chlorocarbonylethyl compound and dimethylamine.

4-(β-N,N-dimethylcarbamylethyl)-1,3-di-isopropyl-3-phenyl-2-pyrrolidinone from the corresponding β-chlorocarbonylethyl compound and dimethylamine.

4-(β-N,N-dimethylcarbamylethyl)-3-methyl-3-phenyl-1-isopropyl-2-pyrrolidinone from the corresponding β-chlorocarbonylethyl compound and dimethylamine.

4-(β-N,N-dimethylcarbamylethyl)-3-cyclopentyl-3-phenyl-1-isopropyl-2-pyrrolidinone from the corresponding β-chlorocarbonylethyl compound and dimethylamine.

4-(β-N,N-dimethylcarbamylethyl)-3-cyclohexyl-3-phenyl-1-isopropyl-2-pyrrolidinone from the corresponding β-chlorocarbonylethyl compound and dimethylamine.

4-(Δ-cyano-2'-butyl)-3,3-diphenyl-1-isopropyl-2-pyrrolidinone from the corresponding chloro compound and sodium cyanide.

4-(gamma-cyanobutyl)-3,3-diphenyl-1-isopropyl-2-pyrrolidinone from the corresponding chloro compound and sodium cyanide.

4-(gamma-cyano-β-methylpropyl)-3,3-diphenyl-1-isopropyl-2-pyrrolidinone from the corresponding chloro compound and sodium cyanide.

The physical constants of some representative 4-(omega-substituted alkyl)-2-pyrrolidinones, wherein the omega substituent is attached through a carbon atom, are shown in Table IV.

Table IV

4-(OMEGA-SUBSTITUTED-ALKYL)-2-PYRROLIDINONES [1]

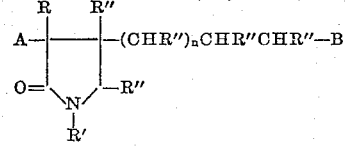

| R' | R | A | B | n | M.P. (B.P.), °C. | C Calcd. Found | H Calcd. Found | N Calcd. Found | Side-chain |
|---|---|---|---|---|---|---|---|---|---|
| i-$C_3H_7$ | $C_6H_5$ | $C_6H_5$ | CN | 0 | 150.5–151 | 79.48 / 79.21 | 7.28 / 7.08 | 8.43 / 8.27 | |
| i-$C_3H_7$ | $C_6H_5$ | $C_6H_5$ | COOH | 0 | 175–176 | 71.18 / 74.99 | 7.17 / 7.29 | | |
| i-$C_3H_7$ | $C_6H_5$ | $C_6H_5$ | $C(=O)-N(CH_3)_2$ | 0 | 149–150 | 76.15 / 75.99 | 7.99 / 7.89 | | |
| i-$C_3H_7$ | $C_6H_5$ | $C_6H_5$ | $C(=O)-NH_2$ | 0 | 203.5–205 | 75.40 / 75.55 | 7.48 / 7.68 | | |
| i-$C_3H_7$ | $C_6H_5$ | $C_6H_5$ | $C(=O)-NH-CH_3$ | 0 | 170–171 | 75.79 / 75.66 | 7.74 / 7.82 | | |
| i-$C_3H_7$ | $C_6H_5$ | $C_6H_5$ | $C(=O)-N(C_6)$ (cyclohexyl) | 0 | 144–145 | 77.74 / 77.54 | 8.39 / 8.20 | | |
| i-$C_3H_7$ | $C_6H_5$ | $C_6H_5$ | $C(=O)-N$ (cyclopentyl) | 0 | 179.5–180 | 77.19 / 77.25 | 7.97 / 7.89 | | |
| i-$C_3H_7$ | $C_6H_5$ | $C_6H_5$ | $C(=O)-OC_2H_5$ | 0 | 84–85 | 75.96 / 76.14 | 7.70 / 7.85 | 3.69 / 3.79 | |
| i-$C_3H_7$ | $C_6H_5$ | $C_6H_5$ | CN | 1 | 126–127 | 79.73 / 79.53 | 7.57 / 7.38 | 8.09 / 7.95 | |
| i-$C_3H_7$ | $C_6H_5$ | $C_6H_5$ | $C(=O)-NHC_4H_9(n)$ | 0 | 113.5–114 | 76.81 / 76.69 | 8.43 / 8.23 | | |
| i-$C_3H_7$ | $C_6H_5$ | $C_6H_5$ | $C(=O)-N\langle\rangle O$ (morpholino) | 0 | 157.5–158.5 | 74.25 / 74.24 | 7.67 / 7.60 | | |
| i-$C_3H_7$ | $C_6H_5$ | $C_6H_5$ | $C(=O)-C_2H_5$ | 0 | 120–122.5 | 79.30 / 79.47 | 8.04 / 8.07 | 3.85 / 4.06 | |
| $C_2H_5$ | $C_6H_5$ | $C_6H_5$ | CN | 0 | 177–180 | | | 8.43 / 8.09 | —$CHCH_2CH_2$— |

[1] B = other than amino; attached through carbon at omega position; R'' equals hydrogen (except last compound where one R'' equals $CH_3$).

The 4-(omega-aminoalkyl)-2-pyrrolidinone compounds are generally prepared by heating a solution of the selected 4-(omega-haloalkyl)-2-pyrrolidinone and the selected amine in a suitable reaction solvent, e.g., ethanol, a higher boiling alcohol such as butanol, a hydrocarbon solvent such as toluene, or the amine itself may be the solvent in some cases. A reaction temperature from about room temperature to about 120° C. is employed, preferably 100 to 120° C., and a reaction period of about eight to twenty-four hours is usually adequate. Higher reaction temperatures increase the speed of reaction but tend to increase the incidence of undesired side reactions, while temperatures below 100° C. frequently require undesirably lengthy reaction periods. Pressure to the extent generated in a sealed system is frequently employed to facilitate the reaction. The amine is usually employed in excess, at least two molar equivalents of the amine being preferred per each molar equivalent of starting halogen compound. The resulting solution of the amine reaction product is concentrated, as in vacuo, and the amine product isolated, usually as the crystalline hydrohalide salt corresponding to the omega-halogen in the starting omega-haloalkyl compound. In most cases the hydrohalide salt, e.g., the hydrochloride, crystallizes as the hydrate. In cases where a crystalline salt is difficult or impossible to obtain, the free basic amine itself may be distilled and crystallized from a solvent or solvent mixture or alternatively isolated as an oil by fractional distillation. Extraction of the reaction product with a suitable solvent, e.g., ether, benzene, toluene, or ethyl acetate, frequently assists in recovering all of the available product for isolation by crystallization or the like and concentrated acid, e.g., two Normal HCl, or anhydrous ketones, e.g., methyl ethyl ketone, are frequently of value as the solvent or medium from which crystallization or recrystallization is effected. Where the free base is desired, this may be obtained conventionally by neutralizing the reaction product or a solution of the isolated salt with a base such as ammonia, ammonium hydroxide, sodium carbonate, or other suitable alkaline material, extracting the liberated base with a suitable solvent such as ethyl acetate or benzene, drying the extract and evaporating to dryness in vacuo or fractionally distilling, or in other conventional manner. Numerous acid addition as well as quaternary ammonium (onium) salts may be prepared from the free bases, either isolated or without isolation from the reaction product, as already indicated in the foregoing. The amine preparation is illustrated by the following specific examples.

*Example 31.—4-(2-dimethylaminoethyl)-3,3-diphenyl-1-ethyl-2-pyrrolidinone hydrochloride monohydrate*

A solution of forty g. (0.122 mole) of 4-(2-chloroethyl)-3,3-diphenyl-1-ethyl-2-pyrrolidinone and eleven g. (0.244 mole) of dimethylamine in 250 ml. of absolute ethanol was heated for sixteen hours at 100° in a sealed system and concentrated in vacuo. The residue was dissolved in dilute hydrochloric acid and extracted with ethyl acetate. The acid extract was made basic with sodium hydroxide and again extracted with ethyl acetate. This ethyl acetate extract was concentrated in vacuo and the residue was dissolved in dry methyl ethyl ketone and acidified with dry hydrogen chloride, which caused precipitation of the product. Yield 32 g. (67%); M.P. 162–166°.

Drying at 125° produced the anhydrous salt which, on standing at room temperature for one-half hour, reabsorbed its water of hydration.

4-(2-dimethylaminoethyl)-3,3-diphenyl-1-isobutyl - 2 - pyrrolidinone hydrochloride, 1-benzyl-4-(2-dimethylaminoethyl) - 3,3 - diphenyl - 2-pyrrolidinone hydrochloride monohydrate, 3,3-diphenyl-1-ethyl-4-(2-pyrrolidinoethyl)-2-pyrrolidinone hydrochloride monohydrate, 3,3-diphenyl-1-isopropyl-4-(2-methylaminoethyl) - 2-pyrrolidinone hydrochloride, 3,3-diphenyl-1-isopropyl-4-[2-(4-methyl-1-piperazino)-ethyl]-2-pyrrolidinone dihydrochloride dihydrate, 3,3-diphenyl-1-isopropyl-4-[2 - (4-phenyl-1-piperazino) - ethyl]-2-pyrrolidinone monohydrochloride dihydrate, 3,3-diphenyl-1-isopropyl-4-(2-morpholinoethyl)-2-pyrrolidinone hydrochloride monohydrate, 4-[2-(2,6-dimethylmorpholino) - ethyl] - 3,3 - diphenyl-1-isopropyl-2-pyrrolidinone maleate, and 3,3-diphenyl-1-isopropyl-4-[2-(4 - carbomethoxy-1-piperazino) -ethyl] - 2-pyrrolidinone monohydrochloride dihydrate, were prepared in the manner of Example 31 from 4-(2-chloroethyl)-3,3-diphenyl-1-isobutyl-2-pyrrolidinone and dimethylamine, 1-benzyl-4-(2-chloroethyl)-3,3-diphenyl-2-pyrrolidinone and dimethylamine, 4-(2-chloroethyl)-3,3-diphenyl-1-ethyl-2-pyrrolidinone and pyrrolidine, 4-(2-chloroethyl)-3,3-diphenyl-1-isopropyl-2-pyrrolidinone and methylamine, 4-(2-chloroethyl)-3,3-diphenyl-1-isopropyl-2-pyrrolidinone and N-methylpiperazine, 4-(2-chloroethyl)-3,3-diphenyl-1-isopropyl-2-pyrrolidinone and N-phenylpiperazine, 4-(2-chloroethyl)-3,3-diphenyl-1-isopropyl-2-pyrrolidinone and morpholine, and 4-(2-chloroethyl)-3,3-diphenyl-1-isopropyl-2-pyrrolidinone and 2,6-dimethylmorpholine, and 4-(2-chloroethyl)-3,3-diphenyl-1-isopropyl-2-pyrrolidinone and N-carbomethoxypiperazine, respectively.

The following are additional examples of the above method:

*Example 32.—3,3-diphenyl-1-ethyl-4-(2-morpholinoethyl)-2-pyrrolidinone hydrochloride monohydrate*

A solution of 25 g. (0.076 mole) of 4-(2-chloroethyl)-3,3-diphenyl-1-ethyl-2-pyrrolidinone and 13.3 g. (0.153 mole) of morpholine in 500 ml. of absolute ethanol was heated at 95–120° for 21 hours in a closed system and concentrated in vacuo. The residue was dissolved in 300 ml. of two normal hydrochloric acid and extracted with 150 ml. of ethyl acetate. A solid crystallized (13 g.) during the extraction and was removed by filtration. M.P. 217–219°. The acid extracts were made basic with sodium hydroxide and extracted with ether, and the ether solution was concentrated in vacuo and the residue was suspended in six normal hydrochloric acid. Additional crystalline product formed and was recrystallized from two normal hydrochloric acid. Yield ten g.; M.P. 217–219°. Total yield 23 g. (70%).

*Example 33.—4-(2-di-n-butylaminoethyl)-3,3-diphenyl-1-ethyl-2-pyrrolidinone*

A solution of 25 g. (0.076 mole) of 4-(2-chloroethyl)-3,3-diphenyl-1-ethyl-2-pyrrolidinone and 19.8 g. (0.153 mole) of di-n-butylamine in 500 ml. of absolute ethanol was heated for 24 hours at 95–120° in a sealed system and concentrated in vacuo. The residue was partitioned between one normal hydrochloric acid and toluene and the oil and water layers were separated and made basic with sodium hydroxide and extracted with chloroform. The chloroform extract was concentrated in vacuo and the residue was distilled. Yield 14.7 g. (45%); B.P. 205–210°/0.05 mm.

3,3-diphenyl - 1-ethyl-4-(2-piperidinoethyl)-2-pyrrolidinone and 3-cyclopentyl-4-(2-dimethylaminoethyl)-1-isopropyl-3-phenyl-2-pyrrolidinone were prepared in the manner of Example 33 from 4-(2-chloroethyl)-3,3-diphenyl-2-pyrrolidinone and piperidine, and from 4-(2-chloroethyl)-3-cyclopentyl - 1 - isopropyl-3-phenyl-2-pyrrolidinone and dimethylamine respectively.

The amino substituent in the above compounds may be quaternized to form the quaternary ammonium (onium) salt as illustrated by the following example.

*Example 34.—4-(2-dimethylaminoethyl)-3,3-diphenyl-1-isobutyl-2-pyrrolidinone methobromide*

Ten grams (0.025 mole) of 4-(2-dimethylaminoethyl)-3,3-diphenyl-1-isobutyl-2-pyrrolidinone hydrochloride was partitioned between chloroform and dilute ammonium hydroxide. The chloroform layer was concentrated in vacuo, the residue was dissolved in dry methyl ethyl ketone, and the resulting solution was heated to reflux. A solution of 4.75 g. (0.05 mole) of methyl bromide in methyl ethyl ketone was added to the hot solution and, on cooling, 11.5 g. (100%) of crystalline material precipitated. M.P. 214–216°. After recrystallization from methyl ethyl ketone, the melting point was 218–219°.

Among additional amines, which are preparable in accord with the foregoing procedures, are the following:

3-cyclopentyl-1-isopropyl - 4 - (2 - morpholinoethyl)-3-phenyl-2-pyrrolidinone maleate, 4-(diethylaminoethyl)-3,3-diphenyl-1-isopropyl-2-pyrrolidinone fumarate, 4-(2-dimethylaminoethyl) - 1,3-di-isopropyl-3-phenyl-2-pyrrolidinone hydrochloride, 3,3 - diphenyl-4-(2 - hexamethyleneiminoethyl)-1-isopropyl-2-pyrrolidinone fumarate, and 4-[2-(3,5-dimethylmorpholino) - ethyl] - 3,3-diphenyl-1-isopropyl-2-pyrrolidinone maleate were prepared in the manner of Example 31 from 4-(2-chloroethyl)-3-cyclopentyl-1-isopropyl-3-phenyl-2-pyrrolidinone and morpholine, 4-(2-chloroethyl) - 3,3-diphenyl-1-isopropyl-2-pyrrolidinone and diethylamine, 4-(2-chloroethyl)-1,3-di-isopropyl-3-phenyl-2-pyrrolidinone and dimethylamine, 4-(2-chloroethyl)-3,3-diphenyl-1-isopropyl-2-pyrrolidinone and hexamethyleneimine, and 4-(2-chloroethyl)-3,3-diphenyl-1-isopropyl-2-pyrrolidinone and 3,5-dimethylmorpholine, respectively.

The 4-(omega-aminoalkyl)-2-pyrrolidinone compounds wherein the amino substituent is primary are prepared by reacting the selected starting 4-(omega-haloalkyl)-2-pyrrolidinone and an excess of ammonia according to the classic Hofmann procedure, either under pressure or at a sufficiently low temperature to provide the ammonia in liquid form, and subsequent treatment with alkali to minimize formation of secondary and tertiary amine salts. Alternatively, the primary amines can be formed by reduction of the corresponding nitrile, as with sodium and alcohol, or by the alkaline hydrolysis of the corresponding phthalimide according to the classic Gabriel synthesis.

A specific example of the preparation of a particular 4-(omega-primary aminoalkyl)-2-pyrrolidinone follows:

*Example 35.—4-(gamma-aminopropyl)-3,3-diphenyl-1-isopropyl-2-pyrrolidinone fumarate*

A mixture of 25 g. (.075 mole) of 3,3-diphenyl-1-isopropyl-2-pyrrolidinone-4-propionitrile and two teaspoonfuls of activated Raney nickel in 300 ml. of absolute ethanol was shaken in a hydrogen atmosphere for 54 hours during which time 3100 ml. of hydrogen was absorbed. The mixture was filtered. The filtrate was concentrated in vacuo and the residue was distilled at reduced pressure. Yield, 13 g.; B.P. 210–215/0.2 mm. The distillate together with five g. of fumaric acid was dissolved in 100 ml. of ethanol, and the solvent was removed on the steam bath. The residue was dissolved in 400 ml. of hot water, treated with activated charcoal and filtered. The filtrate was concentrated to about 200 ml. The resulting precitate was recrystallized from 200 ml. of water. Yield 6.5 g. (19% based on starting nitrile); M.P. 149–152° C.

*Analysis.*—Calc'd for $C_{29}H_{32}N_2O_5$: C, 69.00; H, 7.13; N, 6.18. Found: C, 69.08; H, 7.24; N, 6.19.

Other examples of the preparation of 4-(omega-morpholinoalkyl) compounds are as follows:

*Example 36.—4-[2-(3,5-dimethylmorpholino)-ethyl]-3,3-diphenyl-1-isopropyl-2-pyrrolidinone maleate*

A solution of 30 g. (0.088 mole) of 4-(2-chloroethyl)-3,3-diphenyl-1-isopropyl-2-pyrrolidinone and 22 g. (0.176 mole) of 3,5-dimethylmorpholine in 400 ml. of 95% ethanol was heated in a steel bomb for seventy-two hours at 140–150°. The reaction mixture was concentrated and the residue was partitioned between dilute hydrochloric acid and toluene. The aqueous layer together with an oil layer which formed was extracted with chloroform. The chloroform extract was washed with dilute sodium hydroxide and dried over anhydrous sodium sulfate, then concentrated in vacuo. The residue was distilled at reduced pressure. B.P. 225–228°/0.3 mm.

The base was converted to the maleate salt by treating an ethanol-ethyl ether solution with maleic acid. The resulting salt was recrystallized from an ethanol-ethyl ether mixture. Yield, 18 grams (49%); M.P. 149–150°.

*Analysis.*—Calc'd for $C_{31}H_{40}N_2O_6$: C, 69.38; H, 7.51; N, 5.22. Found: C, 69.40; H, 7.46; N, 5.24.

The fumarate salt was prepared in the same manner as the maleate salt. M.P. 200–203°.

*Analysis.*—Calc'd for $C_{31}H_{40}N_2O_6$: C, 69.38; H, 7.51; N, 5.22. Found: C, 69.19; H, 7.32; N, 5.01.

*Example 37.—4-[2-(2,6-dimethylmorpholino)-ethyl]-3,3-diphenyl-1-isopropyl-2-pyrrolidinone maleate*

A solution of thirty g. (0.088 mole) of 4-(2-chloroethyl)-3,3-diphenyl-1-isopropyl-2-pyrrolidinone and 22 g. (0.176 mole) of 2,6-dimethylmorpholine in 300 ml. of absolute ethanol was heated in a steel bomb for sixteen hours at 120–140°. The solution was concentrated and the residue was dissolved in 200 ml. of chloroform and the resulting solution was washed with one normal hydrochloric acid and dilute sodium hydroxide, dried over anhydrous sodium sulfate and concentrated in vacuo. The residue was distilled at reduced pressure. Yield, 26 g.; B.P. 210–215°/0.05 mm. The base was converted to the maleate salt by treating an absolute ethanol solution with maleic acid and precipitating the resulting salt with dry ethyl ether. The salt was recrystallized from an ethanol-ether mixture. Yield, 28 g. (60%); M.P. 177–178°.

*Analysis.*—Calc'd for $C_{31}H_{40}N_2O_6$: C, 69.38; H, 7.51; N, 5.22. Found: C, 69.29; H, 7.62; N, 5.22.

In the manner of the preceding discussion and particularly in accord with Examples 31 through 35, starting with the appropriate nitrile and reducing the same either catalytically or with sodium and alcohol, or starting with the corresponding 4-(omega-haloalkyl)-2-pyrrolidinone and the selected amine, or starting with the appropriate primary or secondary amine and the selected alkyl halide, the following 4-(omega-aminoalkyl)-2-pyrrolidinones are produced:

4-(β-diethylaminoethyl)-3-allyl-3-phenyl-1-isopropyl-2-pyrrolidinone from the corresponding β-chloroethyl compound and diethylamine 4-(β-dimethylaminoethyl)-3,3-dicyclohexyl-1-allyl-2-pyrrolidinone from the corresponding β-chloroethyl compound and dimethylamine 4-[β-(N'-methylpiperazino)-ethyl]-3,3-dimethyl-1-phenyl-2-pyrrolidinone from the corresponding β-chloroethyl compound and N-methylpiperazine 4-(β-piperidinoethyl)-3-benzyl-3-phenyl-1-isopropyl-2-pyrrolidinone from the corresponding β-chloroethyl compound and piperidine 4-(β-pyrrolidinoethyl)-3-phenyl-3-(1-isopropyl-3-pyrrolidyl)-1-isopropyl-2-pyrrolidinone from the corresponding β-chloroethyl compound and pyrrolidine 4-[β-(2',6'-dimethylpiperidino)-ethyl]-3-phenyl-3-(2- or 3-thienyl)-1-isopropyl-2-pyrrolidinone from the corresponding β-chloroethyl compound and 2,6-dimethylpiperidine 4-[β-(3'-methylpiperidino)-ethyl]-3-phenyl-3-(2- or 3-thienyl)-1-isopropyl-2-pyrrolidinone from the corresponding β-chloroethyl compound and 3-methylpiperidine 4-(β-dimethylaminoethyl)-3-phenyl-3-(p-methoxyphenyl)-1-isopropyl-2-pyrrolidinone from the corresponding β-chloroethyl compound and dimethylamine 4-(β-dimethylaminoethyl)-3-phenyl-3-(m-chlorophenyl)-1-isopropyl-2-pyrrolidinone from the corresponding β-chloroethyl compound and dimethylamine 4-(β-dimethylaminoethyl)-3-phenyl-3-(o-methylphenyl)-1-isopropyl-2-pyrrolidinone from the corresponding β-chloroethyl compound and dimethylamine 4-(β-dimethylaminoethyl)-3-methyl-3-cyclopentyl-1-isopropyl-2-pyrrolidinone from the corresponding β-chloroethyl compound and dimethylamine 4-(β-dimethylaminopropyl)-3,3-diphenyl-1-isopropyl-2-pyrrolidinone from the corresponding β-chloropropyl compound and dimethylamine 4-(β-pyrrolidinopropyl)-3,3-diphenyl-1-isopropyl-2-pyrrolidinone from the corresponding β-chloropropyl compound and pyrrolidine 4-(β-dimethylaminoethyl)-4-methyl-3,3-diphenyl-1-isopropyl-2-pyrrolidinone from the corresponding β-chloroethyl compound and dimethylamine 4-(β-dimethylaminoethyl)-5-methyl-3,3-diphenyl-1-isopropyl-2-pyrrolidinone from the corresponding β-chloroethyl compound and dimethylamine 4-(γ-aminopropyl)-3-phenyl-3-(2'-piperidyl)-1-methyl-2-pyrrolidinone from the corresponding β-cyanoethyl compound by catalytic reduction 4-(γ-dimethylaminopropyl)-3-phenyl-3-[4'-(N-methylpiperidyl)]-1-isopropyl-2-pyrrolidinone from the corresponding γ-bromopropyl compound and dimethylamine 4-(β-methylaminoethyl)-3,3-diphenyl-1-methyl-2-pyrrolidinone from the corresponding β-aminoethyl compound and methyl chloride 4-(β-methylethylaminoethyl)-3,3-diphenyl-1-ethyl-2-pyrrolidinone from the corresponding β-methylaminoethyl compound and ethyl chloride 4-(γ-dimethylamino-2'-propyl)-3,3-diphenyl-1-isopropyl-2-pyrrolidinone from the corresponding γ-chloro-2'-propyl compound and dimethylamine 4-(β-methylaminoethyl)-3,3-diphenyl-1-isobutyl-2-pyrrolidinone from the corresponding β-chloroethyl compound and methylamine 4-(β-dimethylaminoethyl)-3,3-diphenyl-1-cyclohexyl-2-pyrrolidinone from the corresponding β-chloroethyl compound and dimethylamine 4-(β-dimethylaminoethyl)-3,3-diphenyl-1-benzyl-2-pyrrolidinone from the corresponding β-chloroethyl compound and dimethylamine 4-(β-dimethylaminoethyl)-3-phenyl-3-(2-pyridyl)-1-benzyl-2-pyrrolidinone from the corresponding β-chloroethyl compound and dimethylamine 4-(β-diallylaminoethyl)-3-phenyl-3-(2-pyridyl)-1-isobutyl-2-pyrrolidinone from the corresponding β-chloroethyl compound and diallylamine 4-(β-hydroxyethylaminoethyl)-3-phenyl-3-(2-pyridyl)-1-cyclohexyl-2-pyrrolidinone from the corresponding β-chloroethyl compound and ethanolamine 4-[β-bis-(β'-hydroxyethylamino)-ethyl]-3-phenyl-3-(2-pyridyl)-1-n-butyl-2-pyrrolidinone from the corresponding β-chloroethyl compound and diethanolamine 4-(β-allylaminoethyl)-3-phenyl-3-(2-pyridyl)-1-isopropyl-2-pyrrolidinone from the corresponding β-chloroethyl compound and allylamine 4-(β-phenylaminoethyl)-3-phenyl-3-(2-pyridyl)-1-ethyl-2-pyrrolidinone from the corresponding β-chloroethyl compound and aniline 4-(β-dipropylaminoethyl)-3-phenyl-3-(2-pyridyl)-1-methyl-2-pyrrolidinone from the corresponding β-chloroethyl compound and dipropylamine 4-[β-(N-methylphenylamino)-ethyl]-3-(p-methoxyphenyl)-3-(2-pyridyl)-1-methyl-2-pyrrolidinone from the corresponding β-chloroethyl compound and N-methylaniline 4-(β-dimethylaminoethyl)-3-(p-methoxyphenyl)-3-(2-pyridyl)-1-ethyl-2-pyrrolidinone from the corresponding β-chloroethyl compound and dimethylamine 4-(β-dimethylaminoethyl)-3-(p-methoxyphenyl)-3-(2-pyridyl)-1-isopropyl-2-pyrrolidinone from the corresponding β-chloroethyl compound and dimethylamine 4-(β-methylaminoethyl)-3-isopropyl-3-phenyl-1-ethyl-2-pyrrolidinone from the corresponding β-chloroethyl compound and methylamine 4-(β-dimethylaminoethyl)-1,3-di-isopropyl-3-phenyl-2-pyrrolidinone from the corresponding β-chloroethyl compound and dimethylamine 4-(β-dimethylaminoethyl)-3-methyl-3-phenyl-1-isopropyl-2-pyrrolidinone from the corresponding β-chloroethyl compound and dimethylamine 4-(β-benzylaminoethyl)-3-cyclopentyl-3-phenyl-1-isopropyl-2-pyrrolidinone from the corresponding β-chloroethyl compound and benzylamine 4-(β-dimethylaminoethyl)-3-cyclohexyl-3-phenyl-1-isopropyl-2-pyrrolidinone from the corresponding β-chloroethyl compound and dimethylamine 4-(Δ-dimethylamino-2'-butyl)-3,3-diphenyl-1-isopropyl-2-pyrrolidinone from the corresponding chloro compound and dimethylamine 4-(γ-dimethylaminobutyl)-3,3-diphenyl-1-isopropyl-2-pyrrolidinone from the corresponding chloro compound and dimethylamine 4-(γ-dimethylamino-β-methylpropyl)-3,3-diphenyl-1-isopropyl-2-pyrrolidinone from the corresponding chloro compound and dimethylamine These compounds are all preferably isolated in the form of their hydrochloride, hydrobromide, maleate, fumarate, citrate, or methobromide salts.

The physical constants of some representative 4-(omega-amino-alkyl)-2-pyrrolidinones are shown in Table V.

In the manner of the preceding discussion and especially in accord with Examples 32, 36 and 37, starting with the selected morpholine or thiomorpholine and the corresponding 4-(omega-haloalkyl)-2-pyrrolidinones, or starting with the corresponding primary amine and the selected bis(haloethyl)ether or bis(haloethyl)thioether, the following 4-(omega-morpholinoalkyl)-2-pyrrolidinones are prepared:

4-[β-(2'-methylmorpholino)-ethyl]-3-allyl-3-phenyl-1-isopropyl-2-pyrrolidinone from the corresponding β-chloroethyl compound and 2-methylmorpholine 4-[β-(2',6'-dimethylmorpholino)-ethyl]-3,3-dicyclohexyl-1-allyl-2-pyrrolidinone from the corresponding β-chloroethyl compound and 2,6-dimethylmorpholine 4-[β-(2'-methoxymorpholino)-ethyl]-3,3-dimethyl-1-phenyl-2-pyrrolidinone from the corresponding β-chloroethyl compound and 2-methoxymorpholine 4-(β-morpholinoethyl)-3-benzyl-3-phenyl-1-isopropyl-2-pyrrolidinone from the corresponding β-chloroethyl compound and morpholine 4-(β-morpholinoethyl)-3-phenyl-3-(1-isopropyl-3-pyrrolidyl)-1-isopropyl-2-pyrrolidinone from the corresponding β-chloroethyl compound and morpholine 4-(β-morpholinoethyl)-3-phenyl-3-(2- or 3-thienyl)-1-isopropyl-2-pyrrolidinone from the corresponding β-chloroethyl compound and morpholine 4-(β-morpholinoethyl)-3-phenyl-3-(2- or 3-thenyl)-1-isopropyl-2-pyrrolidinone from the corresponding β-chloroethyl compound and morpholine 4-(β-morpholinoethyl)-3-phenyl-3-(p-methoxyphenyl)-1-isopropyl-2-pyrrolidinone from the corresponding β-chloroethyl compound and morpholine 4-(β-morpholinoethyl)-3-phenyl-3-(m-chlorophenyl)-1-isopropyl-2-pyrrolidinone from the corresponding β-chloroethyl compound and morpholine 4-(β-morpholinoethyl)-3-phenyl-3-(o-methylphenyl)-1-isopropyl-2-pyrrolidinone from the corresponding β-chloroethyl compound and morpholine 4-(β-morpholinoethyl)-3-methyl-3-cyclopentyl-1-isopropyl-2-pyrrolidinone from the corresponding β-chloroethyl compound and morpholine 4-(β-morpholinopropyl)-3,3-diphenyl-1-isopropyl-2-pyrrolidinone from the corresponding β-chloropropyl compound and morpholine 4-(β-thiomorpholinopropyl)-3,3-diphenyl-1-isopropyl-2-pyrrolidinone from the corresponding β-chloropropyl compound and thiomorpholine 4-(β-morpholinoethyl)-4-methyl-3,3-diphenyl-1-isopropyl-2-pyrrolidinone from the corresponding β-chloroethyl compound and morpholine 4-(β-morpholinoethyl)-5-methyl-3,3-diphenyl-1-isopropyl-2-pyrrolidinone from the corresponding β-iodoethyl compound and morpholine 4-[gamma-(2',6'-dimethylmorpholino)-propyl]-3-phenyl-3-(2'-piperidyl)-1-methyl-2-pyrrolidinone from the corresponding γ-chloropropyl compound and 2,6-dimethylmorpholine 4-[gamma-(3',5'-dimethylmorpholino)-propyl]-3-phenyl-3-[4'-(N-methylpiperidyl)]-1-isopropyl-2-pyrrolidinone from the corresponding γ-chloropropyl compound and 3,5-dimethylmorpholine 4-(β-morpholinoethyl)-3,3-diphenyl-1-methyl-2-pyrrolidinone from the corresponding β-aminoethyl compound and bis-(β-chloroethyl)ether 4-(β-thiomorpholinoethyl)-3,3-diphenyl-1-ethyl-2-pyrrolidinone from the corresponding β-aminoethyl compound and bis-(β-chloroethyl)thioether 4-(γ-morpholino-2'-propyl)-3,3-diphenyl-1-isopropyl-2-pyrrolidinone from the corresponding γ-chloro-2'-propyl compound and morpholine 4-(β-morpholinoethyl)-3,3-diphenyl-1-isobutyl-2-pyrrolidinone from the corresponding β-bromoethyl compound and morpholine 4-(β-morpholinoethyl)-3,3-diphenyl-1-cyclohexyl-2-pyrrolidinone from the corresponding β-chloroethyl compound and morpholine 4-(β-morpholinoethyl)-3,3-diphenyl-1-benzyl-2-pyrrolidinone from the corresponding β-chloroethyl compound and morpholine 4-(β-morpholinoethyl)-3-phenyl-3-(2-pyridyl)-1-benzyl-2-pyrrolidinone from the corresponding β-chloroethyl compound and morpholine 4-(β-morpholinoethyl)-3-phenyl-3-(2-pyridyl)-1-isobutyl-2-pyrrolidinone from the corresponding β-chloroethyl compound and morpholine 4-(β-morpholinoethyl)-3-phenyl-3-(2-pyridyl)-1-cyclohexyl-2-pyrrolidinone from the corresponding β-chloroethyl compound and morpholine 4-(β-morpholinoethyl)-3-phenyl-3-(2-pyridyl)-1-n-butyl-2-pyrrolidinone from the corresponding β-chloroethyl compound and morpholine 4-(β-morpholinoethyl)-3-phenyl-3-(2-pyridyl)-1-isopropyl-2-pyrrolidinone from the corresponding β-chloroethyl compound and morpholine 4-(β-morpholinoethyl)-3-phenyl-3-(2-pyridyl)-1-ethyl-2-pyrrolidinone from the corresponding β-chloroethyl compound and morpholine 4-(β-morpholinoethyl)-3-phenyl-3-(2-pyridyl)-1-methyl-2-pyrrolidinone from the corresponding β-chloroethyl compound and morpholine 4-(β-morpholinoethyl)-3-(p-methoxyphenyl)-3-(2-pyridyl)-1-methyl-2-pyrrolidinone from the corresponding β-chloroethyl compound and morpholine 4-(β-morpholinoethyl)-3-(p-methoxyphenyl)-3-(2-pyridyl)-1-ethyl-2-pyrrolidinone from the corresponding β-chloroethyl compound and morpholine 4-(β-morpholinoethyl)-3-(p-methoxyphenyl)-3-(2-pyridyl)-1-isopropyl-2-pyrrolidinone from the corresponding β-chloroethyl compound and morpholine 4-(β-morpholinoethyl)-3-isopropyl-3-phenyl-1-ethyl-2-pyrrolidinone from the corresponding β-chloroethyl compound and morpholine 4-(β-morpholinoethyl)-1,3-di-isopropyl-3-phenyl-2-pyrrolidinone from the corresponding β-chloroethyl compound and morpholine 4-(β-morpholinoethyl)-3-methyl-3-phenyl-1-isopropyl-2-pyrrolidinone from the corresponding β-chloroethyl compound and morpholine 4-(β-morpholinoethyl)-3-cyclopentyl-3-phenyl-1-isopropyl-2-pyrrolidinone from the corresponding β-chloroethyl compound and morpholine 4-(β-morpholinoethyl)-3-cyclohexyl-3-phenyl-1-isopropyl-2-pyrrolidinone from the corresponding β-chloroethyl compound and morpholine 4-(Δ-morpholino-2′-butyl)-3,3-diphenyl-1-isopropyl-2-pyrrolidinone from the corresponding chloro compound and morpholine 4-(γ-morpholinobutyl)-3,3-diphenyl-1-isopropyl-2-pyrrolidinone from the corresponding chloro compound and morpholine 4-(γ-morpholino-β-methylpropyl)-3,3-diphenyl-1-isopropyl-2-pyrrolidinone from the corresponding chloro compound and morpholine.

These compounds are all preferably isolated in the form of their hydrochloride, hydrobromide, maleate, fumarate, citrate, or methobromide salts.

The physical constants of some representative 4-(omega-morpholinoalkyl)-2-pyrrolidinones are shown in Table V.

When the amino substituent of the omega-aminoalkyl compounds described above is secondary, the compound may be reacted with an acid chloride or acid anhydride to form an amide. This is illustrated by the following example, in which an N-loweralkanoyl-N-alkylamino product is produced.

*Example 38.—4-[2-(N-acetyl-N-methylamino)-ethyl]-3,3-diphenyl-1-isopropyl-2-pyrrolidinone*

Twenty-seven grams (0.0725 mole) of 3,3-diphenyl-1-isopropyl-4-(2-methylaminoethyl)-2-pyrrolidinone hydrochloride was partitioned between aqueous sodium hydroxide and chloroform. The chloroform extract was dried over anhydrous sodium sulfate and nine g. (0.087 mole) of acetic anhydride was added and the resulting solution was refluxed for two hours and concentrated in vacuo. The residue was crystallized from isopropyl ether containing a little ethyl acetate. Yield 24.5 g. (89%); M.P. 120–121°.

When the amino substituent of the omega-aminoalkyl compounds described above is primary, the same treatment produces an N-lower-alkanoylamino product, in accord with the following example:

*Example 39.—3,3-diphenyl-1-isopropyl-4-(gamma-acetylaminopropyl)-2-pyrrolidinone. (4-[3-(N-acetylamino)-propyl]-3,3-diphenyl-1-isopropyl-2-pyrrolidinone)*

Two grams (0.044 mole) of 4-(3-aminopropyl)-3,3-diphenyl-1-isopropyl-2-pyrrolidinone fumarate was partitioned between 100 milliliters of chloroform and 100 milliliters of one normal sodium hydroxide. The chloroform extract was dried over anhydrous sodium sulfate and concentrated to a volume of fifty milliliters. Acetyl chloride (0.84 gram, 0.011 mole) was added and the solution was refluxed for fifteen hours, allowed to stand for twenty-four hours at room temperature, washed with dilute sodium hydroxide, dried over anhydrous sodium sulfate and concentrated in vacuo. The residue was crystallized from isopropyl ether containing about five percent of ethyl acetate. Yield, one gram (60%). After two recrystallizations from the same solvent, M.P. 113–115°.

*Analysis.*—Calc'd for $C_{24}H_{30}N_2O_2$: C, 76.15; H, 7.99; N, 7.40. Found: C, 76.25; H, 7.85; N, 7.26.

Other 4-(omega-N-lower-alkanoylaminoalkyl)-2-pyrrolidinones and 4-(omega-N-lower-alkanoyl-N-alkyl-aminoalkyl)-2-pyrrolidinones produced in accord with Examples 38 and 39 include:

4-(2′-acetamidoethyl)-3,3-diphenyl-1-ethyl-2-pyrrolidinone 4-(2′-propionamidoethyl)-3-cyclohexyl-1-isopropyl-3-phenyl-2-pyrrolidinone 4-(2′-isobutyramidoethyl)-1-isopropyl-3-ethyl-3-phenyl-2-pyrrolidinone 4-(3′-acetamidopropyl)-3-cyclohexyl-1-isopropyl-3-phenyl-2-pyrrolidinone 4-[3′-(N-acetyl-N-methylamino)-propyl]-3,3-diphenyl-1-isopropyl-2-pyrrolidinone 4-[2′-(N-acetyl-N-methylamino)-propyl]-3,3-diphenyl-1-isopropyl-2-pyrrolidinone 4-[2′-(N-butyryl-N-ethylamino)-ethyl]-3,3-diphenyl-1-cyclohexyl-2-pyrrolidinone.

The 4-(omega-phthalimidoalkyl)-2-pyrrolidinones are prepared conveniently by reacting a starting 4-(omega-haloalkyl)-2-pyrrolidinone with an alkali metal, e.g., potassium, phthalimide, preferably in a solvent such as dimethylformamide or the like. Example 40 illustrates preparation of representative 4-(omega-phthalimidoalkyl)-2-pyrrolidinones.

*Example 40.—3,3-diphenyl-1-isopropyl-4-(β-phthalimidoethyl)-2-pyrrolidinone*

A mixture of 34.2 g. (0.10 mole) of 4-(β-chloroethyl)-3,3-diphenyl-1-isopropyl-2-pyrrolidinone, 20.4 g. (0.11 mole) of the potassium salt of phthalimide and 200 ml. of dimethylformamide was stirred and refluxed for three hours, then cooled and left standing overnight at room temperature. The reaction mixture was then poured into 600 ml. of hot water, whereupon an oil separated and solidified. This solid was collected and recrystallized from one liter of 95% ethanol. Yield, 36.3 g. (80%); M.P. 164–166°.

*Analysis.*—Calc'd for $C_{29}H_{28}N_2O_3$: C, 76.97; H, 6.24; N, 6.19. Found: C, 76.74; H, 6.29; N, 6.11.

The physical constants of some representative 4-(omega-aminoalkyl)-2-pyrrolidinones, 4-(omega-N-lower-alkanoylaminoalkyl)-2-pyrrolidinones, 4-(omega-N-lower-alkanoyl-N-lower-alkyl-aminoalkyl)-2-pyrrolidinones, and 4-(omega-phthalimidoalkyl)-2-pyrrolidinones are shown in Table V.

Table V

4-(OMEGA-AMINO ALKYL)-2-PYRROLIDINONES [1]

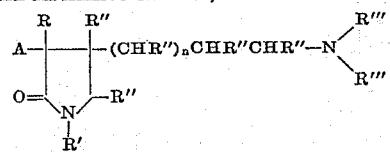

| R' | R | A | N(R''')(R''') | Salt | n | M.P. (B.P.), °C. | C Calcd. Found | H Calcd. Found | N Calcd. Found | Misc. Calcd. Found |
|---|---|---|---|---|---|---|---|---|---|---|
| C₂H₅ | C₆H₅ | C₆H₅ | N—(CH₃)₂ | HCl.H₂O | 0 | 161–164 | 67.58 / 67.75 | 8.00 / 8.05 | 7.17 / 7.27 | Cl, 9.07 / 9.04; H₂O, 4.60 / 4.80 |
| C₂H₅ | C₆H₅ | C₆H₅ | N—(n-C₄H₉)₂ | | 0 | [2] (205–210) | 79.95 / 79.82 | 9.59 / 9.45 | 6.66 / 6.41 | |
| C₂H₅ | C₆H₅ | C₆H₅ | Pyrrolidino | HCl.H₂O | 0 | 169–172 | 69.13 / 69.23 | 7.97 / 8.75 | 6.72 / 6.73 | Cl, 8.50 / 8.58 |
| C₂H₅ | C₆H₅ | C₆H₅ | Piperidino | | 0 | 89 | 79.74 / 78.86 | 8.57 / 8.76 | 7.44 / 7.58 | |
| i-C₃H₇ | C₆H₅ | C₆H₅ | NH₂ | Fumarate | 1 | 149–152 | 69.00 / 69.08 | 7.13 / 7.24 | 6.18 / 6.19 | |
| i-C₃H₇ | C₆H₅ | C₆H₅ | N(H)(CH₃) | HCl | 0 | 237–9 | 70.85 / 70.93 | 7.84 / 7.99 | 7.51 / 7.56 | Cl, 9.51 / 9.79 |
| i-C₃H₇ | C₆H₅ | C₆H₅ | N'-methyl-piperazino | 2HCl.2H₂O | 0 | 185–9 | 60.69 / 59.92 | 8.03 / 7.64 | 8.17 / 8.26 | Cl, 13.78 / 13.89; H₂O, 7.00 / 7.60 |
| i-C₃H₇ | C₆H₅ | C₆H₅ | N'-phenyl-piperazino | HCl.2H₂O | 0 | 145–51 | 68.92 / 68.95 | 7.84 / 7.31 | 7.78 / 7.77 | Cl, 6.57 / 6.78; H₂O, 6.67 / 6.66 |
| i-C₄H₉ | C₆H₅ | C₆H₅ | N—(CH₃)₂ | HCl | 0 | 154–55 | 71.88 / 72.08 | 8.29 / 8.42 | 6.99 / 7.25 | Cl, 8.84 / 8.53 |
| i-C₄H₉ | C₆H₅ | C₆H₅ | N—(CH₃)₂ | CH₃Br | 0 | 218–9 | 65.35 / 65.49 | 7.68 / 7.87 | 17.39 / 17.30 | Br, 6.10 / 6.25 |
| C₆H₅—CH₂ | C₆H₅ | C₆H₅ | N—(CH₃)₂ | HCl.H₂O | 0 | 181–3 | 71.26 / 71.90 | 7.75 / 7.65 | 6.16 / 6.29 | Cl, 7.79 / 8.05; H₂O, 3.96 / 3.80 |
| i-C₃H₇ | C₆H₉ | C₆H₅ | N(CH₃)(CH₃) | | 0 | [3] 94–98.5 | 77.14 / 77.43 | 10.01 / 10.06 | 8.18 / 7.95 | |
| i-C₃H₇ | C₆H₅ | C₆H₅ | N(C₂H₅)(C₂H₅) | Fumarate | 0 | 156–159 | 70.42 / 70.66 | 7.74 / 7.76 | 5.65 / 5.65 | |
| i-C₃H₇ | C₆H₅ | i-C₃H₇ | N(CH₃)(CH₃) | HCl | 0 | 208–210 | 68.05 / 68.13 | 9.42 / 9.61 | 7.94 / 7.93 | Cl, 10.05 / 10.44 |
| i-C₃H₇ | C₆H₅ | C₆H₅ | N(C6 ring) | Fumarate | 0 | 163–165 | 71.51 / 71.51 | 7.74 / 7.50 | 5.38 / 5.38 | |
| i-C₃H₇ | C₆H₅ | C₆H₅ | N(CH₃)(C(O)CH₃) | | 0 | 120–1 | 76.15 / 76.01 | 7.99 / 7.97 | 7.40 / 7.54 | |
| i-C₃H₇ | C₆H₅ | C₆H₅ | Phthalimido | | 0 | 164–166 | 76.97 / 76.74 | 6.24 / 6.29 | 6.19 / 6.11 | |
| C₂H₅ | C₆H₅ | C₆H₅ | Morpholino | HCl.H₂O | 0 | 217–9 | 66.57 / 66.60 | 7.68 / 7.53 | 6.47 / 6.52 | Cl, 8.19 / 8.22 |
| i-C₃H₇ | C₆H₅ | C₆H₅ | do | HCl.H₂O | 0 | 182–5 | 66.87 / 67.08 | 8.31 / 7.79 | 6.24 / 6.10 | Cl, 7.90 / 8.18 |
| i-C₃H₇ | C₆H₅ | C₆H₅ | N(CH₃)(O ring)(CH₃) | Maleate | 0 | 177–8 | 69.39 / 69.29 | 7.51 / 7.62 | 5.22 / 5.22 | |
| i-C₃H₇ | C₅H₉ | C₆H₅ | Morpholino | do | 0 | 173–177 | 67.17 / 67.37 | 8.05 / 8.22 | 5.60 / 5.64 | |

Table V—(Continued)

| R' | R | A | N⟨R'''/R''' | Salt | n | M.P. (B.P.), °C. | Analysis | | | |
|---|---|---|---|---|---|---|---|---|---|---|
| | | | | | | | C Calcd. Found | H Calcd. Found | N Calcd. Found | Misc. Calcd. Found |
| i-$C_3H_7$ | $C_6H_5$ | $C_6H_5$ | 3,5-dimethyl-morpholino. | Maleate | 0 | 149–150 | 69.38 / 69.40 | 7.51 / 7.46 | 5.22 / 5.24 | |
| i-$C_3H_7$ | $C_6H_5$ | $C_6H_5$ | ⎯⎯do⎯⎯ | Fumarate | 0 | 200–203 | 69.38 / 69.19 | 7.51 / 7.32 | 5.22 / 5.01 | |
| i-$C_3H_7$ | $C_6H_5$ | i-$C_3H_7$ | Morpholino | HCl | 0 | 173–176 | 66.89 / 67.03 | 8.93 / 9.06 | 7.09 / 7.15 | |
| i-$C_3H_7$ | $C_6H_5$ | $C_6H_5$ | ⎯⎯do⎯⎯ | Maleate | 1 | 155 | 68.94 / 68.75 | 7.33 / 7.22 | 5.36 / 5.42 | |
| i-$C_3H_7$ | $C_6H_5$ | $C_6H_5$ | Thiomorpholino | HCl·$H_2O$ | 0 | 225–230 (dec.) | 64.84 / 65.94 | 7.62 / 7.57 | 6.05 / 6.05 | Cl, 7.67 / 7.76 |
| i-$C_3H_7$ | $C_6H_5$ | $C_6H_5$ | NH—$\overset{O}{\overset{\|}{C}}$—$CH_3$ | | 1 | 113–115 | 76.15 / 76.25 | 7.99 / 7.85 | 7.40 / 7.26 | |
| i-$C_3H_7$ | $C_6H_5$ | $C_6H_5$ | NH–$CH_2CH=CH_2$ | | 0 | 103–105 | 79.52 / 79.51 | 8.34 / 8.50 | 7.73 / 7.76 | |
| i-$C_3H_7$ | $C_6H_5$ | $C_6H_5$ | $NH_2$ | | 0 | 102–103.5 | 78.22 / 78.38 | 8.13 / 8.05 | 8.69 / 8.57 | |
| $CH_3$ | $C_6H_5$ | $C_6H_5$ | Morpholino | | 0 | 130–131 | 75.79 / 75.89 | 7.74 / 7.79 | 7.69 / 7.58 | |
| $C_2H_5$ | $C_6H_5$ | $C_6H_5$ | ⎯⎯do⎯⎯ | Benzoate | 0 | 123–4 | 74.37 / 74.55 | 7.25 / 7.16 | 5.60 / 5.59 | |
| | | | | | | | | | | Side-chain |
| $C_2H_5$ | $C_6H_5$ | $C_6H_5$ | Dimethylamino | HCl | 0 | 251–253 | | | 7.24 / 7.17 | —$CHCH_3CH_2$— |
| $C_2H_5$ | $C_6H_5$ | $C_6H_5$ | Morpholino | HCl | 0 | 255–261.5 | 69.99 / 69.77 | 7.75 / 7.53 | 6.53 / 6.38 | —$CHCH_3CH_2$— |

[1] Including acylamino; R'' equals hydrogen (except last two compounds where one R'' equals $CH_3$).
[2] At 0.05 mm.
[3] 158–160/0.035 mm.

The 4-(omega-haloalkyl) - 3,3 - disubstituted-1-substituted-2-thionpyrrolidinones corresponding to the 2-pyrrolidinones of Formula IX, or of Examples 1 through 7, or listed following Example 7, are prepared by reaction of the corresponding 2-pyrrolidinones with phosphorus pentasulfide ($P_2S_5$). The conditions for this reaction may be varied considerably, but in general are as follows:

A suspension of the 2-pyrrolidinone and an intimate mixture of phosphorous pentasulfide and potassium sulfide in an inert solvent [usually an approximately 0.4 molar quantity of phosphorus pentasulfide together with an equal weight of potassium sulfide in dry toluene (approximately four liters of dry toluene ordinarily being used per mole of pyrrolidinone)] is stirred and refluxed for an extended period, usually about 15 to 24 hours. The mixture is then usually decolorized with activated charcoal and filtered while hot. In some cases, the resulting thionpyrrolidinone precipitates from solution upon cooling and is removed by filtration and recrystallized from an appropriate solvent. In other cases, the toluene filtrate is concentrated in vacuo and the residual crude thionpyrrolidinone is crystallized and may be recrystallized from an appropriate solvent.

The procedure is essentially that described generally by R. N. Hurd and G. De La Mater, Chemical Reviews 61, 45 (1961) for the conversion of amides to thionamides. However, these authors state that a reaction time of approximately one hour is usually sufficient, while conversion of the 2-pyrrolidinones of the present series to the 2-thionpyrrolidinones appears to require a reaction time of about 15 to 24 hours in most cases.

Examples of the conversion of 2-pyrrolidinones to 2-thionpyrrolidinones are as follows:

*Example 41.—4-(2-chloroethyl)-3,3-diphenyl-1-isopropyl-2-thionpyrrolidinone*

A mixture of 150 g. (0.44 mole) of 4-(2-chloroethyl)-3,3-diphenyl-1-isopropyl-2-pyrrolidinone, 23.3 g. (0.105 mole) of phosphorus pentasulfide and 25 g. of potassium sulfide in 700 ml. of dry toluene was refluxed and stirred for twenty-four hours. The mixture was filtered while hot and the filtrate treated with decolorizing charcoal, filtered again and allowed to cool. The product precipitated from the solution in near analytical purity. Yield, 88 g. (56%); M.P. 148–150°. After recrystallization from toluene the melting point was 149–151° C.

*Analysis.*—Calc'd for $C_{21}H_{24}ClNS$: C, 70.48; H, 6.76; N, 3.91; S, 8.94; Cl, 9.91. Found: C, 70.32; H, 6.47; N, 3.98; S, 9.04; Cl, 10.00.

*Example 42.—4-(2-chloroethyl)-3,3-diphenyl-1-ethyl-2-thionpyrrolidinone*

A mixture of 0.5 mole of 4-(2-chloroethyl)-3,3-diphenyl-1-ethyl-2-pyrrolidinone and an intimate mixture of 0.2 mole of phosphorus pentasulfide together with an equal weight of potassium sulfide in one liter of dry toluene is refluxed and stirred for 24 hours. The resulting mixture is filtered while hot and the filtrate treated with decolorizing charcoal, filtered again and allowed to cool. The product precipitates from solution and is purified by recrystallization.

*Example 43.—4-(2-chloroethyl)-3,3-diphenyl-1-methyl-2-thionpyrrolidinone*

This product is prepared in the manner of Example 42, starting from 4-(2-chloroethyl)-3,3-diphenyl-1-methyl-2-pyrrolidinone.

*Example 44.—4-(2-bromoethyl)-3,3-diphenyl-1-ethyl-2-thionpyrrolidinone*

A suspension of 0.5 mole of 4-(2-bromoethyl)-3,3-diphenyl-1-ethyl-2-pyrrolidinone and an intimate mixture of 0.2 mole of phosphorus pentasulfide and an equal weight of potassium sulfide in one liter of dry toluene is refluxed and stirred for 24 hours. The mixture is treated with decolorizing charcoal, filtered while hot, and the filtrate concentrated in vacuo. The product may be crystallized, if desired, from an appropriate solvent as in Example 41.

The 4-(omega-cyanoalkyl)-3,3-disubstituted-1-substituted-2-thionpyrrolidinones, e.g., of the formula given in Table IV where B is cyano but with a sulfur atom in place of the 2-oxygen atom, are prepared from the corresponding 4-(omega-cyanoalkyl)-3,3-disubstituted-1-substituted-2-pyrrolidinones, e.g., those of Examples 19 or 30 or listed following Example 30, in the manner of Examples 41–44 and in the disclosure preceding Example 41. Typical preparations are as follows:

*Example 45.—4-(2-cyanoethyl)-3,3-diphenyl-1-isopropyl-2-thionpyrrolidinone*

A suspension of 166 g. (0.5 mole) of 4-(2-cyanoethyl)-3,3-diphenyl-1-isopropyl-2-pyrrolidinone and an intimate mixture of 48.8 g. (0.22 mole) of phosphorus pentasulfide and 48.8 g. of potassium sulfide in two liters of dry toluene was stirred and refluxed for eighteen hours, filtered and the filtrate concentrated in vacuo. The residue was dissolved in hot isopropyl alcohol, treated with activated charcoal, filtered and allowed to cool, yielding 123 g. (70%); M.P. 160–165° C. After one recrystallization from isopropyl alcohol, the melting point was 166–167° C.

*Analysis.*—Calc'd for $C_{22}H_{24}N_2S$: C, 75.82; H, 6.94; N, 8.04; S, 9.20. Found: C, 75.99; H, 7.14; N, 8.13; S, 9.35.

*Example 46.—4-(2-cyanoethyl)-3,3-diphenyl-1-ethyl-2-thionpyrrolidinone*

A suspension of 0.5 mole of 4-(2-cyanoethyl)-3,3-diphenyl-1-ethyl-2-pyrrolidinone and an intimate mixture of 0.2 mole of phosphorus pentasulfide together with an equal weight of potassium sulfide in two liters of dry toluene is stirred and refluxed for 20 hours, filtered, and the filtrate concentrated in vacuo. The residue is crystallized and recrystallized from an appropriate solvent as in Example 45.

*Example 47.—4-(2-cyanoethyl)-3,3-diphenyl-1-methyl-2-thionpyrrolidinone*

This compound is prepared in the manner of Example 46, starting from 4-(2-cyanoethyl)-3,3-diphenyl-1-methyl-2-pyrrolidinone.

*Example 48.—4-(2-cyanoethyl)-3,3-diphenyl-1-cyclohexyl-2-thionpyrrolidinone*

This compound is prepared in the manner of Example 46 from 4-(2-cyanoethyl)-3,3-diphenyl-1-cyclohexyl-2-pyrrolidinone.

The 4-(omega-cyanoalkyl)-2-thionpyrrolidinones may also be prepared from the corresponding 4-(omega-haloalkyl)-2-thionpyrrolidinones in the manner generally given for preparation of the 4-(omega-cyanoalkyl)-2-pyrrolidinones immediately preceding Example 19 and as particularly exemplified for preparation of 3,3-diphenyl-1-isopropyl-2-pyrrolidinone-4-propionitrile and 3,3-diphenyl-1-isopropyl-2-pyrrolidinone-4-butyronitrile in Examples 19 and 30, respectively. The reaction conditions required for production of the thionpyrrolidinones are in general somewhat more stringent than for the pyrrolidinones. The compounds of Examples 45–48, for example, may be prepared in this manner.

The 4-(omega-aminoalkyl)-3,3-disubstituted-1-substituted-2-thionpyrrolidinones, corresponding to the 2-pyrrolidinone amine compounds of the formula given in Table V, in Examples 31–37, or listed after Example 37, are prepared from the corresponding 4-(omega-haloalkyl)-2-thionpyrrolidinone compounds in the manner of Examples 31–37 and according to the general procedure disclosed preceding Example 31.

*Example 49.—3,3-diphenyl-1-isopropyl-4-(2-morpholinoethyl)-2-thionpyrrolidinone hydrochloride*

A solution of 25 g. (0.07 mole) of 4-(2-chloroethyl)-3,3-diphenyl-1-isopropyl-2-thionpyrrolidinone in 100 ml. of morpholine was refluxed for eighteen hours and concentrated in vacuo. The residue was dissolved in 500 ml. of chloroform and this solution was washed with 200 ml. of three normal hydrochloric acid and 300 ml. of three normal sodium hydroxide, dried over anhydrous sodium sulfate and concentrated in vacuo. This residue was dissolved in 300 ml. of methyl isobutyl ketone and hydrogen chloride was passed into the solution until it became acidic. The resulting precipitate was recrystallized from methanol. It melted with decomposition, which started as low as 218°. When samples were inserted into an oil bath which was heated at the rate of about two degrees per minute, a sample started to discolor in ten seconds and was completely melted in twenty seconds at 275° C.

*Analysis.*—Calc'd for $C_{25}H_{33}ClN_2OS$: C, 67.46; H, 7.47; N, 6.30. Found: C, 67.45; H, 7.30; N, 6.20.

The corresponding 1-methyl- and 1-ethyl compounds are prepared in the same manner.

*Example 50.—4-(2-dimethylaminoethyl)-3,3-diphenyl-1-isopropyl-2-thionpyrrolidinone hydrochloride monohydrate*

A mixture of 25 g. (0.07 mole) of 4-(2-chloroethyl)-3,3-diphenyl-1-isopropyl-2-thionpyrrolidinone and 6.3 g. (0.14 mole) of dimethylamine in 300 ml. of absolute ethanol was heated on a steam bath in a steel bomb for twenty hours. The resulting solution was concentrated in vacuo, the residue dissolved in 400 ml. of chloroform, and this solution washed with 200 ml. of two normal hydrochloric acid and 200 ml. of two normal sodium hydroxide, dried over anhydrous sodium sulfate and concentrated in vacuo. This residue was dissolved in 200 ml. of methyl isobutyl ketone and 150 ml. of methyl isobutyl ketone which was saturated with hydrogen chloride added. The volume was concentrated to 200 ml. and the resulting precipitate filtered and recrystallized from methyl isobutyl ketone. Yield, 11.5 g. (39%); M.P. 194–196° C. Three recrystallizations from methyl isobutyl ketone gave a melting point of 196–197 ° C. (This melting point is obtained by heating the bath at a rate of two degrees per minute and inserting the sample at 195° C. When the temperature of the sample is raised slowly, the material melts in the range of 196–201° C.).

*Analysis.*—Calc'd for $C_{23}H_{30}N_2S \cdot HCl \cdot H_2O$: Calc'd: C, 65.61; H, 7.90; N, 6.66; $H_2O$, 4.28. Found: C, 65.88; H, 7.70; N, 6.59; $H_2O$, 3.33.

The corresponding 1-methyl and 1-ethyl compounds are prepared in the same manner.

*Example 51.—3,3-diphenyl-1-isopropyl-4-[2-(4-methyl-1-piperazino)-ethyl]-2-thionpyrrolidinone*

A solution of 20 g. (0.056 mole) of 4-(2-chloroethyl)-3,3-diphenyl-1-isopropyl-2-thionpyrrolidinone and 11.2 g. (0.112 mole) of N-methylpiperazine in 300 ml. of toluene was refluxed for twenty hours (an oil separated), cooled, extracted with 300 ml. of dilute sodium hydroxide and washed with 300 ml. of water. Sufficient chloroform was added to bring about a complete solution, which was dried over sodium sulfate and concentrated in vacuo. The residue was crystallized from isopropyl ether. Yield, 16 g. (68%); M.P. 115–130° C. After several recrystallizations from isopropyl ether, the melting point was 133–134° C.

*Analysis.*—Calc'd for $C_{26}H_{35}N_3S$: C, 74.06; H, 8.37; N, 9.97. Found: C, 74.14; H, 8.28; N, 9.85.

The corresponding 1-methyl- and 1-ethyl-compounds are prepared in the same manner.

Additional 4-omega-aminoalkyl 2-thionpyrrolidinones, e.g., having the same formula as given in Table V except with a sulfur atom in place of the 2-oxygen atom, are prepared according to the procedure preceding Example 31 in the manner of Examples 49, 50, and 51 from the corresponding 4-(omega-haloalkyl)-3,3-disubstituted-1-substituted-2-thionpyrrolidinones, which are in turn prepared by reaction of the corresponding 2-pyrrolidinone and $P_2S_5$ as disclosed in the foregoing.

*Example 52.—3,3-diphenyl-1-ethyl-4-(2-pyrrolidino-ethyl)-2-thionpyrrolidinone*

A solution of 0.1 mole of 4-(2-chloroethyl)-3,3-diphenyl-1-ethyl-2-thionpyrrolidinone and 0.22 mole of pyrrolidine in 150 ml. of dry toluene is refluxed for 15 hours, concentrated in vacuo, and the residue dissolved in chloroform. The chloroform solution is washed with dilute sodium hydroxide and with water, dried over sodium sulfate, and concentrated in vacuo. The residue is crystallized from an appropriate solvent as in Example 51. The base is alternatively converted to a salt by reaction in the usual manner with a pharmaceutically acceptable acid, e.g., hydrochloric.

*Example 53.—3,3-diphenyl-1-isopropyl-4-(2-thiomorpholinoethyl)-2-thionpyrrolidinone*

This compound is prepared in the manner of Example 52 from 4-(2-chloroethyl) - 3,3 - diphenyl-1-isopropyl-2-thionpyrrolidinone and thiomorpholine.

*Example 54.—4-(2-diethylaminoethyl)-3,3-diphenyl-1-isopropyl-2-thionpyrrolidinone hydrochloride*

This compound is prepared in the manner of Example 49 from 4-(2-chloroethyl) - 3,3 - diphenyl-1-isopropyl-2-thionpyrrolidinone and diethylamine.

The 4-(omega-carboxyalkyl) - 2 - thionpyrrolidinones, e.g., of the formula given in Table IV when B is COOH but with a sulfur atom in place of the 2-oxygen atom, are prepared from the corresponding nitriles according to the general procedure preceding Example 20 and in the manner of Example 20 itself.

*Example 55.—3,3-diphenyl-1-isopropyl-2-thionpyrrolidinone-4-propionic acid*

A solution of 30 g. (0.086 mole) of 4-(2-cyanoethyl)-3,3-diphenyl-1-isopropyl-2-thionpyrrolidinone in 200 g. of 70% sulfuric acid was stirred and heated at 75° C. for eighteen hours, poured onto ice and extracted with chloroform. The chloroform extract was dried over anhydrous sodium sulfate and concentrated in vacuo and the residue crystallized from 400 ml. of toluene and recrystallized two times from the same solvent. Yield, 22 g. (70%); M.P. 191–194° C.

*Analysis.*—Calc'd for $C_{22}H_{25}NO_2S$: C, 71.90; H, 6.86; N, 3.81. Found: C, 71.78; H, 6.68; N, 3.97.

*Example 56.—3,3-diphenyl-1-ethyl-2-thionpyrrolidinone-4-propionic acid*

A solution of 0.10 mole of 4-(2-cyanoethyl)-3,3-diphenyl-1-ethyl-2-thionpyrrolidinone in 250 g. of 70% sulfuric acid is stirred and heated at 75° for eighteen hours, poured onto ice and extracted with chloroform. The chloroform extract is dried over anhydrous sodium sulfate and concentrated in vacuo and the residue crystallized from an appropriate solvent, for example, toluene.

*Example 57.—3,3-diphenyl-1-methyl - 2 - thionpyrrolidinone-4-propionic acid and 3,3-diphenyl-1-cyclohexyl-2-thionpyrrolidinone-4-propionic acid*

These compounds are prepared in the manner of Example 56 from 4-(2-cyanoethyl)-3,3-diphenyl-1-methyl-2-thionpyrrolidinone and 4-(2-cyanoethyl)-3,3-diphenyl-1-cyclohexyl-2-thionpyrrolidinone, respectively.

The 4-(omega-carbalkoxyalkyl)-2-thionpyrrolidinones, e.g., of the formula given in Table IV where B is COO-Alkyl but with a sulfur atom in place of the 2-oxygen atom, and the corresponding compounds where B is —COX, are prepared from the corresponding 4-(omega-carboxyalkyl)-2-thionpyrrolidinones in the manner of Examples 21 and 22 and according to the general procedure given preceding Example 21. (The X in —COX is halogen.)

*Example 58.—3,3-diphenyl-1-isopropyl-2-thionpyrrolidinone-4-propionyl chloride and ethyl 4-propionate*

Thionyl chloride (10.7 g., 0.09 mole) was added dropwise to a stirred refluxing solution of 30 g. (0.082 mole) of 3,3-diphenyl-1-isopropyl - 2-thionpyrrolidinone-4-propionic acid in 300 ml. of dry benzene and refluxing continued for one hour after addition was complete. This solution of the acyl chloride was cooled to approximately 20° C. and added at a rapid dropwise rate to a solution of sodium ethoxide (2.3 g., 0.1 mole of sodium) in 200 ml. of absolute ethanol while maintaining the temperature at 10–20° C. with ice-bath cooling. After standing for 0.5 hour, the solution was concentrated in vacuo and the residue was partitioned between 500 ml. of chloroform and 300 ml. of water. The chloroform solution was dried over anhydrous sodium sulfate and concentrated in vacuo and the residue crystallized from ethyl acetate. Yield, 17.5 g. (54%); M.P. 148.5–151° C.

*Analysis.*—Calc'd for $C_{24}H_{29}NO_2S$: C, 72.87; H, 7.39; N, 3.54. Found: C, 72.75; H, 7.20; N, 3.63.

*Example 59.—3,3-diphenyl-1-ethyl-2-thionpyrrolidinone-4-propionyl chloride and ethyl 3,3-diphenyl-1-ethyl-2-thionpyrrolidinone-4-propionate*

Thionyl chloride (0.1 mole) is added dropwise to a stirred, refluxing solution of 0.09 mole of 3,3-diphenyl-1-ethyl-2-thionpyrrolidinone-4-propionic acid in 300 ml. of dry benzene and refluxing continued for one hour after addition is complete. This benzene solution of the acyl chloride is cooled to approximately 20° C. and added at a rapid dropwise rate to a solution of 0.1 mole of sodium ethoxide in 200 ml. of absolute ethanol while maintaining the temperature at 10–20° C. with ice-bath cooling. After standing for 0.5 hour, the solution is concentrated in vacuo and the residue partitioned between 500 ml. of chloroform and 300 ml. of water. The chloroform solution is dried over anhydrous sodium sulfate and concentrated in vacuo and the residue crystallized from an appropriate solvent as in Example 58.

*Example 60.—Methyl 3,3-diphenyl-1-methyl-2-thionpyrrolidinone-4-propionate*

This compound is prepared in the manner of Example 59 from 3,3-diphenyl-1-methyl-2-thionpyrrolidinone-4-propionic acid and sodium methoxide in methanol.

*Example 61.—Propyl 3,3-diphenyl-1-isopropyl-2-thionpyrrolidinone-4-propionate*

This compound is prepared in the manner of Example 59 from 3,3-diphenyl-1-isopropyl-2-thionpyrrolidinone-4-propionic acid and sodium propoxide in n-propanol.

4-(omega - carbamylalkyl)-2-thionpyrrolidinones, e.g., of the formula given in Table IV where B is carbamyl but with a sulfur atom in place of the 2 oxygen atom, are prepared in the manner of Examples 23 through 25 and according to the general procedure given preceding Example 23.

*Example 62.—3,3-diphenyl-1-isopropyl-2-thionpyrrolidinone-4-dimethylpropionamide*

Thionyl chloride (10.7 g., 0.09 mole) was added dropwise to a stirred refluxing solution of 30 g. (0.082 mole) of 3,3-diphenyl-1-isopropyl - 2-thionpyrrolidinone-4-propionic acid in 400 ml. of dry benzene and refluxing was continued for one hour after addition was complete. The solution was cooled to 6° C. and a solution of 8 g. (0.18 mole) of dimethylamine in 125 ml. of dry benzene was added over a five-minute period while the temperature was maintained at 5–15° C. with ice-bath cooling. The resulting solution was stirred at 15° C. for fifteen minutes, 50° C. for thirty minutes, refluxed for one hour and concentrated in vacuo. The residue was partitioned between 200 ml. of chloroform and dilute hydrochloric acid and the chloroform layer separated and washed with dilute sodium hydroxide, dried over anhydrous sodium sulfate and concentrated in vacuo. The residue was crystallized from an isopropyl ether-ethyl acetate mixture. Yield, 12 g. (37%), M.P. 109–111° C.

*Analysis.*—Calc'd for $C_{24}H_{30}N_2OS$: C, 73.05; H, 7.66; N, 7.10. Found: C, 73.22; H, 7.51; N, 6.85.

*Example 63.—3,3-diphenyl-1-ethyl-2-thionpyrrolidinone-4-diethylpropionamide*

Thionyl chloride (0.1 mole) is added dropwise to a stirred, refluxing solution of 0.09 mole of 3,3-diphenyl-1-ethyl-2-thionpyrrolidinone-4-propionic acid in 400 ml. of dry benzene and refluxing continued for one hour after addition is complete. The solution is cooled to 6° C. and a solution of 0.2 mole of diethylamine in 125 ml. of dry benzene added over a five-minute period while the temperature is maintained at 5–15° with ice-bath cooling. The resulting solution is stirred at 15° for fifteen minutes, 50° for thirty minutes, refluxed for one hour and concentrated in vacuo. The residue is partitioned between 200 ml. of chloroform and dilute hydrochloric acid and the chloroform layer separated and washed with dilute sodium hydroxide, dried over anhydrous sodium sulfate, and concentrated in vacuo. The residue is crystallized from an appropriate solvent as in Example 62.

*Example 64.—3,3 - diphenyl - 1 - methyl - 2 - thionpyrrolidinone-4-N-methylpropionamide and 3,3-diphenyl-1-isopropyl - 2 - thionpyrrolidinone - 4-N-n-butylpropionamide*

These compounds are prepared in the manner of Example 63 from 3,3 - diphenyl - 1 - methyl-2-thionpyrrolidinone-4-propionic acid and methylamine, and 3,3-diphenyl-1-isopropyl-2-thionpyrrolidinone-4-propionic acid and n-butylamine, respectively.

The 4-(omega-hydroxyalkyl)-3,3-disubstituted-1-substituted-2-thionpyrrolidinones, e.g., corresponding to 2-pyrrolidinones of the formula given in Table III where B is hydroxy or listed after Example 18, are prepared from the corresponding omega-haloalkyl or omega-acyloxyalkyl thionpyrrolidinone compounds in the manner of Example 11 according to the general procedure given in preceding Example 11.

*Example 65.—3,3-diphenyl-4-(2-hydroxyethyl)-1-isopropyl-2-thionpyrrolidinone*

A solution of 0.1 mole of 4-(2-acetoxyethyl)-3,3-diphenyl-1-isopropyl-2-thionpyrrolidinone and 0.11 mole of sodium hydroxide in 450 ml. of ethanol and 10 ml. of water is stirred and refluxed for one hour and concentrated in vacuo. The residue is partitioned between chloroform and water and the chloroform layer washed with water, dried over anhydrous sodium sulfate and concentrated in vacuo. The residue is crystallized and recrystallized from an appropriate solvent, as in Example 11.

*Example 66.—Other hydroxyethyl compounds*

3,3-diphenyl - 4 - (2-hydroxyethyl) - 1 - ethyl-2-thionpyrrolidinone and 3,3-diphenyl - 4 - (2-hydroxyethyl)-1-methyl-2-thionpyrrolidinone are prepared in the manner of Example 65 from the corresponding 4-(2-acetoxyethyl)-compounds.

The 4-(omega-acyloxyalkyl)-2-thionpyrrolidinone compounds, e.g., of the formula given in Table III where B is —OCOR′ with a sulfur atom in place of the 2-oxygen atom, are prepared, in the manner of Example 12 and in accord with the conventional displacement route as disclosed preceding Example 12, from the corresponding 4-(omega-haloalkyl)-2-thionpyrrolidinone compounds.

*Example 67.—4-(2-acetoxyethyl)-3,3-diphenyl-1-isopropyl-2-thionpyrrolidinone*

A mixture of 0.11 mole of sodium acetate and 0.1 mole of 4-(2-chloroethyl)-3,3-diphenyl-1-isopropyl-2-thionpyrrolidinone in 250 ml. of dimethylformamide is stirred and refluxed for 15 hours, partitioned between 250 ml. of water and 250 ml. of chloroform and the layers separated. The chloroform layer is washed with water, dried over anhydrous sodium sulfate and concentrated in vacuo and the residue crystallized from an appropriate solvent, as in Example 12.

*Example 68.—Other lower-alkanoyloxyalkyl compounds*

4-(2-acetoxyethyl)-3,3-diphenyl - 1 - methyl - 2 - thionpyrrolidinone and 4-(2-acetoxyethyl) - 3,3 - diphenyl-1-ethyl-2-thionpyrrolidinone are prepared in the manner of Example 67 from 4-(2-chloroethyl) - 3,3 - diphenyl-1-methyl-2-thionpyrrolidinone and 4-(2-chloroethyl)-3,3-diphenyl-1-ethyl-2-thionpyrrolidinone, respectively.

In the same manner, the benzoyloxy, hydroxybenzoyloxy, e.g., salicyloyloxy, nicotinoyloxy (including isonicotinoyloxy and like isomeric) esters are prepared starting from the corresponding benzoic, salicylic, or nicotinic acid alkali metal, e.g., sodium, salt, illustratively, 4-(2-benzoyloxyethyl)-3,3-diphenyl-1 - ethyl - 2-thionpyrrolidinone.

The 4-(omega-mercaptoalkyl) - 2 - thionpyrrolidinone compounds, e.g., of the formula given in Table III where B is —SH with a sulfur atom in place of the 2-oxygen atom, are prepared from the corresponding 4-(omega-haloalkyl)-2-thionpyrrolidinone compounds in the manner of Example 14 and according to conventional halogen displacement procedure as generally disclosed preceding Example 14.

*Example 69.—3,3-diphenyl-1-isopropyl-4-(2-mercaptoethyl)-2-thionpyrrolidinone*

A mixture of 40 g. (0.112 mole) of 4-(2-chloroethyl)-3,3-diphenyl-1-isopropyl-2-thionpyrrolidinone and 20 g. (0.224 mole) of sodium hydrosulfide dihydrate in one liter of 95% ethanol and 200 ml. of water was refluxed for 18 hours, concentrated in vacuo to about 300 ml., and partitioned between water and chloroform. The chloroform extract was dried over anhydrous sodium sulfate and concentrated in vacuo. The residue was distilled; the fraction boiling 200–210° C./0.005–0.01 mm. was collected. Yield, 9.5 g. (24%).

*Analysis.*—Calc'd $C_{21}H_{25}NS_2$: C, 70.94; H, 7.09; N, 3.94. Found: C, 71.03; H, 6.99; N, 4.20.

The corresponding 1-ethyl- and 1-methyl-compounds are prepared in the same manner.

The 4-(omega-lower-alkylmercaptoalkyl) - 2-thionpyrrolidinone compounds, e.g., of the formula given in Table III wherein B is —SR′ with a sulfur atom in place of the oxygen atom, are prepared from the corresponding omega-mercaptoalkyl compound by reaction with an alkyl halide or from the corresponding omega-haloalkyl compound by reaction with a lower-alkyl mercaptan, in the manner of Example 15 and according to the general procedure preceding Example 15.

*Example 70.—3,3-diphenyl-1-isopropyl-4-(2-methylmercaptoethyl)-2-thionpyrrolidinone*

A solution of 0.1 mole of methyl bromide in 200 ml. of absolute ethanol is added to a solution of 0.05 mole of 3,3-diphenyl-1-isopropyl-4-(2-mercaptoethyl) - 2-thionpyrrolidinone in 200 ml. of absolute ethanol in which 0.055 gram atom of sodium is dissolved. The solution is stirred at room temperature for four hours, concentrated in vacuo, and the residue partitioned between water and chloroform. The chloroform is concentrated in vacuo and the residue crystallized from an appropriate solvent, as in Example 15.

The corresponding 1-methyl- and 1-ethyl-compounds are prepared in the same manner.

The 4-(omega-ether substituted)-2-thionpyrrolidinones, e.g., of the formula given in Table III with a sulfur atom in place of the 2-oxygen atom, including the lower-alkoxy, phenoxy, benzyloxy and like ether compounds, are prepared from the corresponding haloalkyl thionpyrrolidinone compounds according to conventional halogen replacement procedure in the manner of Examples 16 and 17 and as generally disclosed preceding Example 16.

*Example 71.—3,3-diphenyl-1-isopropyl-4-(β-methoxyethyl)-2-thionpyrrolidinone*

A solution of 0.1 mole of 4-(2-chloroethyl)-3,3-diphenyl-1-isopropyl-2-thionpyrrolidinone in 150 ml. of absolute methanol is added to 50 ml. of absolute methanol in which 0.11 gram atom of sodium is dissolved. The solution is then heated in a closed system for 16 hours at 140°. Addition of water to the resulting mixture causes separation of the product which is crystallized from an appropriate solvent, as in Example 16.

3,3-diphenyl-1-isobutyl-4-(β-methoxyethyl)-2-thionpyrrolidinone is prepared in the manner of Example 71 from 4-(2-chloroethyl)-3,3-diphenyl-1-isobutyl-2 - thionpyrrolidinone and sodium methoxide. The corresponding 3,3-diphenyl-1-isopropyl-4-(β-benzyloxyethyl)-2-thionpyrrolidinone is prepared in the same manner as given in Example 71 but using sodium benzyloxide instead of sodium methoxide. The corresponding phenoxy compound is produced using sodium phenoxide. The corresponding 1-methyl- and 1-ethyl- compounds are prepared in the same manner.

*Example 72.—4-[2-(3-dimethylaminophenoxy)ethyl]-3,3-diphenyl-1-isopropyl-2-thionpyrrolidinone*

A solution of 0.056 mole of the sodium salt of 3-dimethylaminophenol and 0.056 mole of 4-(2-chloroethyl)-3,3-diphenyl-1-isopropyl-2-thionpyrrolidinone in 700 ml. of absolute ethanol was refluxed for 24 hours and concentrated in vacuo and the residue partitioned between chloroform and water. The chloroform layer was washed with dilute sodium hydroxide, dilute hydrochloric acid and finally water, dried over sodium sulfate and concentrated in vacuo. The residue was crystallized from isopropyl ether. Yield, 8 g. (31%); M.P. 104—106° C.

*Analysis.*—Calc'd $C_{29}H_{34}N_2SO$: C, 75.93; H, 7.47. Found: C, 75.65; H, 7.39.

The corresponding 1-methyl- and 1-ethyl- compounds are prepared in the same manner.

The 4-(omega-acylalkyl) - 2 - thionpyrrolidinone compounds, e.g., of the formula given in Table IV where B is —COR′ with a sulfur atom in place of the 2-oxygen atom, are prepared from the corresponding 4-(omega-chlorocarbonylalkyl)-2-thionpyrrolidinone compounds by a Grignard type reaction in the manner of Example 26 and in accord with the general procedure given preceding Example 26. These compounds may be used in chain-extension reactions as indicated following Example 26.

*Example 73.—3,3-diphenyl-1-isopropyl-4-(β-propionylethyl)-2-thionpyrrolidinone*

Diethyl cadmium is prepared in the manner of Example 26 in dry toluene and an equimolar amount of 3,3-diphenyl-1-isopropyl-2-thionpyrrolidinone - 4 - propionyl chloride in dry toluene added in a dropwise fashion. The resulting mixture is stirred at 85° for two hours, cooled and hydrolyzed with water and six normal hydrochloric acid. The toluene layer is separated, washed with dilute sodium hydroxide, dried over anhydrous sodium sulfate and concentrated in vacuo. The residue is crystallized from an appropriate solvent, e.g., aqueous ethanol.

The corresponding 1-methyl- and 1-ethyl- compounds are prepared in the same manner.

Additional 4-(omega-acylalkyl)-2-thionpyrrolidinones, especially the omega-lower-alkanoylalkyl compounds, are prepared from the corresponding 4-(omega-chlorocarbonylalkyl)-compounds by reaction with dialkyl cadmium reagents in the manner of Example 73.

The 4-[omega-(N-lower-alkanoylamino)-alkyl] and 4-[omega-(N-lower-alkanoyl-N-lower - alkylamino)-alkyl] 2-thionpyrrolidinone compounds, e.g., of the formula given in Table V where —N(R′″)₂ is —NHCOR′ or —NR′COR′ with a sulfur atom in place of the 2-oxygen atom, are prepared from the corresponding primary or secondary aminoalkyl thionpyrrolidinone compound by reaction with a selected acid chloride or acid anhydride in the manner of Examples 38 and 39 and according to the general procedures given preceding these examples.

*Example 74.—4-[2-(N-acetyl - N-methylamino)-ethyl]-3,3-diphenyl-1-methyl-2-thionpyrrolidinone and related amides*

A chloroform solution of equimolar quantities of 3,3-diphenyl-1-methyl-4-(2-methylaminoethyl) - 2 - thionpyrrolidinone and acetic anhydride is refluxed for two hours, concentrated in vacuo, and the residue crystallized in the manner of Example 38 to produce the desired amide.

The corresponding N-propionyl compound is prepared in the same manner, utilizing propionic anhydride instead of acetic anhydride, and the compound 4-[2-(N-acetylamino)-ethyl] - 3,3-diphenyl-1-ethyl-2-thionpyrrolidinone is produced in the same manner starting with 3,3-diphenyl-1-ethyl-4-(β-aminoethyl)-2-thionpyrrolidinone.

The corresponding 1-propyl-, 1-isopropyl-, and 1-butyl-compounds are prepared in the same manner.

Still additional 2-thionpyrrolidinone compounds corresponding to 2-pyrrolidinones disclosed herein are made from 2-thionpyrrolidinone intermediates in the manner and according to the procedure herein described for making the 2-pyrrolidinones from the corresponding 2-pyrrolidinone intermediates.

*Example 75.—Formulations*

Effective quantities of any of the foregoing pharmacologically active compounds may be administered to a living animal body in any one of various ways, for example, orally, as in capsules or tablets, parenterally in the form of sterile solutions or suspensions, and in some cases intravenously in sterile solution. The amino compounds are preferred for most purposes and these are as usual preferably formulated and administered in the form of their non-toxic acid addition or quaternary ammonium salts for purposes of convenience of crystallization, increased solubility, and the like. The 3,3-disubstituted-1-alkyl-4-aminoalkyl-2-pyrrolidinones and 3,3-disubstituted-1-alkyl-4-aminoalkyl-2-thionpyrrolidinones, especially in the form of their acid addition salts, represent a preferred group of highly pharmacologically active compounds, of which the 1-ethyl and 1-isopropyl 4-morpholinalkyl, especially the 4-(2-morpholinoethyl) compounds, are outstandingly active. Preferred groups at the 3,3 position are phenyl radicals as the 3,3-diphenyl compounds are likewise outstanding in their activity.

The following formulations are representative for all of the pharmacologically active compounds of the invention, but have been particularly designed to embody as active ingredient a 3,3-diphenyl-1-alkyl-4-aminoalkyl-2-pyrrolidinone or 3,3 - diphenyl-1-alkyl-4-aminoalkyl-2-thionpyrrolidinone, and especially a pharmacologically acceptable salt thereof, for example the 3,3-diphenyl-1-lower-alkyl (e.g., 1-ethyl or 1-isopropyl)-4-(2-morpholinoethyl)-2-pyrrolidinone or -2-thionpyrrolidinone or their hydrochlorides, hydrobromides, methiodides, or like pharmacologically acceptable salts thereof.

(1) *Capsules.*—Capsules of 5 mg., 25 mg., and 50 mg. of active ingredient per capsule are prepared. With the higher amounts of active ingredient, reduction may be made in the amount of lactose.

TYPICAL BLEND FOR ENCAPSULATION

| | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total, mg | 435.0 | 435.0 | 550.0 |

In each case, uniformly blend the selected active ingredient with lactose, starch, and magnesium stearate and encapsulate the blend.

(2) *Tablets.*—A typical formulation for a tablet containing 5.0 mg. of active ingredient per tablet follows. The formulation may be used for other strengths of active ingredient by adjustment of weight of dicalcium phosphate.

Per tablet, mg.
(1) Active ingredient _____ 5.0
(2) Corn starch _____ 13.6
(3) Corn starch (paste) _____ 3.4
(4) Lactose _____ 79.2
(5) Dicalcium phosphate _____ 68.0
(6) Calcium stearate _____ 0.9

Total _____ 170.1

Uniformly blend 1, 2, 4 and 5. Prepare 3 as a 10% paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

(A) 50 MG. TABLET

Ingredients: Per tablet, mg.
Active ingredient, as salt _____ 50.0
Lactose _____ 90.0
Milo starch _____ 20.0
Corn starch _____ 38.0
Calcium stearate _____ 2.0

Total _____ 200.0

Uniformly blend the active ingredient, lactose, milo starch and corn starch. This blend is granulated using water as a granulating medium. The wet granules are passed through a #8 mesh screen. The wet granules are dried at 140-160° F. overnight. The dried granules are passed through a #10 mesh screen. The dried granules are blended with the proper amount of calcium stearate and this blend is then converted into tablets on a suitable tablet press.

(B) 100 MG. TABLET

Ingredients: Per tablet, mg.
Active ingredient, as salt _____ 100.0
Lactose _____ 190.0
Dicalcium phosphate _____ 172.2
Starch _____ 54.0
Milo starch _____ 21.6
Calcium stearate _____ 2.2

Total _____ 540.0

Uniformly blend the active ingredient, lactose, dicalcium phosphate, starch and milo starch. This blend is granulated with water and the wet mass is passed through a #8 mesh screen. The wet granules are dried at 140-160° F. overnight. The dried granules are passed through a #10 mesh screen. These dried granules are blended with the proper weight of calcium stearate and the lubricated granules are then converted into tablets on a suitable tablet press.

(C) 250 MG. TABLET

Ingredients: Per tablet, mg.
Active ingredient, as salt _____ 250.0
Corn starch _____ 56.0
Carbowax 6000 (polyethylene glycol of M.W. approximately 6000) _____ 25.0
Lactose _____ 35.0
Magnesium stearate _____ 4.0

Total _____ 370.0

Uniformly blend the active ingredient, corn starch, Carbowax 6000, lactose and one-half the weight of magnesium stearate required. This blend is then "slugged" on a suitable tablet press. These "slugs" are granulated through a #10 mesh screen on an oscillating granulator. These granules are then blended with the remainder of the magnesium stearate and the lubricated granules are then converted into tablets on a suitable tablet press.

(D) 500 MG. TABLET

Ingredients: Per tablet, mg.
Active ingredient, as salt _____ 500.0
Corn starch (wet) _____ 86.4
Milo starch _____ 32.4
Calcium stearate _____ 3.2
Corn starch (dry) _____ 26.0

Total _____ 648.0

Uniformly blend the active ingredient, corn starch and milo starch. This blend is wet granulated using water and the wet mass is passed through a #8 mesh screen. These wet granules are dried overnight at 140-160° F. The dried granules are passed through a #10 mesh screen. The dried granules and weighed amounts of corn starch and calcium stearate are uniformly blended and these lubricated granules are compressed on a suitable tablet press.

(3) *Injectable, 2% sterile solution.*

Per cc.
Active ingredient _____ 20 mg.
Preservative, e.g., chlorobutanol  0.5% weight/volume
Water for injection _____ Q.s.

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Although very small quantities of the active materials of the present invention are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result, e.g., analeptic or hypotensive, desired. The exact individual dosages as well as daily dosages in a particular case will of course be determined according to established medical principles under the direction of a physician or veterinarian. Results upon administration of these novel materials have thus far proved extremely gratifying.

Various modifications may be made in the present invention without departing from the spirit and scope thereof, and it is to be understood that the invention is limited only by the scope of the appended claims.

We claim:
1. A compound selected from the group consisting of 4-(omega-substituted alkyl)-2-pyrrolidinones and -2-thionpyrrolidinones of the formula:

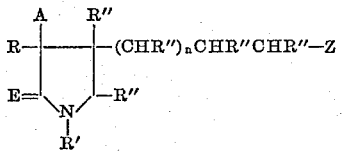

wherein

Z is selected from the group consisting of cyano, carboxy, carb-lower-alkoxy, carbonyl halide, lower alkanoyl, and aminocarbonyl wherein "amino" is selected from the group consisting of primary amino, N,N - (lower - alkyl)amino, N,N-di-(lower-alkyl) amino, N-di-(monocyclic alkyl)amino wherein each monocyclic alkyl has up to a maximum of nine carbon atoms, and saturated heterocyclic amino radicals having less than 12 carbon atoms and having up to a maximum of two hetero atoms in the heterocyclic ring, A is selected from the group consisting of lower-alkyl, cycloalkyl having up to a maximum of nine carbon atoms, monocarbocyclic aryl having six ring carbon atoms, and monocarbocyclic aralkyl having six ring carbon atoms, R is selected from the group consisting of lower-alkyl, lower alkenyl, cycloalkyl having up to a maximum of nine carbon atoms, monocarbocyclic aryl having six ring carbon atoms, monocarbocyclic aralkyl having six ring carbon atoms, pyridyl, thienyl, and thenyl, R' is selected from the group consisting of lower-alkyl, lower-alkenyl, cycloalkyl having up to a maximum of nine carbon atoms, cycloalkenyl having up to a maximum of nine carbon atoms, and monocarbocyclic aralkyl having six ring carbon atoms, R" is selected from the group consisting of hydrogen and methyl, a maximum of one R" being other than hydrogen, wherein E is selected from the group consisting of oxygen and sulfur, wherein monocarbocyclic aryl and monocarbocyclic aralkyl have at most fifteen carbon atoms and wherein the aryl group in each such monocarbocyclic radical is substituted by a member selected from the group consisting of hydrogen, nitro, lower-alkoxy, lower-alkylmercapto, lower-alkyl, and halogen, and wherein "alkyl" in "aralkyl" is lower-alkyl, and wherein n is selected from zero and one.

2. 4 - (β - cyanoethyl)-3,3-diphenyl-1-lower-alkyl-2-pyrrolidinone.
3. 4 - (β - cyanoethyl)-3,3-diphenyl-1-isopropyl-2-pyrrolidinone.
4. 4 - (γ - cyanopropyl)-3,3-diphenyl-1-lower-alkyl-2-pyrrolidinone.
5. 1 - lower - alkyl - 3,3-diphenyl-2-pyrrolidinone-4-propionamide.
6. 1-lower - alkyl - 3,3 - diphenyl-2-pyrrolidinone-4-(N-lower-alkylpropionamide).
7. 1 - lower - alkyl-3,3-diphenyl-2-pyrrolidinone-4-(N,N-di-lower-alkylpropionamide).
8. 1 - lower - alkyl - 3,3-diphenyl-4-(β-lower-alkanoylethyl)-2-pyrrolidinone.
9. 1 - lower - alkyl - 3,3-diphenyl-2-pyrrolidinone-4-propionic acid.
10. 1 - lower - alkyl - 3,3-diphenyl-2-pyrrolidinone-4-propionyl chloride.
11. Lower-alkyl 1-lower-alkyl-3,3-diphenyl-2-pyrrolidinone-4-propionate.
12. 1 - lower - alkyl - 3,3-diphenyl - 4-[β-lower-alkyleneiminocarbonylethyl]-2-pyrrolidinone.
13. 1 - isopropyl-3,3-diphenyl-4-[beta-pyrrolidinocarbonylethyl]-2-pyrrolidinone.
14. 4 - (γ-cyanoisopropyl)-3,3-diphenyl-1-lower-alkyl-2-pyrrolidinone.
15. 4 - (β - morpholinocarbonylethyl)-3,3-diphenyl-1-isopropyl-2-pyrrolidinone.
16. 4 - (β - cyanoethyl)-3,3-diphenyl-1-lower-alkyl-2-pyrrolidinethion.
17. 1 - lower-alkyl - 3,3-diphenyl-2-pyrrolidinethion-4-(N,N-di-lower-alkylpropionamide).
18. 1 - lower - alkyl-3,3-diphenyl-2-pyrrolidinethion-4-propionic acid.
19. 1 - lower - alkyl-3,3-diphenyl-2-pyrrolidinethion-4-propionyl chloride.
20. Lower - alkyl 3,3 - diphenyl-1-lower-alkyl-2-pyrrolidinethion-4-propionate.

References Cited by the Examiner
UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,421,729 | 6/47 | Walton et al. | 260—326.5 |
| 2,425,320 | 8/47 | Hill | 252—149 |
| 2,570,024 | 10/51 | Charpentier | 260—465 |
| 2,606,155 | 8/52 | Hill | 252—149 |
| 3,026,326 | 3/62 | McKusick et al. | 260—326.5 |
| 3,028,396 | 4/62 | Albus et al. | 260—325.5 |
| 3,088,871 | 5/63 | Pfeiffer | 167—65 |
| 3,098,010 | 7/63 | Everett et al. | 167—65 |

OTHER REFERENCES

Byrd: "Dissertation Abstr." vol. 20, pages 517–19 (1959).

NICHOLAS S. RIZZO, Primary Examiner.
JOHN D. RANDOLPH, WALTER A. MODANCE,
Examiners.

UNITED STATES PATENT OFFICE
CERTIFICATE OF CORRECTION

Patent No. 3,192,210                                June 29, 1965

Carl D. Lunsford et al.

It is hereby certified that error appears in the above numbered patent requiring correction and that the said Letters Patent should read as corrected below.

Column 1, lines 31 to 37, for that portion of the formula reading

-B″                  read                 -B line 46, for "or", first occurrence, read -- of --; column 3, line 31, for "methcyclohexyl" read -- methylcyclohexyl --; column 5, line 45, for "by" read -- be --; column 14, line 8, for "chloroethyl" read -- chloroethyl) --; column 21, line 53, for "methyl bromide" read -- methyl, bromide --; column 25, line 1, for "-cyclohexyl)-2-" read -- -cyclohexyl-2- --; line 7, for "4-(β-propoxyethyl-3-phenyl-3-(2-pyridyl-1)" read -- 4-(β-propoxyethyl)-3-phenyl-3-(2-pyridyl)-1 --; columns 25 and 26, Table III, sixth column, line 4 thereof, for "86.7" read -- 86-7 --; column 28, line 11, for "omega-carbamylalkyl)" read -- omega-aminocarbonylalkyl) --; column 48, line 11, for "218°" read -- 218° C. --; column 55, in the table at the top of the column, in the heading to the last three columns, strike out "per", second occurrence.

Signed and sealed this 3rd day of May 1966.

(SEAL)
Attest

ERNEST W. SWIDER                            EDWARD J. BRENNER
Attesting Officer                           Commissioner of Patents